(12) United States Patent
Mitra et al.

(10) Patent No.: US 12,405,194 B2
(45) Date of Patent: Sep. 2, 2025

(54) FACING AND QUALITY CONTROL IN MICROTOMY

(71) Applicant: Clarapath, Inc., New York, NY (US)

(72) Inventors: Partha P. Mitra, New York, NY (US);
Charles Cantor, New York, NY (US);
Baris Yagci, New York, NY (US);
David Kleinfeld, New York, NY (US);
Cong Zhang, New York, NY (US);
Steven Smith, New York, NY (US)

(73) Assignee: Clarapath, Inc., Hawthorne, NY (US)

( * ) Notice: Subject to any disclaimer, the term of this patent is extended or adjusted under 35 U.S.C. 154(b) by 464 days.

(21) Appl. No.: 17/182,133

(22) Filed: Feb. 22, 2021

(65) Prior Publication Data

US 2021/0262907 A1 Aug. 26, 2021

Related U.S. Application Data

(60) Provisional application No. 63/134,399, filed on Jan. 6, 2021, provisional application No. 62/980,194, filed
(Continued)

(51) Int. Cl.
*G01N 1/36* (2006.01)
*G01B 11/22* (2006.01)
(Continued)

(52) U.S. Cl.
CPC ............... *G01N 1/36* (2013.01); *G01B 11/22* (2013.01); *G01N 1/06* (2013.01); *G01N 1/286* (2013.01);
(Continued)

(58) Field of Classification Search
CPC ............ G01N 1/286; G01N 35/00732; G01N 35/00613; G01N 1/312; G01N 21/6486;
(Continued)

(56) References Cited

U.S. PATENT DOCUMENTS 4,511,224 A 4/1985 Sitte et al.
5,746,855 A 5/1998 Bolles
(Continued)

FOREIGN PATENT DOCUMENTS

CN 212115045 U 12/2020
DE 102011116555 A1 4/2013
(Continued)

OTHER PUBLICATIONS

International Search Report and Written Opinion in PCT International Application No. PCT/US2021/019128 mailed Jun. 29, 2021.

*Primary Examiner* — Elizabeth A Robinson
*Assistant Examiner* — Tingchen Shi
(74) *Attorney, Agent, or Firm* — Greenberg Traurig, LLP; David J. Dykeman; Roman Fayerberg

(57) ABSTRACT

The present disclosure relates to systems and methods for facing a tissue block. In some embodiments, a method is provided for facing a tissue block that includes imaging a tissue block to generate imaging data of the tissue block, the tissue block comprising a tissue sample embedded in an embedding material, estimating, based on the imaging data, a depth profile of the tissue block, wherein the depth profile comprises a thickness of the embedding material to be removed to expose the tissue sample to a pre-determined criteria, and removing the thickness of the embedding material to expose the tissue to the pre-determined criteria.

12 Claims, 38 Drawing Sheets

Related U.S. Application Data on Feb. 22, 2020, provisional application No. 62/980,203, filed on Feb. 22, 2020, provisional application No. 62/980,202, filed on Feb. 22, 2020, provisional application No. 62/980,201, filed on Feb. 22, 2020.

(51) Int. Cl.

| | | |
|---|---|---|
| *G01N 1/06* | (2006.01) | |
| *G01N 1/28* | (2006.01) | |
| *G01N 1/31* | (2006.01) | |
| *G01N 21/64* | (2006.01) | |
| *G01N 35/00* | (2006.01) | |
| *G06T 7/00* | (2017.01) | |
| *G06T 7/521* | (2017.01) | |

(52) U.S. Cl.
CPC ......... *G01N 1/312* (2013.01); *G01N 21/6456* (2013.01); *G01N 21/6486* (2013.01); *G01N 35/00603* (2013.01); *G01N 35/00613* (2013.01); *G01N 35/00732* (2013.01); *G06T 7/0014* (2013.01); *G06T 7/521* (2017.01); G01N 2001/2873 (2013.01); G01N 2035/00039 (2013.01); G01N 2035/00861 (2013.01); G01N 2035/00881 (2013.01); G06T 2207/30024 (2013.01)

(58) Field of Classification Search
CPC ............... G01N 1/06; G01N 35/00603; G01N 21/6456; G01N 1/36; G01N 2035/00039; G01N 2035/00881; G01N 2035/00861; G01N 2035/00138; G01N 2035/00752; G01N 2001/2873; G06T 7/0014; G06T 7/521; G06T 2207/10056; G06T 2207/30024; G01B 11/22; G01B 11/0608; G01B 11/2513

See application file for complete search history.

(56) References Cited

U.S. PATENT DOCUMENTS

| | | | |
|---|---|---|---|
| 6,387,653 | B1 | 5/2002 | Voneiff et al. |
| 6,568,307 | B1 | 5/2003 | Gunther |
| 7,374,907 | B1 | 5/2008 | Voneiff et al. |
| 8,074,547 | B2 | 12/2011 | Ito et al. |
| 8,687,858 | B2 | 4/2014 | Walter et al. |
| 9,032,854 | B2 | 5/2015 | Yang et al. |
| 9,164,014 | B2 | 10/2015 | Ito |
| 9,279,749 | B2 | 3/2016 | Donovan et al. |
| 9,354,147 | B2 | 5/2016 | Lefebvre |
| 9,933,339 | B2 | 4/2018 | Briggman |
| 10,228,311 | B2 | 3/2019 | Stephens et al. |
| 10,473,557 | B2 | 11/2019 | Mitra et al. |
| 10,571,368 | B2 | 2/2020 | Zhang et al. |
| 10,724,929 | B2 | 7/2020 | Zhang et al. |
| 11,169,056 | B2 | 11/2021 | Mitra et al. |
| 11,435,268 | B2 | 9/2022 | Mitra et al. |
| 11,467,071 | B2 | 10/2022 | Mitra et al. |
| 11,506,577 | B2 | 11/2022 | Zhang et al. |
| 11,609,162 | B2 | 3/2023 | Mitra et al. |
| 11,630,035 | B2 | 4/2023 | Mitra et al. |
| 11,821,826 | B2 | 11/2023 | Mitra et al. |
| 11,874,208 | B2 | 1/2024 | Mitra et al. |
| 11,898,948 | B2 | 2/2024 | Mitra et al. |
| 11,959,835 | B2 | 4/2024 | Mitra et al. |
| 12,158,404 | B2 | 12/2024 | Mitra et al. |
| 2003/0022271 | A1* | 1/2003 | Voneiff ............... G01N 1/312 |
| | | | 435/40.52 |
| 2003/0120633 | A1 | 6/2003 | Torre-Bueno |
| 2005/0235542 | A1 | 10/2005 | Metzner et al. |
| 2006/0086221 | A1 | 4/2006 | Kong |
| 2007/0039435 | A1 | 2/2007 | Kokubo |
| 2007/0141711 | A1 | 6/2007 | Stephens et al. |
| 2007/0180965 | A1 | 8/2007 | Ito et al. |
| 2007/0199418 | A1 | 8/2007 | Ito |
| 2009/0110253 | A1 | 4/2009 | Torre-Bueno |
| 2009/0214088 | A1 | 8/2009 | Sorenson et al. |
| 2010/0021037 | A1 | 1/2010 | Zahniser et al. |
| 2010/0093022 | A1 | 4/2010 | Hayworth et al. |
| 2010/0118133 | A1* | 5/2010 | Walter ............... G01N 1/06 |
| | | | 348/79 |
| 2010/0279342 | A1 | 11/2010 | Kijima et al. |
| 2011/0111435 | A1 | 5/2011 | Dobson et al. |
| 2011/0249109 | A1 | 10/2011 | Fine et al. |
| 2011/0303352 | A1 | 12/2011 | Nakajima et al. |
| 2012/0149050 | A1 | 6/2012 | Lapen et al. |
| 2013/0164781 | A1 | 6/2013 | Lefebvre |
| 2014/0026683 | A1 | 1/2014 | Hayworth et al. |
| 2014/0041500 | A1 | 2/2014 | Isagawa et al. |
| 2014/0051158 | A1 | 2/2014 | Nakajima et al. |
| 2014/0098376 | A1 | 4/2014 | Hashimshony |
| 2014/0137715 | A1 | 5/2014 | Sneyders et al. |
| 2015/0013512 | A1 | 1/2015 | Yang et al. |
| 2015/0017679 | A1 | 1/2015 | Ito et al. |
| 2015/0268141 | A1 | 9/2015 | Miyatani |
| 2015/0293026 | A1 | 10/2015 | Shin et al. |
| 2016/0063724 | A1* | 3/2016 | Tunstall .................. G06T 7/136 |
| | | | 382/128 |
| 2016/0091400 | A1* | 3/2016 | Whited .................. G01N 1/286 |
| | | | 435/40.52 |
| 2016/0139004 | A1 | 5/2016 | Witte |
| 2016/0245833 | A1 | 8/2016 | Lefebvre |
| 2017/0003309 | A1 | 1/2017 | Mitra et al. |
| 2017/0067800 | A1 | 3/2017 | Briggman |
| 2017/0161428 | A1 | 6/2017 | Mitra |
| 2017/0205317 | A1 | 7/2017 | Zhang et al. |
| 2017/0276574 | A1 | 9/2017 | Webber et al. |
| 2017/0328818 | A1 | 11/2017 | Zhang et al. |
| 2017/0372471 | A1 | 12/2017 | Euren |
| 2018/0108163 | A1 | 4/2018 | Remiszewski |
| 2018/0136089 | A1 | 5/2018 | Bui et al. |
| 2019/0176194 | A1 | 6/2019 | Chen et al. |
| 2019/0250071 | A1 | 8/2019 | Hayworth et al. |
| 2019/0301980 | A1 | 10/2019 | Anderson et al. |
| 2019/0355135 | A1 | 11/2019 | Rhodes |
| 2019/0368982 | A1 | 12/2019 | Schleifer et al. |
| 2020/0041387 | A1 | 2/2020 | Rhodes et al. |
| 2020/0064232 | A1 | 2/2020 | Mitra et al. |
| 2020/0160522 | A1 | 5/2020 | Merlo et al. |
| 2020/0166434 | A1 | 5/2020 | Zhang et al. |
| 2020/0388032 | A1 | 12/2020 | Chiang et al. |
| 2021/0149174 | A1 | 5/2021 | Levenson |
| 2021/0262905 | A1 | 8/2021 | Mitra et al. |
| 2021/0263055 | A1 | 8/2021 | Mitra et al. |
| 2022/0034768 | A1 | 2/2022 | Mitra et al. |
| 2022/0034769 | A1 | 2/2022 | Mitra et al. |
| 2022/0042887 | A1 | 2/2022 | Mitra et al. |
| 2022/0113228 | A1 | 4/2022 | Mitra et al. |
| 2022/0128810 | A1 | 4/2022 | Mitra et al. |
| 2022/0349788 | A1 | 11/2022 | Mitra et al. |
| 2022/0364960 | A1 | 11/2022 | Smith et al. |
| 2022/0404241 | A1 | 12/2022 | Yagci et al. |
| 2023/0057075 | A1 | 2/2023 | Zhang et al. |
| 2023/0126618 | A1 | 4/2023 | Mitra et al. |
| 2023/0221222 | A1 | 7/2023 | Mitra et al. |
| 2023/0228651 | A1 | 7/2023 | Yagci et al. |
| 2023/0359010 | A1 | 11/2023 | Chen et al. |
| 2024/0167917 | A1 | 5/2024 | Mitra et al. |
| 2024/0288342 | A1 | 8/2024 | Mitra et al. |

FOREIGN PATENT DOCUMENTS

| | | |
|---|---|---|
| DE | 10207118304 A1 | 2/2018 |
| EP | 0111290 A2 | 6/1984 |
| JP | S6385426 A | 4/1988 |
| JP | 2000190291 A | 7/2000 |
| JP | 2001324423 A | 11/2001 |
| JP | 2004013435 A | 1/2004 |
| JP | 2008020293 A | 1/2008 |
| JP | 2012229993 A | 11/2012 |
| JP | 2012229995 A | 11/2012 |
| JP | 2007218616 A | 1/2015 |

(56) References Cited

FOREIGN PATENT DOCUMENTS

| | | |
|---|---|---|
| WO | 1997003827 A1 | 2/1997 |
| WO | 2010151761 A2 | 12/2010 |
| WO | 2012147730 A1 | 11/2012 |
| WO | 2015046518 A1 | 4/2015 |
| WO | 2015175525 A1 | 11/2015 |
| WO | 2019209743 A1 | 10/2019 |
| WO | 2021168457 A1 | 8/2021 |
| WO | 2022087443 A1 | 4/2022 |
| WO | 2022241261 A1 | 11/2022 |
| WO | 2022271732 A1 | 12/2022 |
| WO | 2023092156 A1 | 5/2023 |
| WO | 2023122620 A2 | 6/2023 |

\* cited by examiner

500

516

506

FACING AND QUALITY CONTROL IN MICROTOMY

RELATED APPLICATIONS

This application claims the benefit of and priority to U.S. Provisional Application Ser. No. 62/980,201, filed on Feb. 22, 2020, U.S. Provisional Application Ser. No. 62/980,203, filed on Feb. 22, 2020, U.S. Provisional Application Ser. No. 62/980,202, filed on Feb. 22, 2020, U.S. Provisional Application Ser. No. 62/980,194 filed on Feb. 22, 2020, and U.S. Provisional Application Ser. No. 63/134,399, filed on Jan. 6, 2021, all of which are incorporated herein by reference in their entireties.

FIELD

The present invention relates to quality control of cut tissue sections transferred from a biological tissue sample block to a slide, including facing, tracking, and mechanical quality control. In particular, this can be achieved using an automated system.

BACKGROUND

Traditional microtomy, the production of postage-stamp sized, micron-thin tissue sections for microscope viewing, is a delicate, time consuming manual task. In the process, a microtome cuts a tissue block consisting of tissue sample, enclosed in a supporting block of embedding material such as paraffin wax. The microtome holds a blade aligned for cutting slices from one face of tissue block—the block cutting face. A common type, the rotary microtome, linearly oscillates a chuck holding the block with the cutting face in the blade-cutting plane. Combined with incremental advancement of the block cutting face into the cutting plane, the microtome successively shaves thin tissue sections off the block cutting face. For sections with paraffin wax embedding medium, an operator carefully picks up these tissue sections and floats them on warm water. The water gently de-wrinkles and reduces deformation from cutting. Finally, an operator moves the sections from water onto microscope slides for further processing.

Recent advancements in the digital imaging of tissue sample sections have made it desirable to slice blocks of specimen very quickly. By way of example, where tissues are sectioned as part of clinical care, time is an important variable in improving patient care. Every minute that can be saved during sectioning of tissue for intra-operative applications of anatomic pathology, for example in examining margins of lung cancers to determine whether enough tissue has been removed, is of clinical value. To create a large number of sample sections quickly, it is desirable to automate the process of cutting tissue sections from a specimen block by a microtome blade and facilitating the transfer of cut tissue sections to an adhesive tape or other transfer medium without reducing section quality. Additionally, the large number of tissue sample sections cut from the block need to be transferred to microscope slides for evaluation.

Quality control for tissue samples is important. Inadequate quality control can adversely affect pathology, leading to inaccurate assessment of tissue. However, currently quality control of tissue sections deposited on glass slides is a resource consuming task.

This comparison is done in manual transfer of tissue to the slides, however, it is often difficult to differentiate the tissue from the paraffin, leading to inaccurate comparisons and thus inadequate quality control. Further, inability to properly assess the tissue results in lack of knowledge that an insufficient tissue section is placed on the slide. It also inhibits the assessment of whether the tissue section on the slide has been damaged.

The present disclosure overcomes the problems and deficiencies of the current workflow by the implementation of methods and systems that eliminate or at least significantly decrease the quality control issues and the risk of the mismatch between the slide label and the tissue section.

SUMMARY

The present disclosure relates to systems and methods for facing a tissue block. In some embodiments, a method is provided for facing a tissue block that includes imaging a tissue block to generate imaging data of the tissue block, the tissue block comprising a tissue sample embedded in an embedding material, estimating, based on the imaging data, a depth profile of the tissue block, wherein the depth profile comprises a thickness of the embedding material to be removed to expose the tissue sample to a pre-determined criteria, and removing the thickness of the embedding material to expose the tissue to the pre-determined criteria.

In some embodiments, the method can further include progressively removing one or more sections from a tissue block comprising a tissue sample embedded in an embedding material, imaging the one or more sections to generate imaging data associated with the one or more sections, and confirming, based on the imaging data, that the tissue sample is exposed to the predetermined criteria. In some embodiments, the tissue block is imaged with a structured light to determine the depth profile.

In some embodiments, a method for facing a tissue block is provided and can include progressively removing one or more sections from a tissue block comprising a tissue sample embedded in an embedding material, imaging the one or more sections removed from the tissue block to generate imaging data associated with the one or more sections, and determining, based on the imaging data, when a sufficient number of the one or more sections have been removed from the tissue block to expose the tissue sample to a predetermined criteria.

In some embodiments, the method can further include imaging the tissue block, prior to removing the one or more sections, to generate a baseline imaging data of the tissue sample. In some embodiments, the method can further include determining an expected outline, size, or shape of the tissue sample from the baseline imaging data. In some embodiments, the method can further include determining a depth profile of the embedding material from the baseline imaging data to remove a sufficient amount of the embedding material to expose the tissue sample to the predetermined criteria, and illuminating the tissue block with a structured light in a UV range.

In some embodiments, the method can further include comparing the imaging data of the sections including a tissue sample with the baseline imaging data to determine when the tissue sample has been sufficiently exposed. In some embodiments, the imaging data of the sections comprises imaging data of the one or more sections on the tissue block, on a transfer medium, or on a slide. In some embodiments, an outline, size, or shape of the tissue sample in the one or more sections is compared to an outline, size, or shape of the tissue sample expected from the baseline imaging data. In some embodiments, the method can further include determining a depth profile by one or more of disparity, from focus, or light field imaging, and increasing contrast between the tissue sample and the embedding material.

In some embodiments, a method can be provided for facing a tissue block that includes removing, from a tissue block comprising a tissue sample embedded in an embedding material, a thickness of the embedding material configured to expose the tissue sample to a predetermined criteria, subsequently to removing the thickness, progressively removing one or more sections from the tissue block, imaging the one or more sections removed from the tissue block to generate imaging data associated with the one or more sections, and confirming, from imaging data, that the tissue sample has been exposed to the predetermined criteria.

In some embodiments, a histology system can be provided that includes a microtome configured to progressively remove one or more sections from a tissue block, the tissue block comprising a tissue sample embedded in an embedding material, and a vision system associated with the microtome. The vision system can include an illumination system configured to illuminate the tissue block comprising a tissue sample embedded in an embedding material, an imaging system configured to image the tissue block to generate imaging data associated with the tissue block, and a processor in communication with the vision system, the processor being programed to receive the imaging data and determine, based on the imaging data, when the tissue block has been sufficiently faced by the microtome.

In some embodiments, the processor is further programed to determine when the tissue block has been sufficiently faced by recognizing an amount of exposed tissue sample. In some embodiments, the processor is further programmed to determine an expected outline, size, or shape of the tissue sample from a baseline imaging data generated by imaging the tissue block with structured light prior to removing the one or more sections from the tissue block. In some embodiments, the illumination system is configured to illuminate the tissue block with structured light.

In some embodiments, the histology system can further include a transfer medium to transfer one or more sections comprising a tissue sample from the tissue block to one or more slides and wherein to processor is further programmed to compare the one or more sections on the tissue block, on the transfer medium, or on the one or more slides to a baseline imaging data generated by imaging the tissue block with UV light prior to removing the one or more sections from the tissue block.

In some embodiments, a vision system is provided that includes an illumination system configured to illuminate a tissue block comprising a tissue sample embedded in an embedding material, an imaging system configured to image the tissue block to generate imaging data of the tissue block, and a processor in communication with the imaging system, the processor being programed to receive the imaging data and determine, based on the imaging data, an exposure of the tissue sample to a predetermined criteria.

The present disclosure also relates to systems and methods for quality control in histology systems. In some embodiments, a method is provided that includes receiving a tissue block comprising a tissue sample embedded in an embedding material, imaging the tissue block to create a first imaging data of the tissue sample in a tissue section on the tissue block, removing the tissue section from the tissue block, the tissue section comprising a part of the tissue sample, imaging the tissue section to create a second imaging data of the tissue sample in the tissue section, and comparing the first imaging data to the second imaging data to confirm correspondence in the tissue sample in the first imaging data and the second imaging data based on one or more quality control parameters.

In some embodiments, the tissue section is non-conforming if there is no correspondence in one or more quality control parameters in the tissue sample in the first imaging data and the second imaging data. In some embodiments, the one or more quality control parameters include one or more of shape of the tissue sample, size of the tissue sample, or one or more mechanical damages. In some embodiments, the method can further include transferring, using a transfer medium, the tissue section to a slide, and the second imaging data comprises an imaging data of the tissue section on the transfer medium or an imaging data of the tissue section on the slide. In some embodiments, the method can further include comparing at least two of the first imaging data, the imaging data of the tissue section on the transfer medium or the imaging data of the tissue section on the slide.

In some embodiments, the tissue section is non-conforming if there is no correspondence in the shape or the size of the tissue sample in the first imaging data and the second imaging data. In some embodiments, the one or more mechanical damages are selected from the group consisting of tearing, shredding, blade marks, wrinkling, cracking, bubbles, insufficient tissue sample, incomplete tissue sample. In some embodiments, the method can further include identifying as non-confirming a tissue section if one or more mechanical damages are present in the tissue sample in the second imaging data but not in the first imaging data. In some embodiments, the method can further include adjusting one or more operating parameters associated with removing of the tissue section to correct one or more mechanical damages. In some embodiments, the method can further include approving the tissue section if there are no mechanical damages are present in the tissue sample in the first imaging data and the second imaging data. In some embodiments, the method can further include rejecting the tissue block if one or more mechanical damages are present in both the first imaging data and the second imaging data.

In some embodiments, one or both of the imaging steps comprise illuminating the tissue sample with UV light and imaging the tissue sample with a visible range camera to create the first imaging data or the second imaging data. In some embodiments, the method can further include illuminating the tissue section to enhance a contrast between the tissue sample and the embedding material in the tissue sample. In some embodiments, one or both of the imaging steps can include imaging a tissue section at one or more wavelength ranges, creating an imaging data of the tissue section, segmenting the tissue sample from the embedding material based on a color and intensity information in the color imaging data, and identifying a size, a shape or edges of the tissue sample in the tissue section.

In some embodiments, the method can further include imaging the tissue block, prior to removing the one or more sections, to generate a baseline imaging data of the tissue sample. In some embodiments, the method can further include illuminating the tissue block with UV light. In some embodiments, the method can further include comparing the first imaging data, the second imaging data or both to the baseline imaging data. In some embodiments, the method can further include comparing an outline, size, or shape of the tissue sample in the first imaging data, the second imaging data or both to an outline, size, or shape of the tissue sample expected from the baseline imaging data.

In some embodiments, a vision system is provided that include an illumination system configured to illuminate a tissue sample, an imaging system configured to create an imaging data of the tissue section illuminated by the illumination system, and a processor in communication with the imaging system to receive the imaging data and perform one or more quality control analysis based on the imaging data. In some embodiments, the one or more quality control analyses are one or more of a comparative analysis of the tissue section on a tissue block and a slide, an analysis of mechanical properties of the tissue section, an analysis of sufficiency of the tissue sample, or an analysis of sample representation on a slide.

In some embodiments, a histology system is provided that can include a microtome configured to produce one or more tissue sections from a tissue block, a transfer system configured to transfer the one or more tissue sections from the microtome to one or more slides, and a vision system. The vision system can include an illumination system configured to illuminate a tissue sample, and an imaging system configured to create an imaging data of the tissue section illuminated by the illumination system. A processor is in communication with the imaging system to receive the imaging data and perform one or more quality control analysis based on the imaging data. In some embodiments, the one or more quality control analysis are one or more of a comparative analysis of at least two of the tissue section on a tissue block, the tissue section on the transfer system, and the tissue section on a slide, an analysis of mechanical properties of the tissue section; an analysis of sufficiency of the tissue sample; or an analysis of sample representation on a slide.

The present disclosure also relates to system and methods for tracking and printing within a histology system. In some embodiments, a system is provided that includes an information reader configured to read identifying data associated with a tissue block, a microtome configured to cut one or more tissue sections from the tissue block, one or more slides for receiving the one or more tissue sections, and a printer configured to receive the identifying data and print, after the one or more tissue sections are cut from the tissue block, one or more labels for the one or more slides, the one or more labels comprising information associating the one more tissue sections on the one or more slides with the tissue block.

In some embodiments, the system can further include a transfer medium configured to transfer the one or more tissue sections from the microtome to the one or more slides. In some embodiments, the transfer medium includes markings indicative of the identifying data for the one or more tissue sections, the markings being configured to associate the one or more tissue sections with the tissue block. In some embodiments, the system can further include a transfer medium marking device to mark the transfer medium with markings indicative of the identifying data for the one or more tissue sections, the markings are configured to associate the one or more tissue sections with the tissue block.

In some embodiments, the system can further include a visualization system configured to track the one or more tissue sections from the microtome to the one or more slides. In some embodiments, the visualization system is configured to make a comparison between the one or more tissue sections on the one or more slides with the one or more images of the tissue block or the image of the section on the transfer medium. In some embodiments, the visualization system is configured to make a comparison between the one or more tissue sections on the one or more slides, on the tissue block or the transfer medium with a baseline image of a tissue sample in the tissue block generated by imaging the tissue block with UV light prior to removing the one or more sections from the tissue block. For example, the comparison is based on a size, shape and outline of the tissue sample in the one or more tissue sections. In some embodiments, the visualization system is configured to read the one or more labels on the slide and confirm their association with the identifying data on the sample block. In some embodiments, the printer prints the label individually for the one or more samples.

In some embodiments, a system can be provided that includes an information reader configured to read identifying data from a tissue block, a microtome configured to cut one or more tissue sections from the tissue block, a transfer medium configured to transfer the one or more tissue sections to one or more slides, and a printer. A processor can be configured to receive the identifying data, cause the microtome to cut the one or more tissue sections, and subsequently cause the printer to print one or more labels for the one or more slides, the one or more labels comprising information associating the one more tissue sections on the one or more slides with the tissue block.

In some embodiments, the transfer medium includes markings indicative of the identifying data for the one or more tissue sections, the markings being configured to associate the one or more tissue sections with the tissue block. In some embodiments, the system can further include a transfer medium marking device to mark the transfer medium with markings indicative of the identifying data for the one or more tissue sections, the markings being configured to associate the one or more tissue sections with the tissue block. In some embodiments, the system can further include a visualization system configured to track the one or more tissue sections from the microtome to the one or more slides. In some embodiments, the visualization system is configured to make a comparison between the one or more tissue sections on the one or more slides with the one or more sections on the tissue block. For example, the comparison is based on a size and edges of tissue in the one or more tissue sections.

In some embodiments, a method for tracking samples in microtomy is provided that includes reading identifying data from a tissue block, cutting a first set of one or more tissue sections from the tissue block, subsequently to cutting, printing one or more labels for the one or more slides, the one or more labels comprising information associating the one more tissue sections on the one or more slides with the tissue block, and transferring the one or more tissue sections to one or more slides and labeling the one or more slides with the one or more labels.

In some embodiments, the method can further include comparing the one or more tissue sections on the slides to the one or more tissue sections on the block to confirm association of the one more tissue sections on the one or more slides with the tissue block. In some embodiments, the method can further include cutting a second set of one or more tissue sections only after the first set of the one or more tissue sections is placed on the one or more slides and labeled with the one or more labels. In some embodiments, the method can further include comparing the one or more tissue sections on the one or more slides with a baseline image of a tissue sample in the tissue block generated by imaging the tissue block with UV light prior to removing the one or more sections from the tissue block.

BRIEF DESCRIPTION OF THE DRAWINGS

So that those having ordinary skill in the art to which the subject invention appertains will more readily understand how to make and use the surgical apparatus and systems disclosed herein, preferred embodiments thereof will be described in detail hereinbelow with reference to the drawings, wherein.

DETAILED DESCRIPTION

Figure 1:
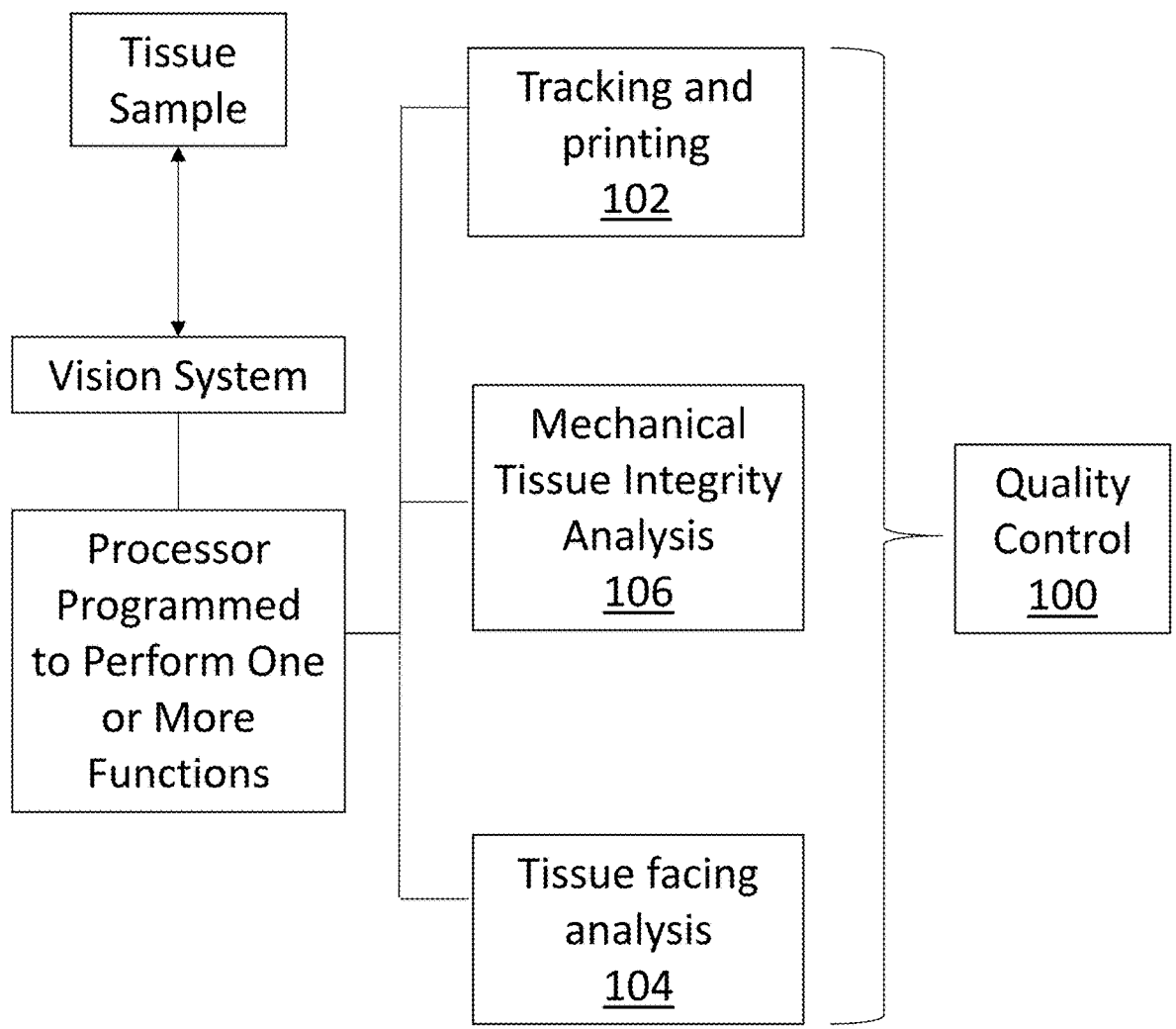
FIG. 1 illustrates an exemplary system for performing quality control analyses of a histology system.

The present disclosure provides systems and methods for various quality control analyses on the tissue samples during microtomy. An exemplary embodiment of systems and methods for quality control of a tissue sample are shown in FIG. 1. Such systems can be configured to provide various types/aspects of quality control 100 including printing and tracking 102, tissue facing analysis 104, and mechanical tissue integrity analysis 106.

As shown, a tissue section can be cut from a tissue sample, such as a sample block. Various quality control analyses can be performed related to the tissue section to determine the integrity of the tissue section. As will be explained in more detail below, one or more analyses can be performed as the tissue section is being transported from the sample block to a slide or other medium or can be performed once the tissue section is located on the slide or other medium. The process can be performed manually or with an automated system.

Various images can be taken of the tissue block and tissue sections for comparison to perform the various quality control analyses. For example, images can be taken, including but not limited to, an image before tissue sectioning to create a baseline image of the block, a face of the tissue block, a tissue section after being cut from the tissue block, a tissue section as it is being transported via a transport system or tape, and a tissue section positioned on a slide. Comparing any of these images can be used to determine if the tissue section is sufficient and be used once positioned on the slide. If a comparison reveals any issues or errors, the tissue slice can be discarded, the tissue block can be discarded, and/or an adjustment can be made to any of the physical components of the system, depending on the types of issue or error that has been identified. Various operating parameters can be adjusted based on the type of the mechanical damages or defects detected using the vision system of the present disclosure. Such operating parameters include, but are not limited to, sharpening or replacing the microtome blade, adjusting hydration time or temperature, replacing the transfer medium, or adjusting the operating parameters of the transfer medium (for example, speed) or pressure applied to the transfer medium against the tissue sections.

In some embodiments, analysis is performed that compares the tissue section to the sample block to match the tissue section to the sample block. In some embodiments, analysis is performed is determine a condition of the tissue section, either during transport or after slide placement. Additional analysis of the tissue section can be performed, as will be discussed in more detail below. Further, various methods can be used to perform quality control, including but not limited to the use of a visualization/imaging system that can be configured to image one or more of the tissue sample block, the tissue section during transport, and the tissue section on a slide such that the images can be used to perform one or more of the quality control analyses.

In some embodiments, histology systems can provide tracking and comparative analysis of cut tissue sections in a manual or an automated tissue transfer apparatus/system. The decision system analyzes/compares one or more parameters or characteristics/features of the cut tissue section on the microscope slide and the sample block. Alternatively, or in addition, the system analyzes/compares one or more parameters or characteristics/features of the cut tissue section on the microscope slide and the cut tissue section (slice) right after it is cut from the sample block. These systems ensure that the sections on the glass slide are properly matched to the tissue sample block. This is the comparative aspect of the quality control system that improves sample tracking in the laboratory.

In some embodiments, a system is provided that can provide feedback to enable self-correction or adaptation. This feedback system provides another aspect of quality control.

In some embodiments, the systems also provide feedback systems of quality control. In some embodiments, for example, once the quality control system sends a flag, a feedback process could be triggered, and as a result various actions can automatically be taken without human intervention. For example, if there is a flag, e.g. a mismatch, examples of downstream actions that can occur can include recalibration of instruments or of algorithms, thus permitting the system/process to self-correct or adapt. In some embodiments, the feedback process can interact with the block facing decision. In a quality control process when a defect is detected, a root cause is searched to fix the issue. As such, when a defect is detected by the quality control process, a predetermined set of possible root causes will be checked. For example, if there are bubbles under the tissue section on the glass this could mean the transfer medium (tape) to glass applicator roller has a malfunction and the user can be warned about this. Or if the tissue is shredded in the auto QC images, the system would force a new sectioning blade exchange at the microtome. Once the root cause is identified one or more operating parameters can be changed as explained above.

For example, in an exemplary embodiment of a feedback system, a QC system suddenly starts generating an increased number of flags for section quality one day. This can indicate that a condition in the system has changed and that corrective action is needed. An increased mismatch rate can trigger a suite of self-tests, and one of those self-tests could then trigger a correction mechanism (e.g., replace the microtome blade). By way of another example, supposing it is noted that the tissue starts being absent on slide at a high rate. This could mean that the facing algorithm is failing or that tissue is falling off of the tape, and again self-tests could trigger corrective actions. It will be understood that these are just provided by way of example as other actions in response to various events are also contemplated in the quality control feedback systems.

It should be appreciated that the feedback loops can be used with the other quality systems disclosed herein.

It will be understood that any transfer medium (also referred to as transport medium) other than tape can be utilized. Therefore, references to tape herein are used for convenience as the systems and methods disclosed herein are fully applicable to other transfer medium not just tape.

Sample Preparation

The sample can be a tissue, organ, organism, frozen liquid, or other biological sample. In some embodiments, the sample can be pre-stained or pre-treated in some other manner to facilitate facing, as will be discussed in more detail below. The process of initial preparation of the sample can include, in some embodiments: a) transfer of the biological tissue when removed from an organism into a fixative, e.g., formalin container; b) after fixation, the tissue is transferred into a labelled tissue cassette; c) after transfer to the cassette, the tissue is processed by i) dehydration via immersion in alcohol to remove water and formalin, ii) clearing via a solvent to remove the alcohol, and iii) applying an embedding material, such as paraffin wax, to surround the tissue in a large block of molten material to create the "sample block." The paraffin is poured over the dried and chemically treated tissue in a mold. In some cases, the histotechnologist presses on the tissue during the molding process but there is always paraffin between the bottom of the mold and the tissue sample. When the block solidifies it provides a support matrix during the tissue sectioning process. That is, when the paraffin is cooled down, it gets removed from the mold so it is in the form of a paraffin block with tissue embedded in it. The molded tissue paraffin combination is supported on a plastic cassette. The plastic cassette provides the features for the tissue to be held in a microtome clamp. On the opposite side of the cassette where it is clamped the paraffin/tissue combination is cantilevered. This side corresponds to the bottom of the mold in the previous step. The excess paraffin due to molding needs to be removed to expose the tissue so tissue sections can be identified and analyzed/evaluated. The thickness of the excess paraffin varies greatly from tens of microns to a few hundred micron-meters.

The plastic cassette holding the tissue in the paraffin mold could have different colors. In some embodiments, the quality control system detects a color of a cassette holding the sample block to cross-check a sample type. In some laboratories they assign these colors to certain tissue types. For example, the lab may choose to use pink cassettes for breast tissue. When the system detects a certain color that is significant to the lab it could cross check the sample type with the lab data to ensure the colors match. This provides an additional backup of the quality control system. Also, this data can be used during image processing so that variations in image background is effectively filtered out.

When the tissue block is placed in the chuck for cutting (sectioning), the paraffin side faces the cutting blade of the microtome, but the molding process is not perfect, and the tissue is not on the surface of the paraffin but under a paraffin layer. The new block is first subjected to sectioning with relatively thick sections to remove the 0.1 mm-1 mm layer of paraffin wax on top of the tissue sample. After removal of this superficial paraffin layer and when the complete outline of the tissue sample is exposed, then the block is ready to be sectioned. Once this paraffin layer is removed, in clinical and research settings, the tissue is typically sectioned to 3 µm to 5 µm thickness. This process for removing this paraffin layer and exposing the large cross section of the tissue is referred to as block facing. After removal of this superficial paraffin layer, the tissue sample is exposed and ready to be sectioned and put on the tape for transfer to a glass slide for analysis, e.g., pathology or histology. That is, when enough paraffin has been removed (the block is referred to as "faced"), subsequent block sectioning provides tissue sections for placement on glass slides for analysis (processed further for evaluation).

Note that although paraffin is described herein as the embedding material, it should be appreciated that other embedding material could be utilized, including frozen sections.

Visualization System

The histology system includes, in some embodiments, a visualization system that can include an illumination system and an imaging system. The illumination system aids in imaging/discernment/differentiation of the tissue and paraffin which can then be imaged by the imaging system for evaluation. Thus, the differentiation of the tissue from the paraffin is enhanced for the images taken on the sample block, tape, and/or slides. Various illumination systems and imaging systems are discussed below. In some embodiments, the visualization system utilizes appropriate optics (illumination system/method, imaging system/method, detection system/method) to be followed subsequently by computational processing. This computational processing provides comparative assessment of images for quality control, as will be described in more detail below.

It should be understood that the term "image" includes data in any form or format generated by the imaging system that is representative of an image or can otherwise be analyzed to determine information about the subject being imaged. The images taken by the visualization system can be used such that the images themselves can be processed, analyzed, and/or compared for quality control analyses, or any data representative of the image or the subject being imaged, including data for creating the image or data representative of the image or the subject being imaged, can be used.

In some embodiments, the visualization system can be configured to a) take an image of i) the tissue sample block containing tissue embedded in an embedding material, ii) a block face of the tissue sample block, iii) a tissue section after cut from the sample block, iv) a transfer medium carrying the cut tissue section or v) a slide containing the cut tissue section; and b) take an image of the cut section from the sample block either on a slide or a transfer medium (e.g., tape). In some embodiments, this can be done to enhance differentiation of tissue from the embedding material in which the tissue is embedded for enhancing images taken by the imaging device.

Figure 2:
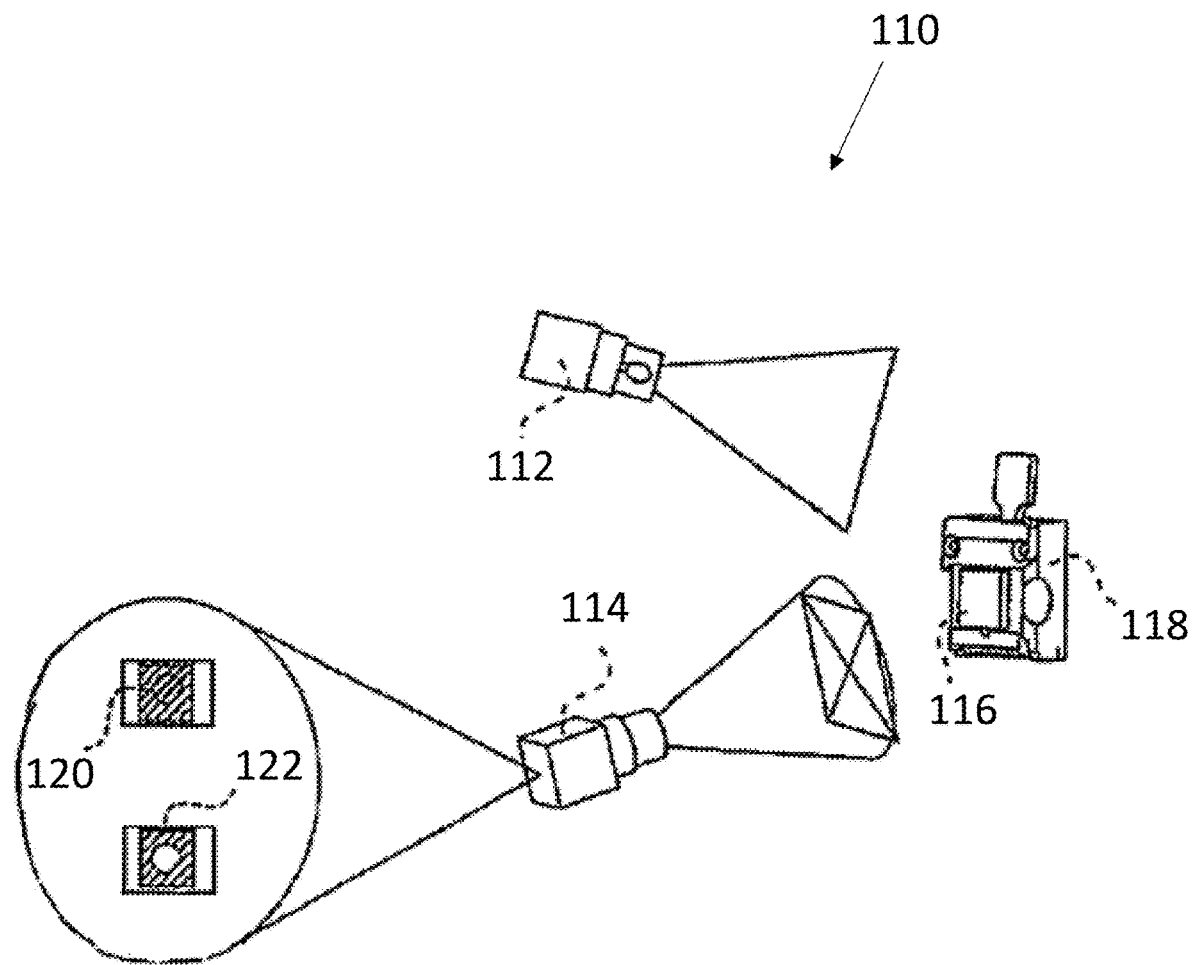
FIG. 2 illustrates one embodiment of a lighting and imaging system to increase the contrast of the tissue with respect to the paraffin.

FIG. 2 illustrates an embodiment of a visualization system 110 that includes an illumination system 112 and an imaging system 114 that can be used to image one or more of the tissue block, a tissue section associated with a transport system, and a tissue section associated with a slide. As shown, the illumination system 112 illuminates the sample block 116 supported on the sample supporting chuck 118. Note reference numeral 122 illustrates the sample block under high contrast lighting where the contrast between the paraffin and tissue is pronounced; reference numeral 120 on the other hand illustrates the sample block under low contrast lighting where it is more difficult to differentiate the tissue and paraffin. The illumination can alternatively or in addition illuminate the tissue section after cut from the block. Various types of illumination systems are described below. An imaging device, e.g., a camera, takes images of the sample block 116 for evaluation. Classical image processing techniques, as described below, can be utilized for evaluation. Recent Artificial Intelligence based image processing techniques can also be utilized where the teaching and testing phases are all the done at the development site.

As shown, the imaging system 114, e.g., a camera, images the block face of the sample block 116 as the illumination system 112 illuminates the block face such that the tissue to paraffin contrast is increased. This imaging system in some embodiments can be triggered by the software or hardware to take consecutive images of the block 116 as it is sectioned, done by non-human intervention. Classical image processing techniques based on edge detection (finding the boundaries of the object within the images by detecting discontinuities in brightness), color, hue, or intensity tracking in consecutive images, or similar attributes of each pixel and their variation in the context of the image can be utilized. The imaging system can be part of the automated sectioning system, and the automation system has the capability to synchronize imaging with the block sectioning whether through software operations or through hardware triggers such as position sensing switches. As noted above, images can alternatively or in addition be taken of the cut tissue section after cut by the microtome.

In some embodiments, line scanning is utilized. Line scanning involves building the image one line at a time using a line sensor passing in linear motion over an object. Thus, in this method, the area of the block-tissue ribbon interface at the blade during cutting is scanned after the tissue block is cut by the blade. The software then stitches the lines and creates an image of the section cut. The line of section right over the blade can be imaged and a 2D image can be constructed from a series of line images. The line imaging device in some embodiments can be placed inside the roller for line scanning as the tape moves past the roller or as the roller moves along the tape. In some embodiments, the imaging device can be placed outside the roller. In either case, the imaging can be tied to tape transport with the transmitted light on one side of the tape. The illumination device could be inside or outside the roller. Several advantages of line scanning compared to taking a 2D image of a tissue section already cut include i) the reconstructed line scanned image will be a "flat" representation of the tissue face and will not have a risk of being wrinkled or rolled; ii) it is easy to determine the boundaries of the section beginning and end; and iii) all parts of the image will be in focus because the blade and the cutting forces provide a consistent location for the tissue section.

The system can utilize a one-dimensional scan across the sample, a profile or an image all at varying degree of sampling resolution.

Imaging the tissue section on the slide can also provide downstream use for digital pathology. In scanning the tissue in a slide scanner and processing it computationally, it is beneficial to first determine where in the slide the tissue is sitting (geometrically). This is beneficial for the auto-focus algorithms in the scanner, or to reduce computational steps in the computer-aided diagnostics where tissue is segmented. The systems described herein, e.g., UV illuminated fluorescent mode, provide clear visibility to permit easy segmentation. Such segmentation/location information can be passed back to the laboratory information system to be integrated downstream with a scanner or a computer aided diagnostic platform, when the slide with that tissue section is being used.

In some embodiments, illumination and signal capturing using Raman Spectroscopy can be used to identify the paraffin matrix over the tissue. Raman spectroscopy can be used to determine vibrational modes, rotational modes or other low frequency modes of molecules to provide a structural guide to identify molecules. As the light excites the molecules, the molecules will reflect light in a different wavelength, and the wavelength thereby allows detection of the composition. That is, Raman spectroscopy detects certain materials based on the scattered light quantitatively. The tissue itself is impregnated with paraffin but the density is less than the paraffin in other areas of the block. Progressive image captures with Raman spectroscopy of the block after each section gives a quantified metric utilized for the comparison. This method could be used in parallel with visible light imaging to determine the tissue area a priori which would increase the efficiency of the implemented method.

In some embodiments, the imaging system comprises a sensor and a radiation system. The method/system captures signals from the paraffin portion of the tissue block or cut section such that the level of the signal decreases when the paraffin over the tissue area gets thinner. This is due to the fact that different materials absorb different radiation wavelengths, and tissue and paraffin radiation absorption wavelengths are different. As the paraffin layers over the embedded tissue are removed, the absorption spectra (e.g., IR absorption spectra) will change. By tracking this change over consecutive images, the absorption levels correlate with the amount of paraffin over the embedded tissue. In this manner, the amount (or removal) of paraffin can be determined by comparative or computational processes.

For the tissue on the tape or on the slide, either reflection-mode or transmission-mode may be used. It may be beneficial to utilize the transmission mode in terms of location of the light sources and cameras. In particular, the imaging of the section on tape can be done by embedding the light source or the camera inside a transparent roller (or a roller with a transparent window), using either a line source or a line camera.

The illumination system can emit light in UV, near IR, IR, or visible/broadband ranges, for example. The emitted light may have different colors. In some embodiments, the illumination system can include LEDs, OLEDs, lasers, light bulbs or similar light emitting devices or materials. As also shown, the imaging systems can include various areas to take images including the tissue block or the tape or on the glass slide. A computation system processes the images, for example quantitatively, for identity tracking.

It should be understood that these various illumination and imaging systems described herein, and various associated methodologies, are provided by way of example as other illuminations systems can be utilized to enhance differentiating the tissue and the paraffin (or other embedding material), and other imaging systems can be utilized and other computational systems or comparative processing systems can be utilized for identity tracking and sample integrity checking. Also, any combination of the illumination systems and/or any combination of the imaging systems can be utilized.

Light (coherent or non-coherent) can be used via absorption, refraction, scattering, raman scattering, fluorescence, phosphorescence, interference and wavelengths can be continuous or discontinuous distributions anywhere in the spectrum from x-ray to radio waves or any combination of these modalities. Transmission of reflectance mode can be utilized.

In some embodiments, the imaging system can include a plurality of imaging devices for imaging the sample block for quality control as described herein. The imaging devices can work in unison to create a single 3D image of the sample block. Various types of imaging devices can be used, including but not limited to a visible light camera, spectrometer, a multispectral camera, a hyperspectral camera, a mid-wave infrared (MWIR) camera, and a Raman spectroscopy camera.

Hyper-spectral imaging of tissue in paraffin blocks allows discernment of the unique absorption of paraffin to be identified separately from the various tissue reflection peaks in a single image. With a hyperspectral cube based on 3-5 nm steps in frequency the specific reflectance peaks of paraffin and tissue can be isolated and the depth of the tissue can be identified.

Multi-spectral imaging utilizing an array or series of illumination sources from the UV through to the infrared can allow for the interrogation of tissue and paraffin at unique spectral lines with multiple exposures at different color frequencies that elicited specific absorption or reflection characteristics of the tissue in question.

In some embodiments, the tissue block may be illuminated with a structured light and the returned light can be used to determine various characteristics of the tissue block, the tissue sample of both. For example, the outline or cross-sectional area of the tissue sample or the depth profile of the tissue block can be determined using the structured light. In some embodiments, the depth profile is the thickness of the embedding material to be removed. In some embodiments, the removal of such thickness can expose the tissue sample to a pre-determined criteria. In some embodiments, the structured light refers to an illumination of the tissue block in a specific pattern. In some embodiments, the structured light may be spatially structured, that is, the tissue is illuminated in a geometrically structured pattern, such as a grid, stripes, concentric circles, etc. In some embodiments, the structured light may be spectrally structured, that is, the tissue is simultaneously illuminated by light having different wavelengths. In some embodiments, the wavelength may be selected from different intensities, bands or colors. In some embodiments, the spectrally structured light can be in the same or predominantly the same intensity range (for example, UV), but have different specific wavelengths within that intensity range. In some embodiments, the spectrally structured light could constitute light predominantly from one or more frequency bands, such bands tailored to the optical properties of tissue molecules, such optical properties including, for example, fluorescence absorption and emission spectra. As an example, a wavelength range with predominantly UV radiation could give rise to strong autofluorescence from certain tissue compartments, facilitating the subsequent processing steps in the invention.

Laser dot diffusion can also be used. A green laser source at 515 nm and a Diffractive Optical Element (DOE) can be used to create an array of laser dots on the paraffin tissue block thereby sampling the dispersion across the whole of the block in a single image. Using different DOEs different size laser arrays can be projected on the surface of the block. Alternatively, one can move the block and take one or more images to increase the laser dot density on the surface of the block. The image of the tissue block is taken while it is illuminated with the laser DOE. One or more channels of this image can be analyzed to determine the light scatter. For example, when the green laser source is used to illuminate the block, the green channel would have the highest response. One can also use the gray value of the image for the analysis.

In some embodiments, multiple cameras are provided adjacent the block face for capturing the images of the block face simultaneously. The cameras and their software can use inherent geometric features of the block or the mechanisms around the block to orient each image to the same reference geometry. The images from multiple cameras can be used to construct a 3D image of the tissue in the block. Such a 3D image would increase the speed of facing the block because the microtome can predetermine how much to face the block.

The images from multiple cameras can also be used for enhancing the 2D image quality by merging multiple images taken from different angles. The clarity of images would increase when more images are processed to create a single image. This can be used for image enhancement of the sample block face, cut tissue section and/or the slides having the cut tissue sections deposited thereon.

Another way to enhance imaging is to mount the imaging device, e.g., camera, on a computer-controlled motion stage, the stage movable to a variety of positions. In this manner, a plurality of images of the sample block can be taken from different positions along the motion path of the stage. Alternatively, the block or the tissue on the glass slide may be moved with respect to the camera to have a similar effect. Thus, the relative motion of the imaging device with respect to the block or with respect to the sample can be utilized, with relative movement denoting movement of the imaging device, movement of the block or glass slide, or movement of both the imaging device and the block or glass slide. The images could be processed to create a single image or select images utilized for comparative analysis.

In some embodiments, the imaging equipment, e.g., the digital cameras, are housed within a closed chamber. Within the closed chamber, radiation sources with controlled polarity and wavelength can be provided to illuminate the biological tissue sample inside the enclosed chamber to enhance imaging. The radiation sources can have dynamically adjustable polarity and wavelength while the biological sample is being imaged. Such illumination can be provided for the tissue on the sample block and/or the cut tissue section on the slide. The system can include various software algorithms for performing different analyses. For example, an algorithm can be utilized to determine the depth of the biological tissue sample under the paraffin, an algorithm can determine the whole or partial 3D shape of the biological tissue embedded in the paraffin and/or an algorithm can determine the largest surface area cross section of the biological tissue and the depth of said cross section. Another algorithm which can be provided is to extract biological tissue physical properties from the images.

For example, the algorithm could determine physical properties including but not limited to largest tissue outline, number of pieces of tissues in the sample (paraffin) block, and depth of each piece in the block. In some uses, the paraffin block may have multiple pieces of tissue in it. These may be the same tissue cut into multiple pieces or multiple tissue samples collected at multiple points from the patient. Placing multiple tissue pieces in the same block helps laboratories decrease the tissue staining cost. The feature (algorithm) makes sure all the tissue pieces are cut in the same section, that is, they are in the same plane.

In some embodiments, for comparative analysis, a projection system projects an orientation pattern on the block face and the same pattern is projected on the slide. A software algorithm can be used to determine the relative orientation of the biological tissue sample in the paraffin block and the tissue on the slide.

The quality control system of identification matching can be used with any of the apparatus/systems and methods described herein.

Tissue Block Analysis

Figure 3:
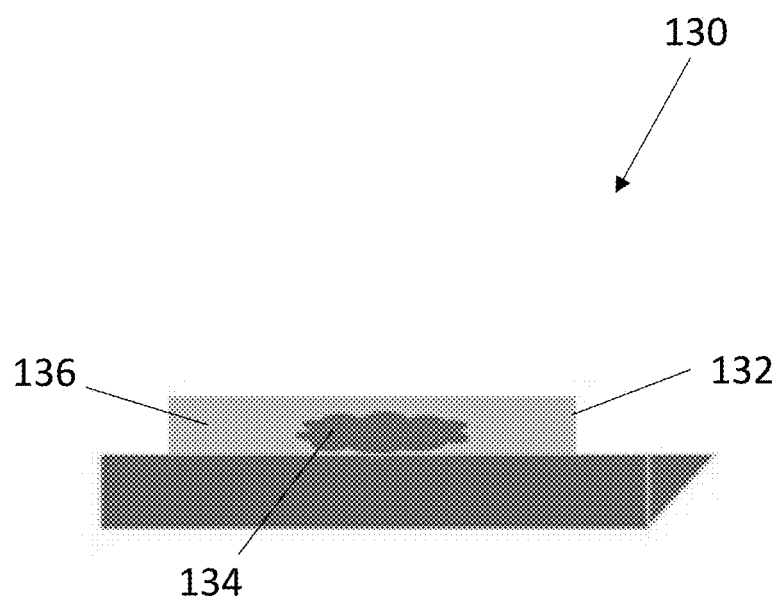
FIG. 3 illustrates an exemplary tissue block showing a tissue inside an embedding material.
Figures 4A, 4B, 4C, 4D, 4E, 4F:
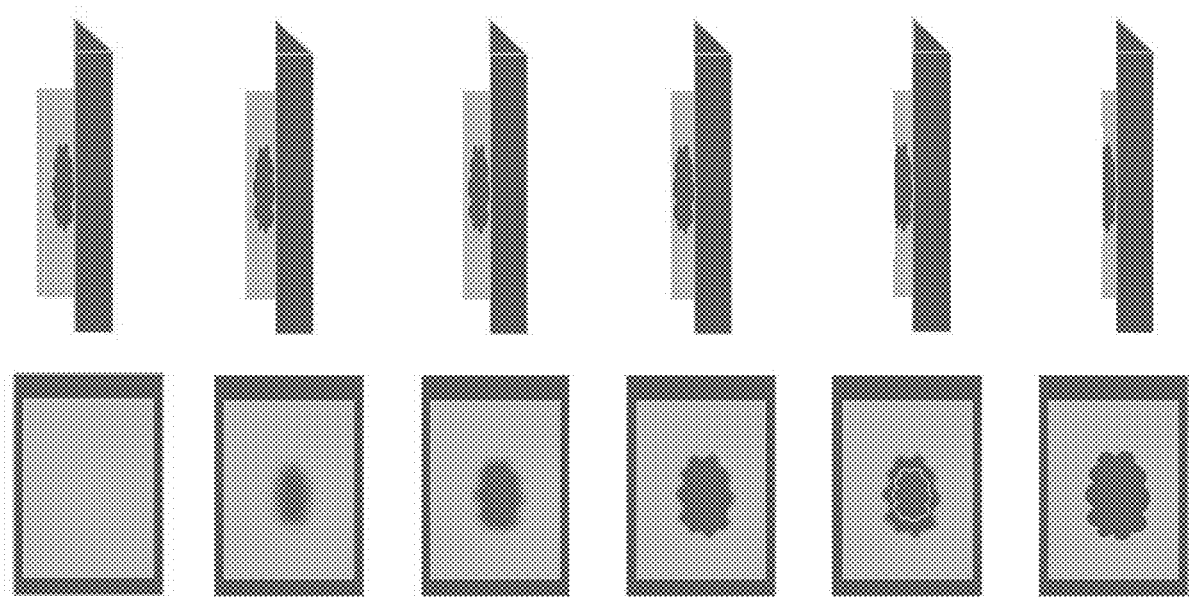
FIGS. 4A, 4B, 4C, 4D, 4E, and 4F illustrate a progression of images from a naive block to a fully faced block.

In some embodiments, one or more images can be taken before tissue sectioning of a complete tissue block. In some embodiments, a cross-sectional image can be taken at a known depth into the tissue block to estimate the location, size, and shape of the tissue within the block. One or more of these images can be used to create a depth profile of the tissue embedded in the tissue block. In some embodiments, an image of an estimate of the composition of the entire tissue block can be created. The tissue block can be illuminated, using the visualization system as described above, such that the illumination light causes the tissue inside the tissue block to fluoresce. While various illumination types can be used, in some embodiments, the tissue block can be illuminated with UV light such that the UV penetrates through the embedding material around the tissue and causes the tissue sample buried in the embedding material to fluoresce. Thus, the tissue embedded in the embedding material can be fully outlined within the block. This can provide as baseline image that can be used for various comparisons to exposed tissue on the face of the tissue block, on the transport system, and on the slides after transport. An exemplary baseline image of an entire tissue block 132 is shown in FIG. 3. As shown, the baseline image 130 includes a tissue sample 134 embedded in an embedding material 136 to form the tissue block 132.

This baseline image of the total composition of the tissue block can be used in a variety of the methods disclosed below. For example, when determining whether the tissue block is faced, an image taken of the block face can be compared to the baseline image. Thus, a comparison can be made between the "faced" area of tissue and the "buried" area of tissue from the baseline image as it related to block facing.

The baseline image can also be used for other quality control analyses. For example, images of tissue sections cut from the tissue block, tissue section on a tape, or tissue sections on a slide can be compared to the baseline image. The tissue sections can be compared to the "buried" area in the baseline image to determine integrity of the tissue section, completeness of the tissue section, and/or physical properties of the tissue section or confirm that the tissue section originates from a specific block.

For example, as is described in more detail below in connection with FIGS. 4A-4F, the initial sections will only have the embedding material (FIG. 4A), but subsequent sections (FIGS. 4B-4F) will include a tissue sample and the outline of the tissue samples in the sections can be compared to the expected outline from the baseline image for facing, tracking and mechanical integrity decisions. In some embodiments, the system can determine an outline of the tissue on the sample block and an outline of the cut tissue section on the transfer medium or on the slide to determine if a match is present.

Block Facing Methodologies

In some embodiments, systems and methods are provided for facing of biological sample tissue, including facilitating and improving the block facing decision to determine when the tissue layer, embedded in paraffin or other embedding material, has been reached, i.e., detection of full facing of the tissue block. In some embodiments, this can include decision systems and methods for tissue block facing assessment and detection in an automated apparatus. The systems/methods increase the speed of sectioning and the quality of the eventual sections. In some embodiment, facing the tissue block relates to the amount of embedding material that needs to be removed. For example, a depth profile of the tissue block can be used, such that the depth profile relates to a thickness of embedding material that can be removed to exposed the tissue sample to a pre-determined criteria that relates to a distance between the surface of the embedding material and the tissue sample. For example, the pre-determined criteria can be an amount, or depth, of material such that when removed from the face of the block can reach a surface of the tissue sample, or the pre-determined criteria can be amount of material such that when removed a sufficient cross-section of the tissue sample on the block face is revealed. The cross-sectional area of exposed tissue can vary. In some embodiments, the criteria can be between 20% and 60% of the cross-sectional area of the tissue sample. In some embodiments, the criteria can be between 20% and 80% of the cross-sectional area of the tissue sample. In some embodiments, the criteria can be between 40% and 60% of the cross-sectional area of the tissue sample. It will be understood that the amount of cross-sectional area of revealed tissue sample can vary and be any amount.

In some embodiments, image-based decision systems and methods for tissue block facing assessment and detection can be used. A machine vision system can be used for facilitating and improving the block facing decision to determine when the tissue layer, embedded in paraffin, has been reached, i.e., detection of full facing of the tissue block. This machine vision system for automating the block facing decision has application in automated transfer of cut tissue sections to supporting (carrying) media, e.g., tape, for subsequent transfer to microscope slides. In some embodiments, a system and method of computational processing is provided after the visualization system utilizing optics as disclosed herein is operated. Thus, the visualization system utilizes appropriate optics (illumination system/method, imaging system/method, detection system/method) to be followed subsequently by computational processing. This computational processing provides comparative assessment of images to determine the status of the block facing.

In some embodiments, the illumination and imaging systems can be used to increased contrast between the tissue and paraffin sections of the tissue block, as shown in the progression of images of FIGS. 4A-4F. For example, the illumination system can emit illuminating wavelengths to enhance the contrast between the tissue and paraffin. In some embodiments, this allows the system to determine a status of facing of a block containing a sample of tissue embedded in an embedding material. The method comprises the steps of a) increasing a contrast of the tissue and the embedding material to enhance differentiation of the tissue and embedding material, which can include the step of illuminating one or more of i) a block face of the tissue sample block or ii) the section transport medium or iii) the slide, (for example, utilizing UV radiation); b) imaging the tissue and embedding material; c) processing the images to assess when the block is faced; and d) after the block is faced transferring the tissue to a tissue carrying medium. The progression shows five images by way of example to illustrate the process from the initial naïve block at image 1 to the fully faced block at image 5. While FIGS. 4A-4F illustrate a series of 6 images, it will be understood, however, that any number of images can be used to achieve the objectives. Six images are shown for ease of description. More specifically, in the images shown in FIGS. 4A and 4B, the target tissue section is fully covered by the paraffin, so the first n-sections will be have to tissue sample, followed by section with a faint outline of tissue discernable. In the image shown in FIG. 4C a section of the paraffin has been removed but the tissue is still covered by the paraffin, although a larger tissue outline is shown, and in the image shown in FIG. 4D, more of the paraffin has been removed but there is a still a thin layer of paraffin over the tissue In the image shown in FIG. 4E, the tissue section is shown within the white outline, with the paraffin still around the edges (outside the boundary/periphery defined by the outline) and in the image shown in FIG. 4F the fully faced block is illustrated with the entire tissue section exposed. Note the paraffin block is shown schematically as having a planar top (exposed) surface, however, it should be understood, that the block does not necessarily have a flat surface as shown.

The facing decisions can be achieved using a manual or automated system. In some embodiments, an automated system for determining a status of facing of a block containing a sample of tissue embedded in an embedding material is provided in an automated apparatus and includes an imaging device for differentiating the tissue from the embedding material such as paraffin, and in response to the differentiating of the tissue and embedding material, the apparatus determines when the block is fully faced and in response to determining when the block is fully faced the apparatus automatically cuts and transfers sections of tissue from the block for subsequent analysis. In some embodiments, after determining facing of the block is complete, the system automatically stops facing. In some embodiments, after determining facing of the block is complete and the system automatically stops facing, the cutting and transfer of tissue sections to tape automatically starts, and the tissue sections can be mounted on slides.

Various parameters/characteristics can be used to assess the status of facing of the block and make a determination about whether or not the block is fully faced. In some embodiments, a characteristic of the sample block or the tissue section can be determined after being cut from the block. In some embodiments, an evaluation, e.g., measurement, can be made of the sample block itself or the cut tissue section itself. In some embodiments, a comparative analysis of the sample block or cut tissue section can be made to a prior evaluation, e.g., measurement. In some embodiments, the sample block can be cut to a predetermined depth. It will be understood that any combination of these various parameters/characteristics can be used to make the facing determination.

In some embodiments, an automated system is provided to enhance/facilitate the block facing decision in an automated tissue transfer apparatus where the sample block is sectioned, the tissue is transferred to tape or other media and transferred to a glass substrate which is suitable for analysis under a microscope after further processing, as will be discussed in more detail below.

The sample block can be examined from various angles such as perpendicular to the front face, at a glancing angle, perpendicular to the side face or at a glancing angle or any combination of these.

Block measurements can be used or just cut sections can be used, or both can be combined.

In some embodiments, automated determination/decision making for block facing is achieved by enhancing differentiation between the paraffin and tissue and determining via the imaging system when block facing is complete. In some embodiments, this can be achieved using the illumination system and imaging system described herein. The illumination system can aid in discernment/differentiation of the tissue and paraffin which can then be imaged by the imaging system for evaluation. Thus, the differentiation of the tissue from the paraffin is enhanced, and the images taken, on the block, holder, tape, and/or other locations. For example, the machine vision system can enhance the assessment of when the tissue layer, embedded in paraffin, has been reached, i.e., when thick sections of paraffin wax on top of the tissue sample on the sample block have been removed to expose the tissue sample so the tissue sample can be sectioned, transferred to a glass slide and processed further for evaluation.

Figure 5:
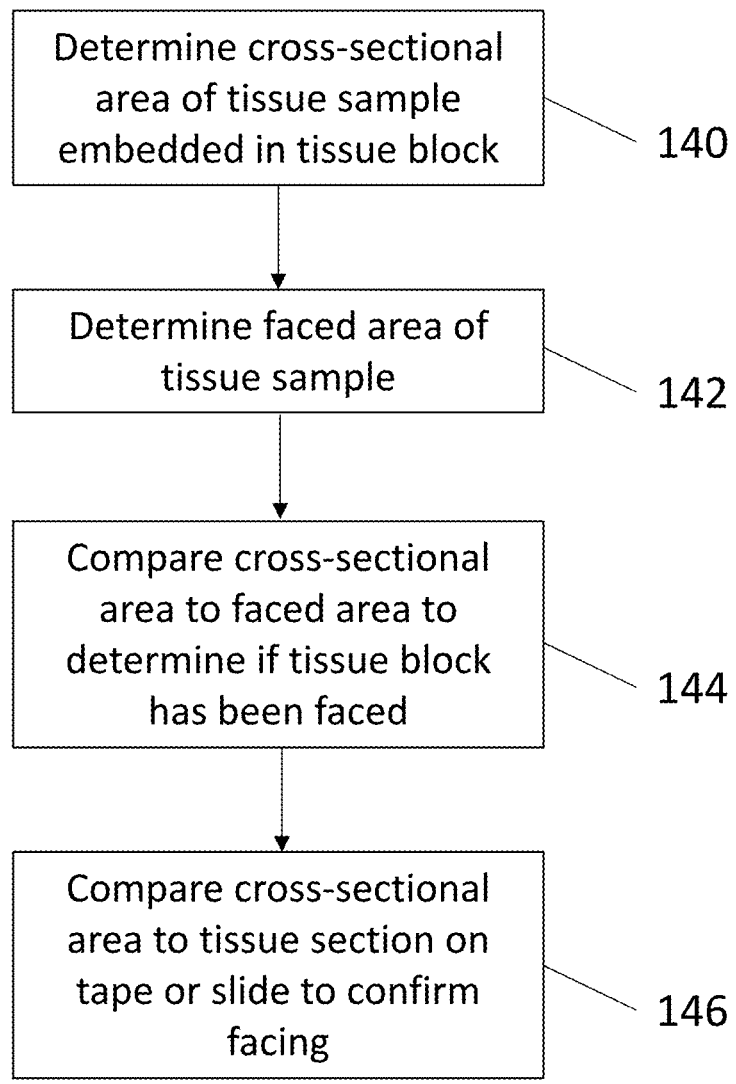
FIG. 5 is an exemplary flow chart illustrating a method for comparing an image of a tissue section with a baseline image of a tissue block.

As shown in FIG. 5, in some embodiments, the baseline image of the tissue sample can be used to assist in the facing decisions. In particular, in step 140, a cross-sectional area of buried tissue can be determined using UV fluorescence to create the baseline image. In step 142, as tissue sections are being removed from the tissue block, a faced area of the tissue can be determined using one of many alternative methods. In step 144, the baseline image and the image of the block face can be compared to make a judgment as to facing. For example, as shown in FIGS. 4A-4F, as progressive sections are removed from the tissue block, the outline of the tissue sample in these sections will progressively change. In some embodiments, the system can decide when the facing is complete based on the expected outline of the tissue sample based on the knowledge of the baseline image. For example, the facing can be completed when only the top portion of the tissue is reached. Alternatively, the facing may be completed when the mid-section of the tissue sample is reached. Such decisions can be made by comparing the outline of the tissue sample in the sections to the expected outline of the tissue sample from the baseline image. In step 146, confirmation of the buried-tissue area to the section-on-tape area (for example, using UV illuminated image on tape) to confirm the facing judgment made in step 144.

Figure 6:
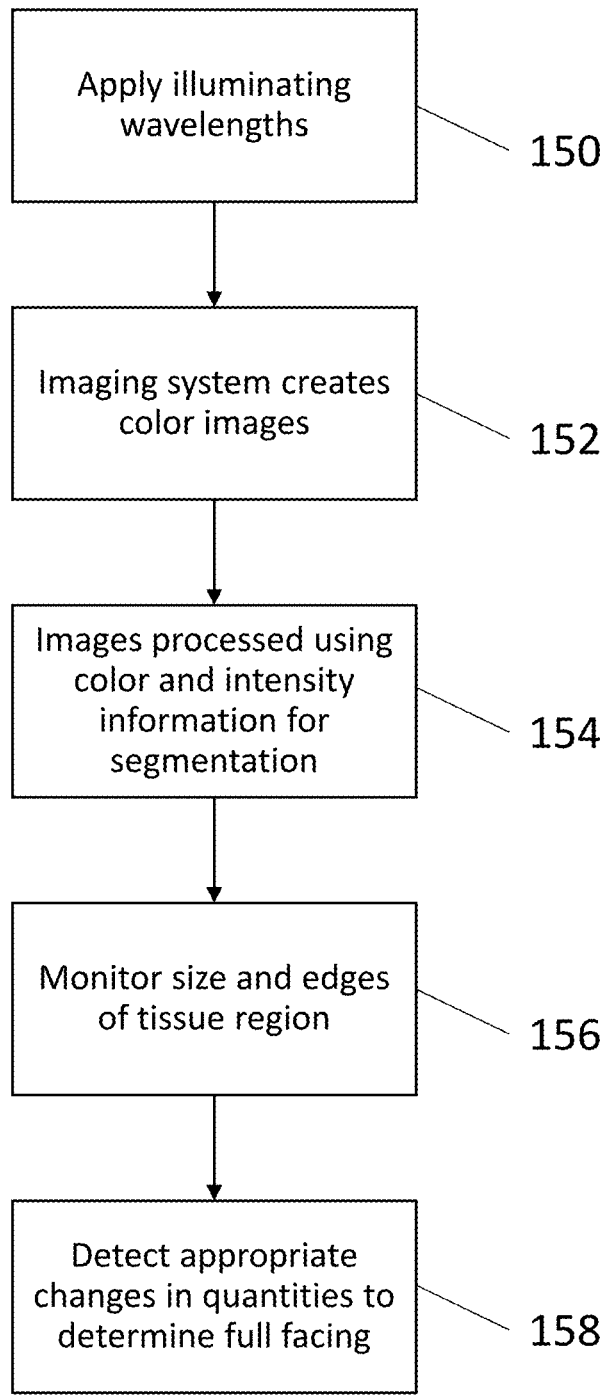
FIG. 6 is a flow chart illustrating a method for making a facing decision.
Figure 7:
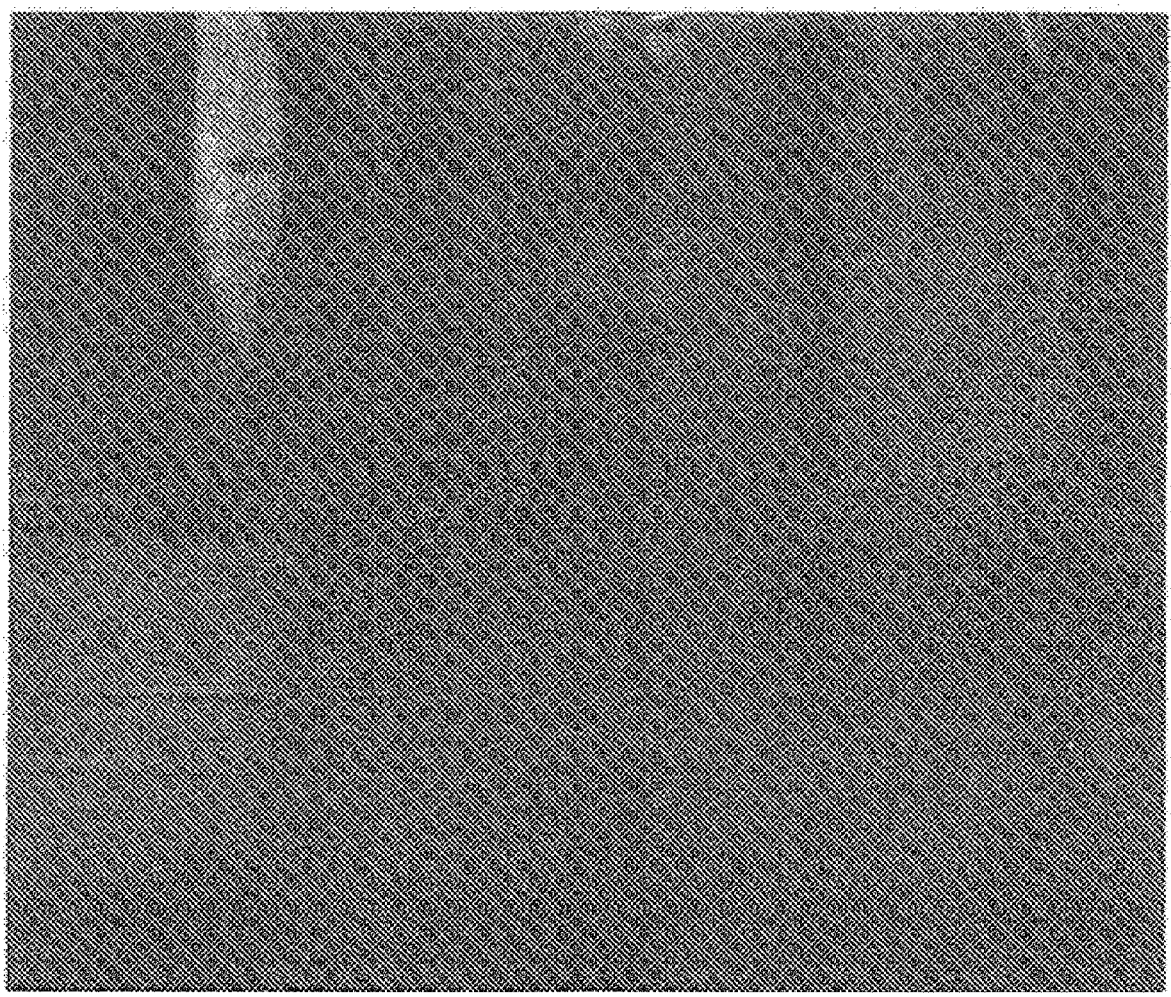
FIGS. 7 and 8 are images of a tissue ribbon under UV lighting.
Figure 8:
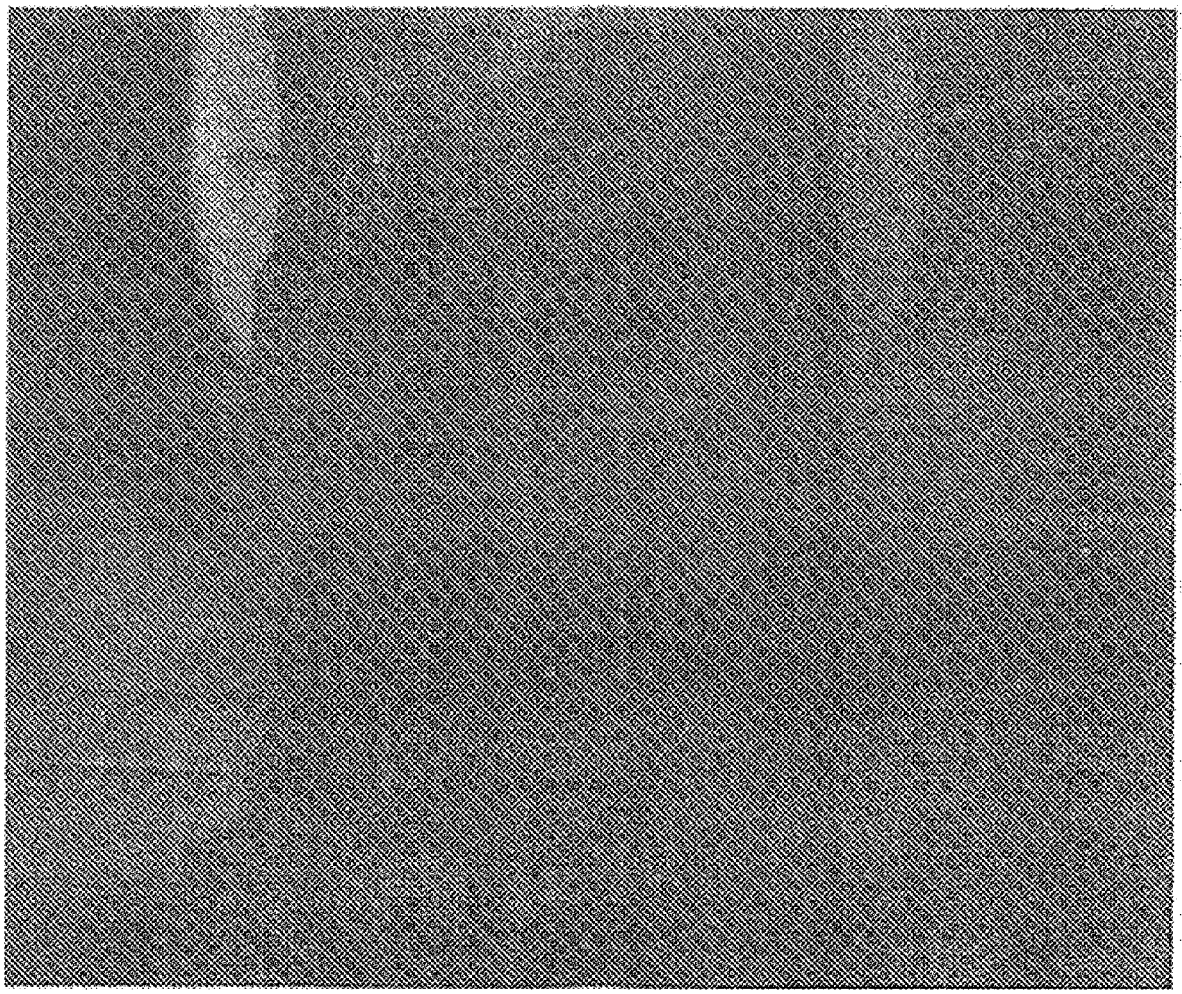

In some embodiments, as shown in the flow chart of FIG. 6, a UV method/system can be utilized for the facing decision. The steps are as follows: i) illumination by a pre-selected range of wavelengths (e.g., the UV range) (step 150); ii) using appropriate optics in step 152 to create images on a color camera, i.e., a camera that simultaneously takes images in multiple wavelength ranges such as an RGB camera for example; iii) using color and intensity information from the resulting image to segment out the portions of the block where tissue resides in step 154; iv) monitoring the size of the tissue region, and the edges of the tissue region in step 156, as the facing cuts occur; and v) detecting an appropriate change in the quantities monitored in step (iv) leading to the "facing decision" in step 158. As discussed above, these steps are automated and do not require user input during the process. Note that intensity in a gray scale can be used as alternative to color images. FIGS. 7 and 8 are exemplary images of a tissue ribbon under UV lighting.

Figure 9:
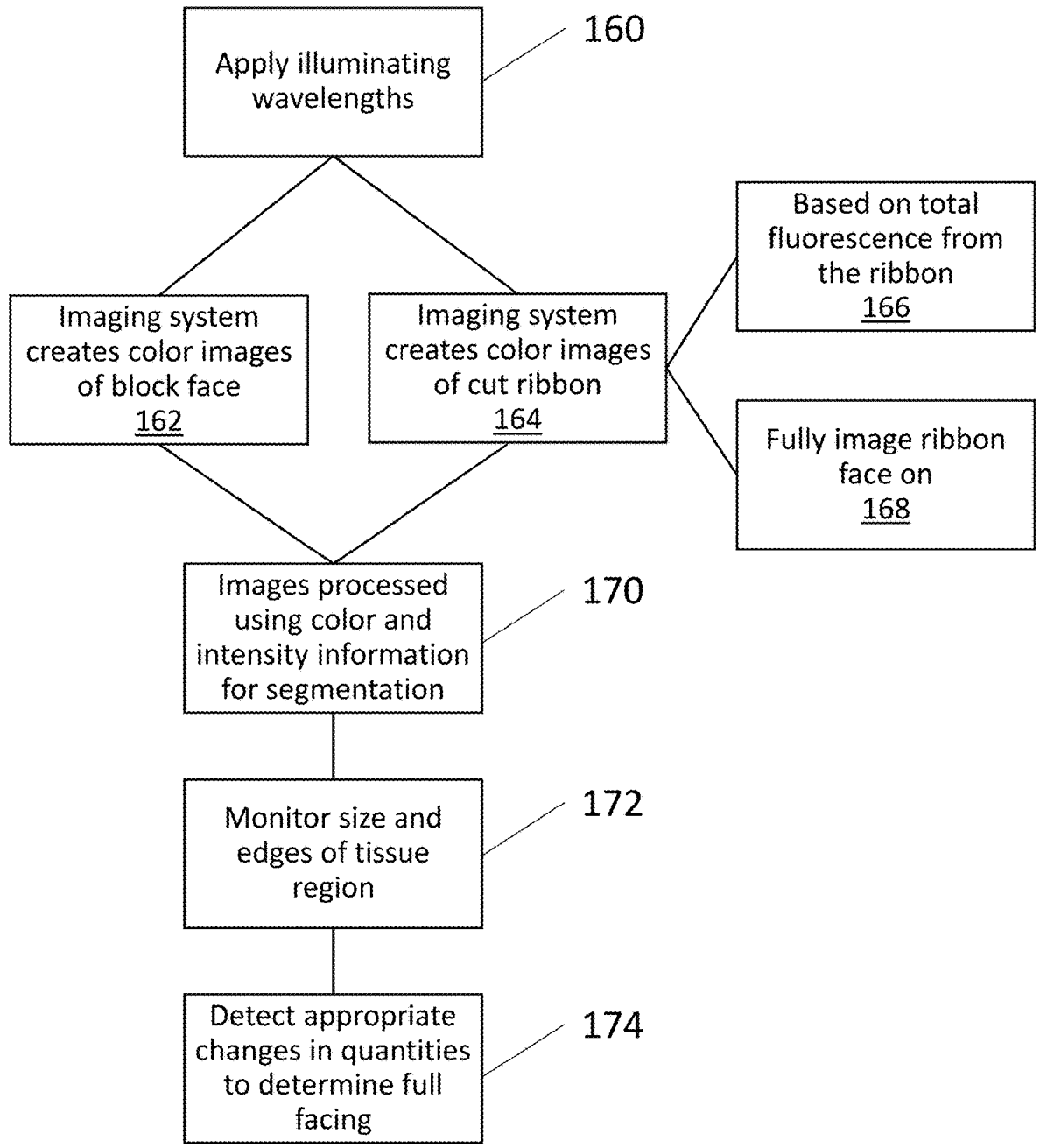
FIG. 9 is a flow chart illustrating a method for making a facing decision wherein the cutting ribbon and block face are imaged.

In some embodiments, as shown in the flow chart of FIG. 9, UV radiation or other wavelengths can be used to enhance the tissue/paraffin contrast, but observations are made of both the block face and the cut ribbon. After applying illuminating wavelengths of light in step 160, the imaging system creates a color image of the block face (step 162) and of the cut ribbon (step 164). In this method, first appearance of tissue-fluorescence in a cut section signals that "facing" has occurred. This can be done either based on the total fluorescence from the ribbon, in step 166, (so that there is no need to fully image the ribbon face-on) or alternatively, the ribbon could be imaged face on, in step 168. Such imaging could be facilitated in some embodiments by having the ribbon on the tape and comparing the image of the ribbon with the image of the block face (each with UV illumination). The images are processed and evaluated for tissue segmentation (or other characteristics/parameters described herein), in step 170, as the size and edges of the tissue regions can be assessed and quantified (step 172) to detect the changes to determine the status and completing of facing (step 174). In another alternate method, the imaging is done only on the cut ribbon e.g., when on and/or off the tape as an alternative to block imaging instead of as a supplement.

Figure 10:
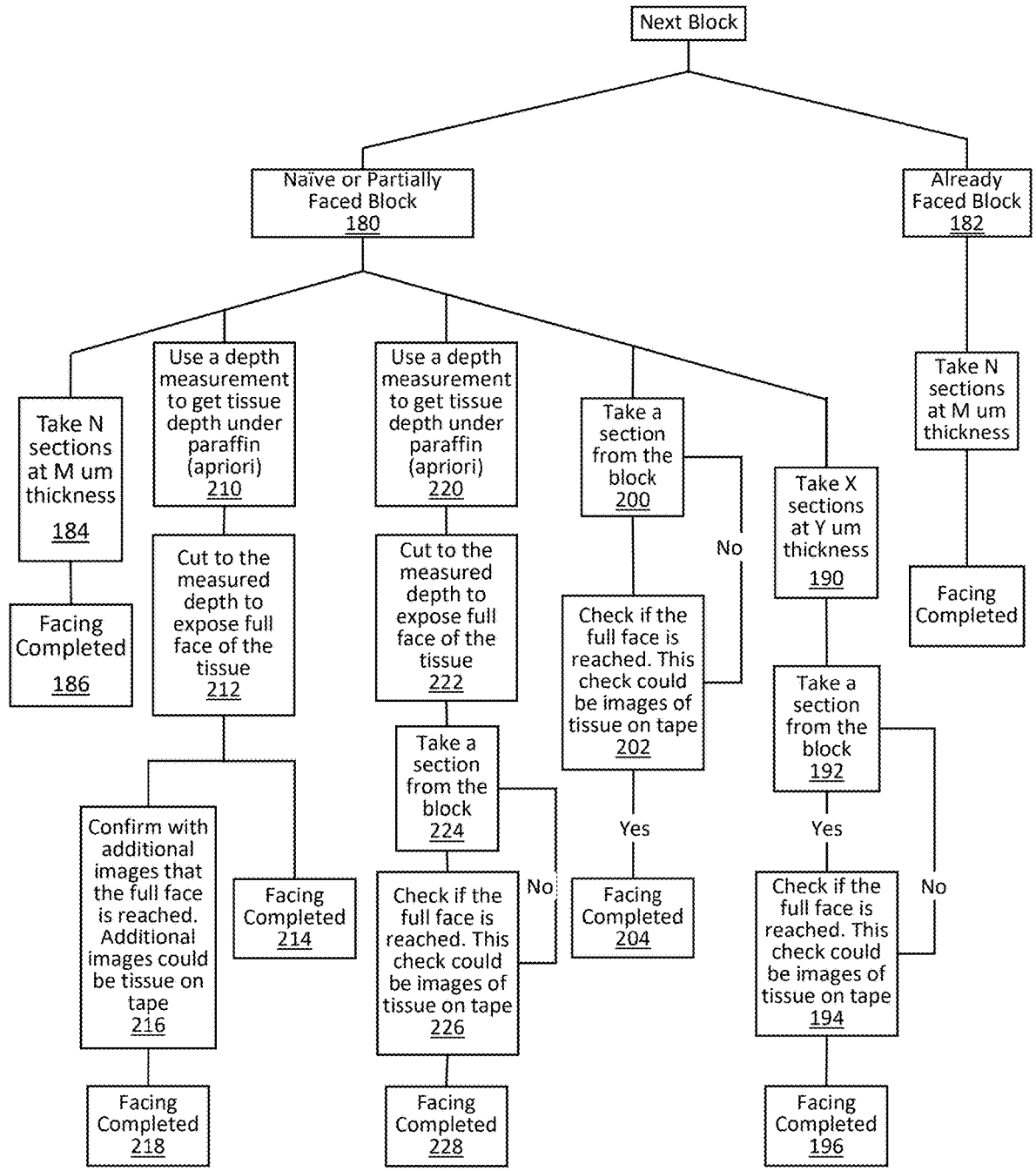
FIG. 10 is a flow chart illustrating various methods for block facing.

The flow chart of FIG. 10 illustrates various systems that can be utilized by way of example for determining block facing of a naïve or partially faced block (step 180) or a fully faced block (step 182).

There are a variety of ways to cut into the tissue block to expose the tissue embedded in the paraffin or other embedding material. Evaluation of the tissue can be performed after cutting from the block, of the sample block itself, or both. In some embodiments, a predetermined amount of paraffin can be removed from the tissue block to expose tissue. For example, with a naïve or partially faced block (the latter can be the result for example from a failure of the facing procedure in a previous run), determination of a faced block can be made by taking N sections at M um thickness for removal of a fixed/pre-programmed depth of paraffin (step 184). After such cutting, the block facing is considered to be completed (step 186).

In some embodiments, an evaluation of the tissue block is made after a series or one or more cuts are made into the tissue block to determine if the block is faced after each cut. The sections are cut from the block and through imaging of the block, the cut tissue section and/or the cut tissue section on the tape (or other transfer media), or other techniques, the sections are evaluated until a determination that the block is fully faced is made For example, X sections at Y um thickness are taken (step 190), then a section is cut from the block (step 192) and an evaluation of the cut section is made (step 194) to confirm the block is faced (step 196). This check could be by taking images of the cut tissue section or the cut tissue section on the tape (or other transfer media).

Evaluation, e.g., measurement, of the sample block and/or cut tissue (on or off the tape) (step 202) can be made with each cut section (step 200) so it leads to a decision to continue sectioning (not yet faced) or stop sectioning (fully faced as in step 204). In some embodiments, the decision to continue sectioning can lead to a decision to cut several sections before evaluation, e.g., measurement. In some embodiments, several consecutive sections can be cut before leading to an evaluation or decision.

In some embodiments, the decision can be made based on evaluation of the sample block and/or specific cut section (on or off the tape). In some embodiments, the decision can be made by comparing a second measurement (or other criteria or parameter) to a first measurement (or other criteria or parameter) in accordance with an algorithm. The decision can also be made based on a fixed depth rather than an evaluation of the specific block face or cut section In some embodiments, depth measurement can be used to determine tissue depth under the embedding material, such as paraffin, (a priori)(step 210). In some embodiments, the tissue depth can be determined from the baseline image, as for example shown in FIGS. 4A-4F. A 3D imaging technique can be used for example to determine tissue depth without any further measurement. The sample block is cut to the measured depth to expose the full face of the tissue in step 212. At this time, the block can be considered as fully faced (step 214). In some embodiments, after the sample block is cut to the pre-determined depth, additional image(s) can be taken, e.g., images of the cut tissue section on the tape (or other transfer media) to confirm the full face is reached, in steps 216 and 218. In some embodiments, depth measurement can be used to determine tissue depth under the embedding material in step 220. After the sample block is cut to the pre-determined depth in step 222, a section is cut from the block (step 224) and evaluated to confirm the block is faced in step 226, e.g., by images of the cut tissue section or the of the cut tissue section on the tape (or other transfer media). If not fully faced, another section is cut from the block and checked. This continues until a determination that the block is faced, in step 228. It will be understood that other methods can be used to determine depth, including but not limited to ultrasound, X-ray imaging, and other non-light based detection methods, and comparison to the baseline image. One method of achieving this is by an imaging device creating a plurality of images.

As noted above, in some embodiments, determining when block facing has occurred is achieved by monitoring paraffin on top of the tissue section by using some signature of paraffin that differentiates it from tissue. Using this signature, it can be detected when all the paraffin has been removed and enough tissue exposed, which would then trigger the "block is faced" decision. Various methods can be utilized for such detection, and two methods to determine the depth of paraffin on top of the tissue are discussed herein by way of example.

In some embodiments, the block is illuminated with infrared radiation and an image taken. For example, infrared illumination in the 2800-3000 cm$^{-1}$ wavenumber range (3.3-3.6 mu optical wavelength range) can be used, as paraffin has a strong absorption in this range due to stretching modes of the CH bond. If the block is illuminated narrowly in this spectral range (such as by using a quantum cascade type of laser, such as a narrow-band QC laser at 3.28µ), and an image taken with an infrared camera, then the block would first look black (when all the block face is paraffin), then a lighter region would appear around the portion where tissue is exposed, as the block is cut.

In some embodiments, which is based on the fact that paraffin scatters light, one (or an array of) sharp light spot(s) is shined onto the block face. Looking at the diffusely reflected light, the "spot size" should correlate with the depth of paraffin—thicker paraffin means the light diffuses more. For example, if UV illumination is used (with a sharp optical spot, e.g., using a laser), then it would generate a point optical source of fluorescence within the block. The scattering of the UV light on the way in, and the scattering of the fluorescent light on the way out, would also make the spot broader/more diffuse. Thus, spot size of the fluorescent radiation would correspond to the thickness of the paraffin, thus providing a method for monitoring the depth of paraffin.

Figures 11A, 11B:
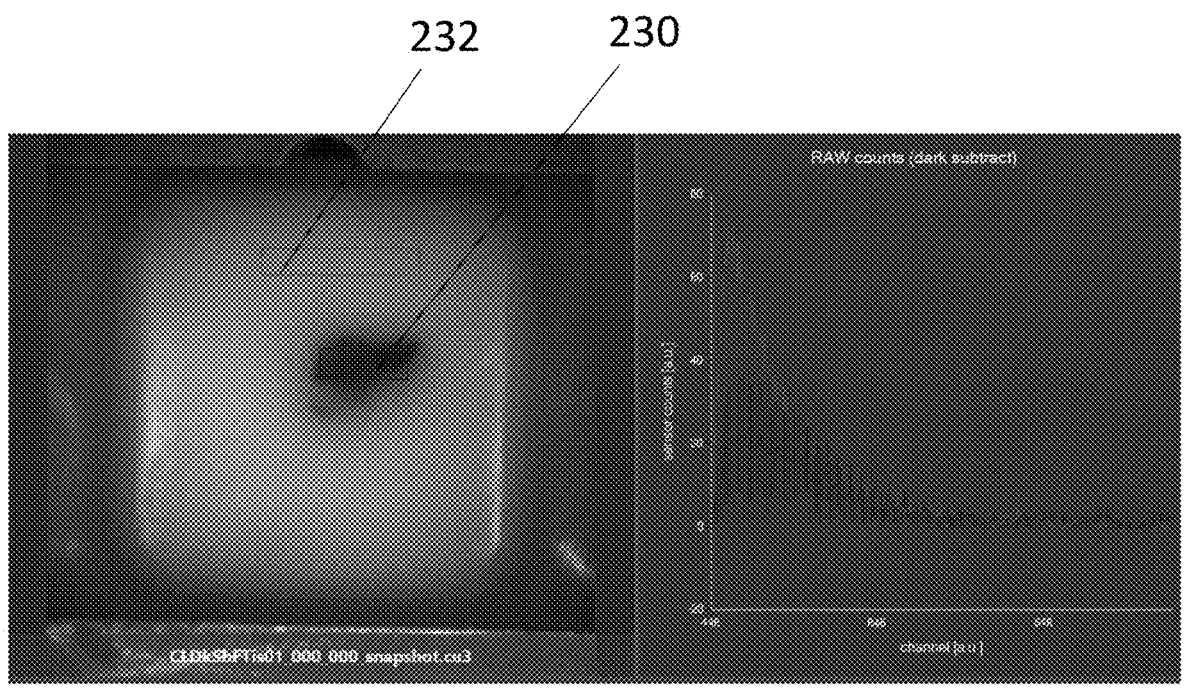
FIGS. 11A and 11B illustrate an exemplary image of a tissue embedded in an embedding material and a related exemplary graph showing the relationship between the tissue and embedding material.
Figures 12A, 12B:
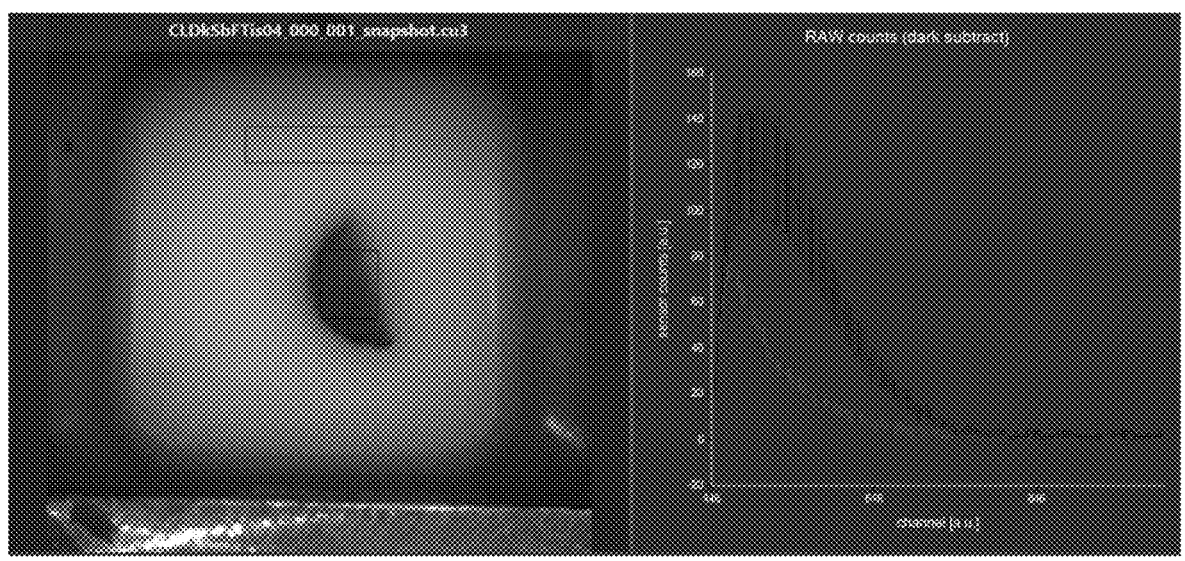
FIGS. 12A and 12B illustrate an exemplary image of a tissue embedded in an embedding material and a related exemplary graph showing the relationship between the tissue and embedding material.

As explained above, hyperspectral imaging can be used by the illumination system. FIGS. 11A and 11B illustrate an exemplary image and its related hyperspectral cube for fatty tissue 230 embedded in paraffin 232. The low count of the fatty tissue layer compared to the paraffin shows that it is still below paraffin in the block. The significantly higher tissue reflectance in FIGS. 12A and 12B show that it is at the surface. In this way the layer depth of the tissue can be identified.

Figure 13:
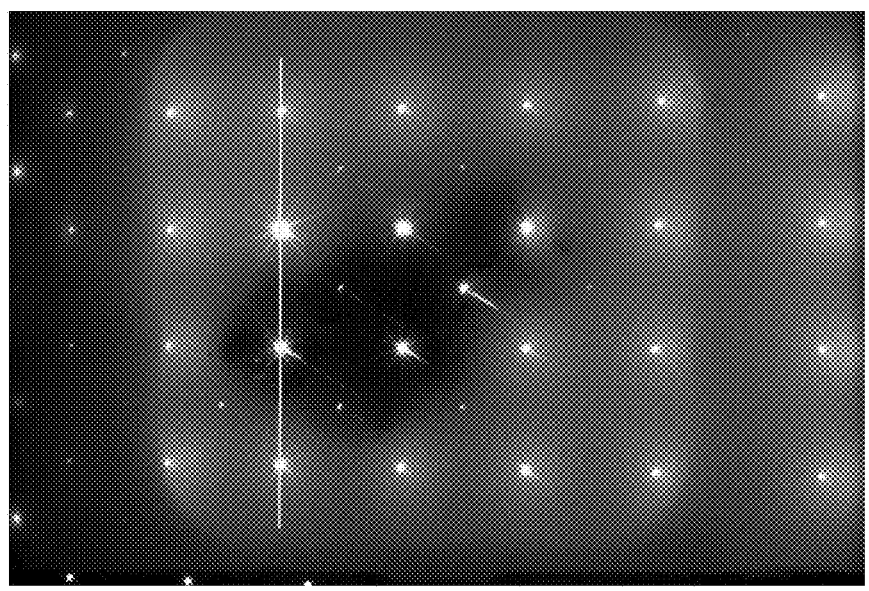
FIG. 13 illustrates an exemplary image related to laser dot diffusion.
Figure 14:
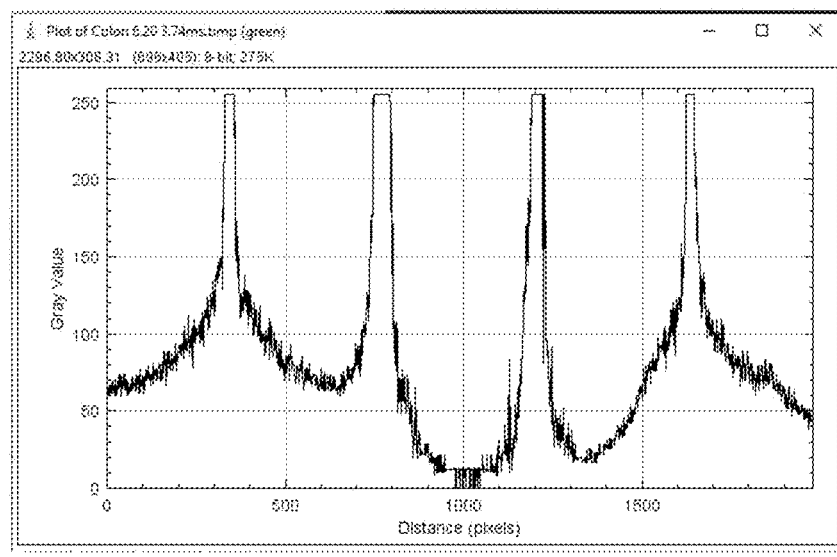
FIG. 14 illustrates an exemplary graph related to column 2 dots sampled at 1 pixel across the block of laser dots on a tissue block.

As explained above, laser dot diffusion using a diffractive optical element can be used for imaging, which can determine depth. For example, FIG. 13 shows the green channel of a tissue block image. Using image processing tools, the gray value of the image can be extracted, as shown in FIG. 14, which illustrates column 2 dots sampled at 1 pixel across the block of the laser dots on the tissue block. Here a single pixel column across the dots has been sampled. When the gray values go below certain counts due to tissue absorption, for example, 20 in this case, one can declare that that area of the tissue is faced. The zone between peaks 2 through 4 indicates a faced region in FIG. 14. The gray values from each row can be combined to obtain a 3D map of tissue facing metric over the surface of the block. In other words, this method could be used as an absolute measure of facing without progressive images. However, using this method on progressive images improves its efficiency.

The method could include other lighting modalities such as UV or white light to determine the boundaries of the tissue in the paraffin block. This boundary can be used as a mask that can be overlaid on the image obtained using the laser dot array. This narrowed down pixel range help improves the accuracy of the facing decision-making algorithm In some embodiments, the system can be used with an already faced block. N sections at M um thickness are made to complete block facing. After a block is faced, it can be removed from the microtome and hydrated. After hydration it is put back on the microtome. The tissue in the block could absorb more moisture than the paraffin and may protrude irregularly from the paraffin matrix. It is also very likely that the blade is changed on the microtome between facing and sectioning. The paraffin block will need to be registered against the blade after the polish cuts one would take the sections that will be stained and analyzed by the pathologist.

In some embodiments of the automated system, once the block is faced, the automated apparatus will automatically stop facing and start taking sections from the tissue block for transfer to the tape. Thus, the automated sectioning device will be programmed to take tissue sections from the block face once it decides that the block is faced, and this transition occurs without any user intervention or input. In some embodiments, once the automated decision that the block is faced occurs, the automated apparatus will automatically stop facing but user input is required to initiate the tissue sectioning/transfer to tape process. The system can include feedback to indicate when the block is fully faced.

Figure 15:
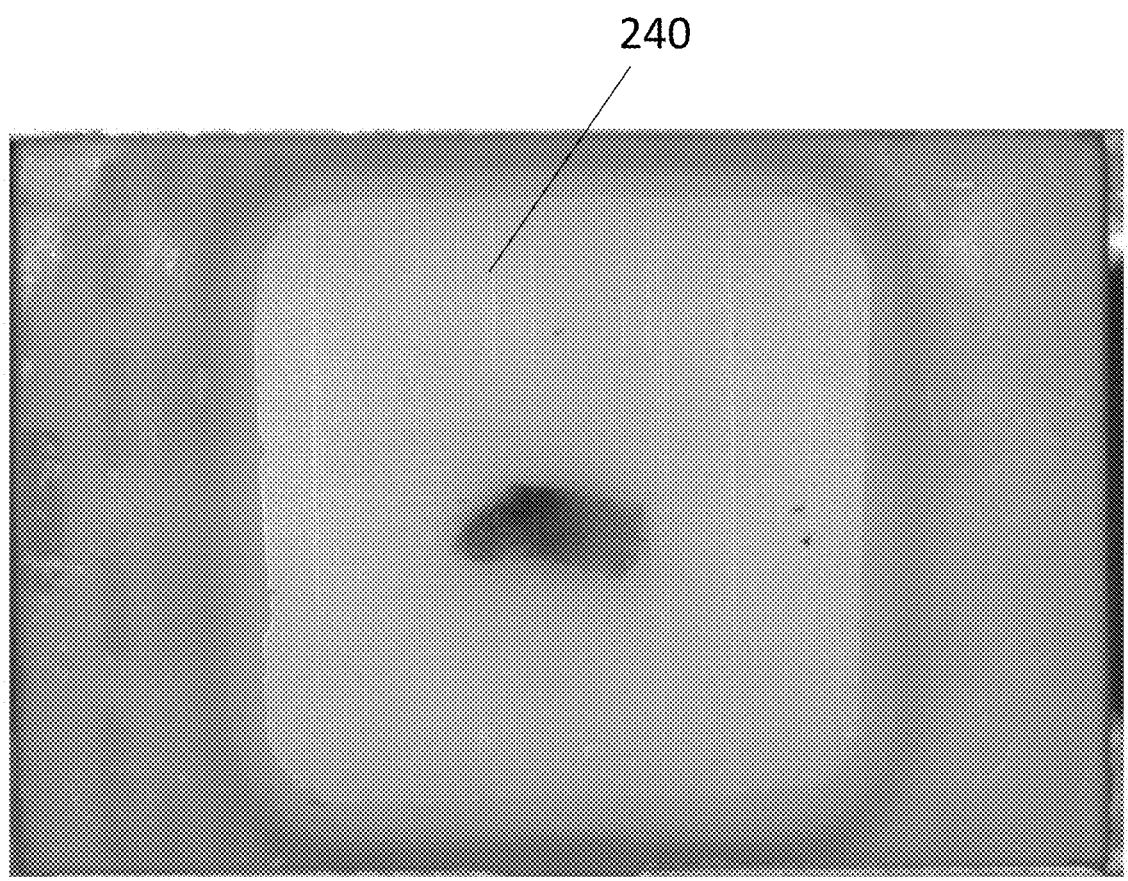
FIG. 15 illustrates an exemplary image showing microserrations that a blade can leave on a tissue block.

In some embodiments, micro-serrations 240 that the blade leaves on the block face (referred to herein as "blade ballistics") are evaluated to make the facing decision, as illustrated in FIG. 15. On the initial cut sections from the sample block, the blade serrations will be only on a part of the block. However, when the block is faced, the serrations will be over the whole block face. This is because although the block is cut with a sharp blade, the surface of the block is not flat. On the tissue itself, the serrations are interrupted since the reflection coefficient of the tissue is different than the paraffin block. More specifically, even the best blade has imperfections which leave an imprint on the tissue block during facing (blade ballistics). These marks are going to be present first on a portion of the block since the block face is not flat and it cannot be in perfect alignment with the blade. In progressive images, the blade ballistics are (serrations) left on the block face on larger and larger areas of the block as deeper cuts are taken. Stated another way, when facing the block, the whole surface is not polished at once. As it is polished, the imperfections of the block appear like fine lines on the block. When the full face of the block is reached, there are micro-serration lines on the whole area of the paraffin block. The reflections of the blade ballistics lines are different on the paraffin and the tissue due to different reflection constants. The system compares the regular image of the tissue and the image captured by the blade ballistics method. This comparison gives a quantitative metric of how much the block is faced and can therefore identify whether/when the block is fully faced. Note these micro-serrations are not visible under white light but are visible if illuminated in the UV wavelength so the illumination systems disclosed herein can be utilized with this imaging system of blade micro-serrations.

In some embodiments, consecutive images are taken and compared to a prior image by the device processing the images. In some embodiments, comparing consecutive images to one or more previous images assesses changes in the colors over time as the block is cut. In some embodiments, size and edges of the tissue and/or the paraffin are evaluated to assess the status. In some embodiments, a qualitative change in colors of the image is evaluated and quantified. In some embodiments, physical properties of the tissue are determined/evaluated such as a shape, size, edges, outline, etc. to assess the status. In some embodiments, physical properties of the tissue are extracted from the images, the physical properties including a number of pieces of tissue in the sample block and a depth of each piece of tissue.

For full faced blocks, it could be beneficial if not only the tissue, but the entire rectangular paraffin region of the block profile is captured. For example, a rhomboid profile may be considered "faced" for traditional sectioning if sufficient tissue cross section is captured but a corner of just paraffin is not. The same is not good for tape transfer because the tape is applied over the entire block and will catch on the blade when sectioning in the recessed block corner. Therefore, a determination of where the paraffin is missing would be beneficial. That is, looking at the paraffin material removed can be beneficial. This is because in the middle of a cut, if a piece is missing, the blade is not in contact, so the cut is deeper. This viewing/evaluation can be achieved by using a video or series of pictures as the block gets cut to make the facing decision—by viewing the cut material or trimming as it forms off the blade edge during the cut. Where the trimming forms is where the blade made contact. Looking at the blade and where the trimming forms, i.e., seeing how the blade is interacting with the block face at the edge, is akin to doing a line scan of where the blade contacts the block. An image of where vertically on the block the trimming is formed could be helpful. For example, it could be difficult to tell from a picture if a previously faced block has a region in the middle of the tissue that has since sunken from drying out. The tissue may be recessed a few microns around the surrounding paraffin and retain the gloss sheen of a faced block. Doing a test cut and checking if trimming forms across the entire block is easier.

There may be instances where tissue is just slightly warped in an otherwise fully faced block. Sections aren't immediately taken after facing, rather, after facing, there is usually about a 5-15 minute soak in ice water for hydration that tends to slightly alter, e.g., warp, the previously faced block. Usually, a few throwaway polish sections are taken to reset to the faced block, but the imaging systems can result in taking less waste sections.

In some embodiments, an algorithm can process the images collected at each section. It will compare it to one or more historical (prior) images and determine if the images are changing such that they indicate a faced block. The system can take progressive images of the block as it is sectioned. In parallel the image processing system will evaluate each image and compare it to the historical images from the same tissue block to decide to continue facing the block or to stop. For example, hue values could be detected in the initial naïve block and as sections are cut, the hue values are compared to the initial values. The algorithm can subtract the values of consecutive images from the initial value and if exceeds a predetermined value (error function) the system recognizes the block is faced. Note hue is just one example of the detection based parameter of the algorithm as other characteristics as noted above can alternatively or additionally form the initial baseline for comparative calculations/assessments of consecutive images to determine the status and completion of block facing. In other algorithms, one can use the intensity changes image over image at approximately the same location to determine facing. On a naïve block (unfaced tissue block) due to dispersive nature of the paraffin layer on top of the tissue, the image of the tissue would not be clear and the borders of the tissue would be fuzzy. In technical terms the intensity change between the paraffin and tissue border would be gradual. As the tissue is being faced and progressive images are taken, the paraffin layer over the tissue would get thinner until it is totally removed. When one calculates intensity at the paraffin-tissue border in these images, the border would get sharper and sharper. With a suitable threshold value one can determine the tissue is faced or not.

In some embodiments, people may teach the algorithm when a block is faced. Thus, in this alternate embodiment, unlike the foregoing embodiments, subjective input by people, e.g., the user, provides the initial input. In machine learning type of algorithms, progressive images taken as more cuts are made need to be annotated by a person to indicate if the facing is achieved or not. This paragraph refers to these annotations.

In some embodiments, a 2D image or a 3D image can be utilized.

The block can in some embodiments be moved up and down in front of the imaging device. Alternatively, the imaging device(s) can be moved with respect to the sample block or both the sample block and imaging devices can be moved relative to one another.

As shown in FIG. 2 and described above, the imaging system takes images of the tissue block to assess when facing has occurred. In some embodiments, images are alternatively or in addition taken of the tissue on the blade holder. That is, the imaging system takes images of the cut tissue sections that are lying on the blade holder. The initial cut sections will not have tissue since the naïve tissue block has a layer of paraffin on top of the tissue. As explained above, it takes numerous cuts to remove this paraffin layer by layer to expose the tissue (see FIGS. 4A-4F). But as the cut sections go deeper into the sample block and parts of the tissue start to get cut, the contrast increasing lighting, utilizing one or more of the illumination systems described herein, would enable capture of tissue images of the thin cut sections (ribbon) on the blade holder. That is, under the contrast increasing lighting, the initial sections (containing all or mostly paraffin) don't fluoresce, but as the portions of the tissue are being cut the system will start to detect these tissue portions. When the tissue on the ribbon is like the outline of the tissue on the block, the system recognizes the block has been faced. The imaging system in this embodiment would image the tissue block and would have the image of the full face of the tissue. Comparing this full-face image from the tissue block and the image collected from the layers removed during the facing operation on the blade holder, the system would determine how close the facing of the tissue is achieved so the automated decision of full facing can be affected. The system/images can also check that the paraffin parts of the section match the profile of the block for preventing tape snags. In the automated systems, when it recognized the block has been faced, in some embodiments, the apparatus can automatically stop facing, i.e., the microtome can stop cutting sections.

Regarding light field imaging, in generic terms, a light field camera captures the intensity of light in a scene, and also the direction that the light rays are traveling in space. This contrasts with a conventional camera, which records only light intensity. One type of light field camera uses an array of micro-lenses placed in front of an otherwise conventional image sensor to sense intensity, color, and directional information. From this super resolution varied spatial information, an accurate identification of the "depth" of tissue located in the paraffin can be obtained. Various illumination, multi-spectral, hyperspectral, and UV can be utilized to elicit the tissue within the paraffin.

Regarding depth from disparity, one can get depth information from 2D images by combining at least two 2D images that are taken from different positions with respect to the object. Keeping the camera at a fixed location, the paraffin block can be moved in the vertical plane, and or the horizontal plane to take multiple images. One can then calculate 3D features of the object based on the 2D images. Image processing tools can be used to determine the depth information from multiple images of the same object. An algorithm could detect key points between stereo images to calculate disparity. This information can then be used to calculate the depth information Regarding depth from focus, another method to identify the depth of a set of tissue embedded in a block of paraffin is using the Imaging systems optical design to identify the depth of a focused tissue fragment inside of a block of paraffin. UV illuminated Florescent imaging allows for the capture of tissue that is located "inside" a Naïve block of paraffin. Using stepped method of moving the block forward towards the imaging system a series of images can be obtained of the tissue. UV illumination will infiltrate the naïve block causing the tissue to fluoresce. The imaging system has been setup with a short Depth of Focus (DoF). Then a series of sequential images are captured as the paraffin block is moved forward toward the camera system in the Z axis only in steps equal to the DoF where at a given depth the fluorescing tissue will be imaged in focus. Edge detection Algorithms run on the green channel (grey scale) images looks to identity the image with the most number of "edge" or focused details, thus identifying when the majority of the tissue is in focus from the series of displaced images. This is then correlated to the amount the Block holder moved forward taking into consideration that the depth is modified by the index of refraction (RI) of the paraffin wax in its solid form. This depth number calculated apriori can then be used to identify how many slicing cuts on the Block facing Microtome are needed to get to the "faced" condition. Because it doesn't require progressive images, it is a faster method to face the block.

As discussed herein, the illumination systems can include UV, IR, or visible/broadband for example. Also, in some embodiments, the imaging system can capture images of one or more of the illuminated tissue block face, the cut ribbon on the blade holder, or the cut tissue section attached to a supporting medium such as the tape, or a cut tissue section on a slide. The images can in some embodiments be a video of the block face or ribbon during sectioning. A computation system processes the images, for example quantitatively, to determine when the block is faced. At that point, the microtome cut sections from the sample block can be transferred to the tape automatically by the apparatus components in the automated tape transfer system for subsequent analysis of the tissue.

The systems herein can also have a linked database to record the data from the block facing to allow machine learning improvements.

Comparative and Mechanical Analysis

The present disclosure provides systems and methods for quality control in histology systems. In some embodiments, a method is provided that includes receiving a tissue block comprising a tissue sample embedded in an embedding material, imaging the tissue block to create a first imaging data of the tissue sample in a tissue section on the tissue block, removing the tissue section from the tissue block, the tissue section comprising a part of the tissue sample, imaging the tissue section to create a second imaging data of the tissue sample in the tissue section, and comparing the first imaging data to the second imaging data to confirm correspondence in the tissue sample in the first imaging data and the second imaging data based on one or more quality control parameters.

In some embodiments, the tissue section is non-conforming if there is no correspondence in one or more quality control parameters in the tissue sample in the first imaging data and the second imaging data. In some embodiments, the one or more quality control parameters include one or more of shape of the tissue sample, size of the tissue sample, or one or more mechanical damages. In some embodiments, the method can further include transferring, using a transfer medium, the tissue section to a slide, and the second imaging data comprises an imaging data of the tissue section on the transfer medium or an imaging data of the tissue section on the slide. In some embodiments, the method can further include comparing at least two of the first imaging data, the imaging data of the tissue section on the transfer medium or the imaging data of the tissue section on the slide.

In some embodiments, the tissue section is non-conforming if there is no correspondence in the shape or the size of the tissue sample in the first imaging data and the second imaging data. In some embodiments, the one or more mechanical damages are selected from the group consisting of tearing, shredding, blade marks, wrinkling, cracking, bubbles, insufficient tissue sample, incomplete tissue sample. In some embodiments, the method can further include identifying as non-confirming a tissue section if one or more mechanical damages are present in the tissue sample in the second imaging data but not in the first imaging data. In some embodiments, the method can further include adjusting one or more operating parameters associated with removing of the tissue section to correct one or more mechanical damages. In some embodiments, the method can further include approving the tissue section if there are no mechanical damages are present in the tissue sample in the first imaging data and the second imaging data. In some embodiments, the method can further include rejecting the tissue block if one or more mechanical damages are present in both the first imaging data and the second imaging data.

After the block facing decision is made, cut tissue sections from the sample block are transferred to tape or (other transport medium) and subsequently transferred from the tape or other medium to glass slides. The system can ensure one or more of the following: i) the section is not lost mechanically and remains properly associated with the sample block (sample tracking); ii) the section does not suffer mechanical damage, such as wrinkling, tearing, cracking, etc. or taken partially to ensure it is suitable to work with, e.g., suitable for pathology/histology; iii) the section put on the slide contains sufficient amount of tissue and not too much paraffin to ensure it is suitable to work with; and/or iv) the multi-piece tissue in the sample block is fully represented on the slide.

Figure 16:
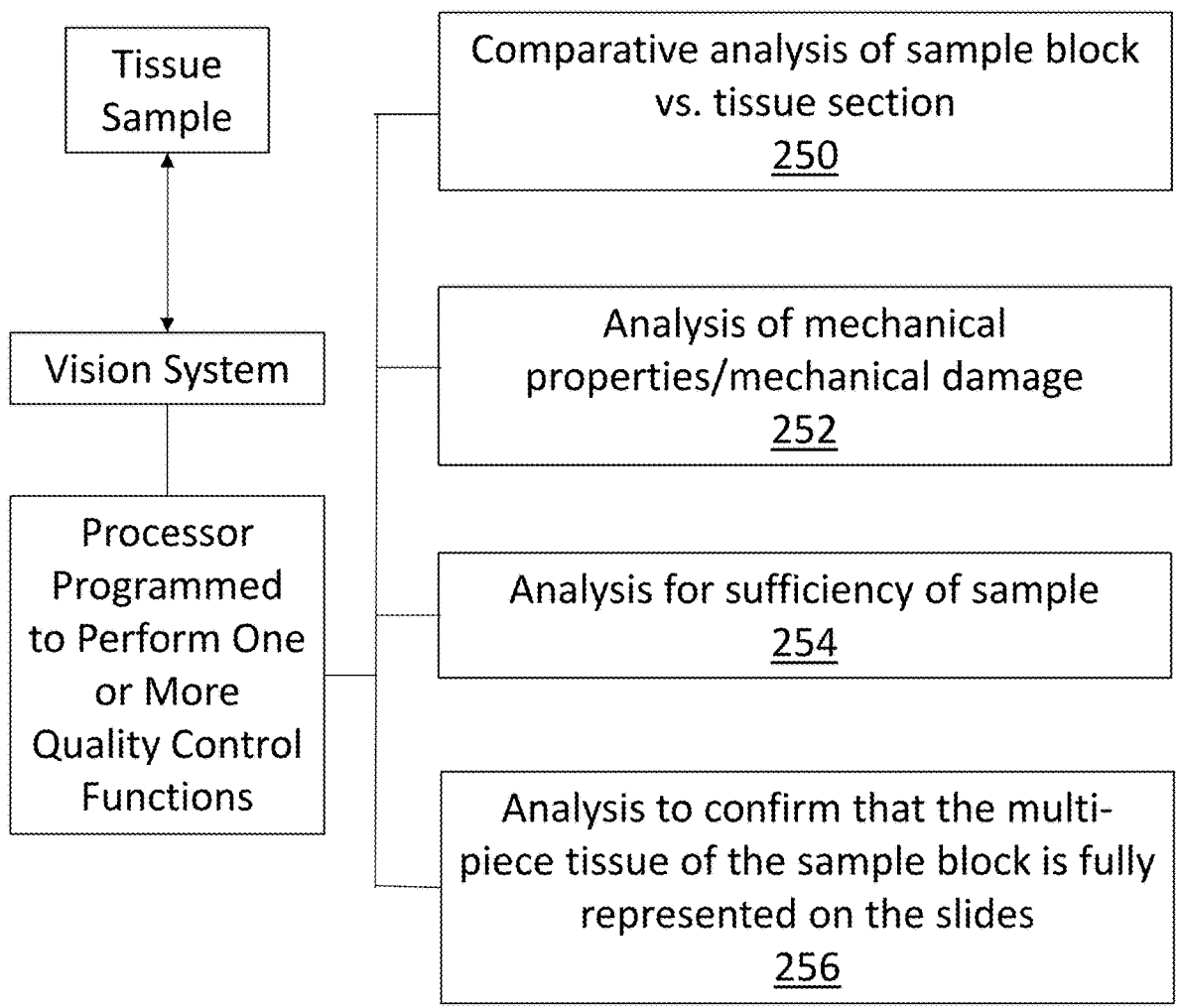
FIG. 16 illustrates an exemplary system for performing tissue comparison and mechanical quality control analyses of a histology system.

An exemplary embodiment of systems and methods for mechanical quality control of a tissue sample are shown in FIG. 16. Such systems can be configured to provide various types/aspects of quality control including i) a comparative analysis 250 of the section on the slide or transfer medium to the sample block or the section just after cutting from the sample block to ensure there is a proper correspondence (e.g., a check to ensure the section is not lost mechanically and remains properly associated with the sample block from which the section was cut); and/or ii) a check to ensure the cut section on the slide or transfer medium has not suffered mechanical damage 252, such as wrinkling, tearing, cracking, etc. which could adversely affect pathology; iii) a check to ensure the cut section on the slide or transfer medium contains sufficient tissue 254 and/or iv) a check to ensure the multi-piece tissue of the sample block is fully represented on the slides 256. These multiple aspects can be used alone or in combination with one of the other aspects or in combination with two or more of the other aspects.

Various quality control analyses can be performed on the tissue samples during microtomy, including but not limited:
  i) a comparative analysis of the section on the slide or transfer medium to the sample block or the section just after cutting from the sample block to ensure there is a proper correspondence (e.g., a check to ensure the section is not lost mechanically and remains properly associated with the sample block from which the section was cut); and/or
  ii) a check to ensure the cut section on the slide or transfer medium has not suffered mechanical damage, such as wrinkling, tearing, cracking, etc. which could adversely affect pathology;
  iii) a check to ensure the cut section on the slide or transfer medium contains sufficient tissue; and/or
  iv) a check to ensure the multi-piece tissue of the sample block is fully represented on the slides.

These various quality control analyses can be used alone or in any combination thereof.

In some embodiments, a system is provided to check the condition of the tissue on the microscope slide. This provides another aspect of quality control to ensure that the tissue on the slide is in the proper condition for further analysis/evaluation.

In some embodiments, a system is provided to check if the section on the slide contains a sufficient amount of tissue to render it adequate for analysis/evaluation. That is, the system ensures that not too much embedding material, e.g., paraffin, is in the section on the slide. This provides another aspect of quality control to ensure that the tissue on the slide is in the proper condition for further analysis/evaluation.

In some embodiments, a system is provided to check tissue on the tape (or other transport medium) as an interim quality control check, e.g. for tracking purposes or for tissue integrity purposes (in proper condition for analysis).

In some embodiments, a system is provided to check that a multi-piece tissue in the sample block is fully represented on the slide to ensure a piece is not missing. Such missing piece could require the pathologist to order recuts. This integrity check provides another aspect of quality control.

In some embodiments, the tissue comparison can be facilitated by an illumination subsystem and imaging subsystem. In some embodiments, it can be provided in an automated transfer system, described in more detail below. Thus, within an automated sectioning and cut tissue transferring apparatus, an image based automated tissue comparison system is provided—a machine vision system for automating tracking and quality control of the tissue section. The systems can be used to compare the tissue outline on the glass slide to the tissue shape on the block face to ensure proper identification of the slides. In some embodiments, the image of the cut tissue section is taken on a transport medium which via a controller transports the cut tissue section away from the sample block. In some embodiments, the step of comparing comprises the step of determining an outline of the tissue on the sample block and an outline of the first cut tissue section. In these systems, the image can be taken of the block face just prior to taking the tissue section (or alternatively or in addition taken of the slice after cut from the sample block) and the image is used as a comparison image for a subsequent image of the same section on the slide. A computational step compares the two images and ensures that there has not been a significant change in one or more parameters or features. If a significant change is detected, for example if the change exceeds a predetermined parameter in some embodiments, it can be provided as a feedback signal for corrective action. The illumination system aids in discernment/differentiation of the tissue and paraffin which can be imaged by the imaging system for evaluation. Thus, in this system and method, the differentiation of the tissue from the paraffin is enhanced, and the images are taken, on the block, transfer medium, slide and/or other locations. For example, the step of comparing the image includes evaluating and quantifying a change in colors of the image. In some embodiments, the step of comparing the image includes determining if a change exists in one or more of location, spatial shape and integrity. In some embodiments, a qualitative change in colors, granularity, etc. of the image is evaluated and quantified. In some embodiments, gray scale imaging can be used. Thus, if the change exceeds a predetermined parameter, a feedback signal is provided for corrective action Various illumination systems and imaging systems are discussed above.

A system and method of computational processing after the visualization system utilizing optics as disclosed herein is operated can also be provided. Thus, the visualization system utilizes appropriate optics (illumination system/method, imaging system/method, detection system/method) to be followed subsequently by computational processing. This computational processing provides comparative assessment of images to determine tracking or other aspects of quality control.

The illumination system enhances visual/imaging differentiation of the tissue and paraffin and the imaging systems takes images of the illuminated tissue/paraffin for subsequent comparison. The illumination system enhances visual/imaging of the tissue on the block face and the imaging systems takes images of the illuminated tissue for subsequent comparison for quality control. Such imaging of the individual tissue section is done prior to separation of the cut tissue from the block or otherwise prior to transfer to the slide, to provide a base for comparison. Subsequently, such assessment of the individual tissue sections is done after the cut tissue section is transferred to the slide. Various ways to differentiate are described below. Various imaging systems and various locations for imaging are also discussed below. Also discussed in detail below are various embodiments of illumination systems which create and/or enhance the contrast between the tissue and paraffin, relying on the properties of the paraffin and the tissue. In some embodiments, the tissue of the sample block is embedded in embedding medium and the method further comprises the step of one or both of i) illuminating the sample block with wavelengths of light to increase a contrast between the tissue of the sample block and the embedding medium of the sample block in which the tissue is embedded; and ii) illuminating the first slide and or transport medium containing the first tissue section with wavelengths of light to increase a contrast between the tissue and the embedding medium in which the tissue is embedded.

Comparative Analysis (Block Versus Section)

Figure 18:
FIGS. 18 and 19 are exemplary images of a tissue ribbon under UV lighting.
Figure 19:

There are various ways to achieve a comparison to determine if the tissue section on the slide or in transport between the tissue block and the slide is within pre-set criteria so as to correspond to the same piece of tissue on the sample block. The system can, in addition or alternatively, compare the tissue section on the microscope slide to the tissue section that had just been cut from the sample block to determine if within a pre-set criteria they correspond to the same tissue sample compare. The tissue section on the transfer medium can additionally or alternatively be compared to sample block or the tissue on the microscope slide. The decision system can examine one or more parameters (characteristics/features) to make the comparison. A decision-making algorithm of the decision system then provides a cue or what if any action to take. These quality control systems speed the process, improve the process via fewer errors, and result in fewer wasted sections. In some embodiments, the comparison determines if there are matching identifications between the tissue block and the tissue section, and can include matching tissue contours and edges, and bar codes on the sample block 260 and on the slides 262, as shown for example in FIGS. 17A and 17B. In some embodiments, the comparison determines a match between the tissue block and the tissue section in transport, as shown in FIGS. 18 and 19, which illustrate exemplary images taken of the tissue section in transport. Below are some examples, it being understood that other criteria can be used utilizing for example, light, composition, mechanical characteristics, etc.

It will be understood that instead of comparison of the tissue on the slide to the block face, the comparison can be made of the tissue section on the slide to the cut tissue section (slice) after cut from the sample block. Thus, the discussion of the systems for assessing the block face, including the illumination and imaging systems, which are discussed herein are fully applicable for assessing the cut slice for comparison to the tissue section on the slide.

The block facing decision can in some embodiments be determined in accordance with the inventive concepts in commonly assigned provisional application filed on the same day as the present application and entitled "Systems and Methods for Assessment of Tissue Block Facing in Automated Tissue Transfer Systems," the entire contents of which are incorporated herein by reference. Other methods can also be utilized. Once the block is faced, the block is ready for cutting thin tissue sections for transfer to a transport medium (e.g., tape) and then to slides analysis. Thus, quality control systems/methods disclosed herein can be utilized with such block facing decision. In some embodiments, automated methods (processes) and systems can be used to automatically face the tissue in the paraffin block via a fully automated tissue sectioning device wherein once faced, the tissue is automatically cut from the block face, automatically transferred to tape and the tape is automatically moved via rollers to advance the cut tissue and position subsequent portions of the tape over the block face for subsequent transfer of cut tissue sections to the tape. In some embodiments, the automated tissue sectioning apparatus also includes a slide station and the tissue sections held on the tape are automatically transported to and transferred in the automated apparatus to glass slides for analysis.

Images can be taken of the cut tissue section on the tape (or other transfer medium) after it is cut from the block and adhered to the tape. Images can additionally or alternatively be taken of the cut tissue section after it has been transferred from the tape to the slide. An algorithm will process the images collected at each section with a computational step to compare the image on the tape and/or slide to one or more historical (prior) images and determine if there is a significant change in characteristics such as location, spatial shape and integrity. The location of the tissue sections on a (glass microscope) slide. The tissue section has a rectangular shape and the larger ones are approximately 28 mm×22 mm. The usable area of the glass slide is approximately 50 mm×25 mm, the tissue section can be transferred anywhere on the slide, including rotational changes. But such a haphazard transfer is not preferred. Mechatronic systems can ensure that the similar sized tissue sections are deposited at similar locations on the glass slide. In addition, the QC system will check if the transferred tissue in the expected location and orientation. Spatial shape can be considered as part of the previous explanation. Tissue integrity refers to not having defects such as bubbles under the tissue, tears, blade marks, shredding, cracks, and missing pieces. Note the historical (reference) image can include an image on the sample block before it is cut and/or an image of the section (slice) after it is cut before it is placed on the tape or slide. Thus, the system will take progressive images of the block as it is sectioned. The system will also take images of the cut tissue section on the tape and/or on the slide. In parallel, the image processing system will evaluate each image and compare it to the historical images from the same tissue block to ensure it has not changed. For example, hue values could be detected in the sample block and as sections are cut, the hue values are compared to the initial values. The algorithm can subtract the values of consecutive images from the initial value to assess if it is a match. Note hue is just one example of the detection-based parameter of the algorithm as other characteristics as noted herein can alternatively or additionally form the initial baseline for comparative calculations/assessments of consecutive images to determine matching. One can use the intensity changes image over image at approximately the same location to determine facing. On a naïve block (unfaced tissue block) due to dispersive nature of the paraffin layer on top of the tissue, the image of the tissue would not be clear, and the borders of the tissue would be fuzzy. In technical terms the intensity change between the paraffin and tissue border would be gradual. As the tissue is being faced and progressive images are taken, the paraffin layer over the tissue would get thinner until it is totally removed. When one calculates intensity at the paraffin-tissue border in these images, the border would get sharper and sharper. With a suitable threshold value one can determine the tissue is faced or not.

In some embodiments, the quality control is not a machine learning algorithm trained by people. Thus, in some embodiments, the methodology will not depend on expert humans teaching a machine learning algorithm how to assess quality or a match. Note though in some implementations, the results of the classical image processing methods could be fed into a machine learning algorithm to train it with the expectation that the machine learning algorithm can handle more generic cases. This method would cost effectively increase the number of annotated images used for AI algorithm teaching phase. In machine learning type of algorithms, progressive images taken as more cuts are made need to be annotated by a person to indicate if the facing is achieved or not. But one can alternatively use classical image processing techniques to annotate the images that are easier for such algorithms (more structured) and train an AI algorithm to extend the applicability of the overall algorithm to more general (unstructured) data.

In some embodiments, the illumination system enhances the detection of tissue. Since in some cases processed and embedded tissue has a very faint color compared to the paraffin matrix surrounding it, it is difficult to reliably capture the tissue outline with regular imaging. Thus, applications of certain ranges of wavelengths can increase the contrast of the tissue against the paraffin. For example, UV light is used to increase contrast ranging from 320 nm to 400 nm. Such detection enhancement facilitates comparison of the tissue on slides (or tape) to the block. It also facilitates checking the suitability of the tissue section on the slide (or tape) in accordance with other quality control aspects.

In some embodiments, increasing of the contrast of the tissue from paraffin is achieved using multispectral images, i.e., varying wavelength radiation, to illuminate the tissue block at the same instance of the block section. These images are combined to increase the contrast of the tissue section in the tissue block. These higher contrast images are easier to compare.

In some embodiments, UV radiation can be used to illuminate the tissue since tissue samples fluoresce when illuminated by UV radiation. UV radiation as used herein can be interpreted broadly as wavelengths shorter than optically visible blue light. Note, however, in some embodiments, the actual wavelength range available may include some of the blue end of the light spectrum. The tissue sample glows under UV illumination (e.g., can glow green) with a diode since biological tissue has numerous fluorescent molecules that are relevant in the present context, including NADH, FADH. Paraffin, however, does not fluoresce under the same condition, and the paraffin block scatters the visible part of the UV light source and can appear a different shade or color, e.g., can appear bluish. Three advantages of UV light can be appreciated. First, the UV light penetrates into the paraffin block, and the fluorescent radiation escapes from the paraffin block, so that the method/process can clearly visualize tissue samples buried within the block. This is in contrast with looking at the block under visible light, which is strongly scattered by the paraffin wax, and the buried tissue samples are not clearly visible and may even be invisible. Second, the color (hue) of the emitted light (more precisely, the wavelength ranges of the fluorescent radiation and the passively scattered radiation) provides a clear contrast between the tissue and the paraffin wax, thus permitting straightforward detection and segmentation of the tissue samples. Third, by imaging the cut section on the tape (or other transport medium) and/or the slide, and by observing the distinct fluorescent radiation being emitted by the tissue, it is possible to precisely detect the tissue placement for checking integrity and checking that it matches the pre-cut tissue section.

In some embodiments, another range of illuminating wavelengths utilized to illuminate the block face and the cut tissue section on the tape and/or slide lies in the infra-red range. Paraffin wax has a characteristic infrared absorption spectrum. If reflection spectrum is acquired from the face of the paraffin block in an imaging mode, by selecting the tissue portion from processing the UV image (or if the reflection IR spectroscopy is performed in imaging mode), the tissue can be detected when the IR spectral signature of paraffin is diminished in a localized manner over the tissue sample.

Infrared spectroscopic methods can be used in some embodiments to detect the hydration state of the tissue in the block, utilizing the characteristic IR absorption spectrum of liquid water.

Figure 20:
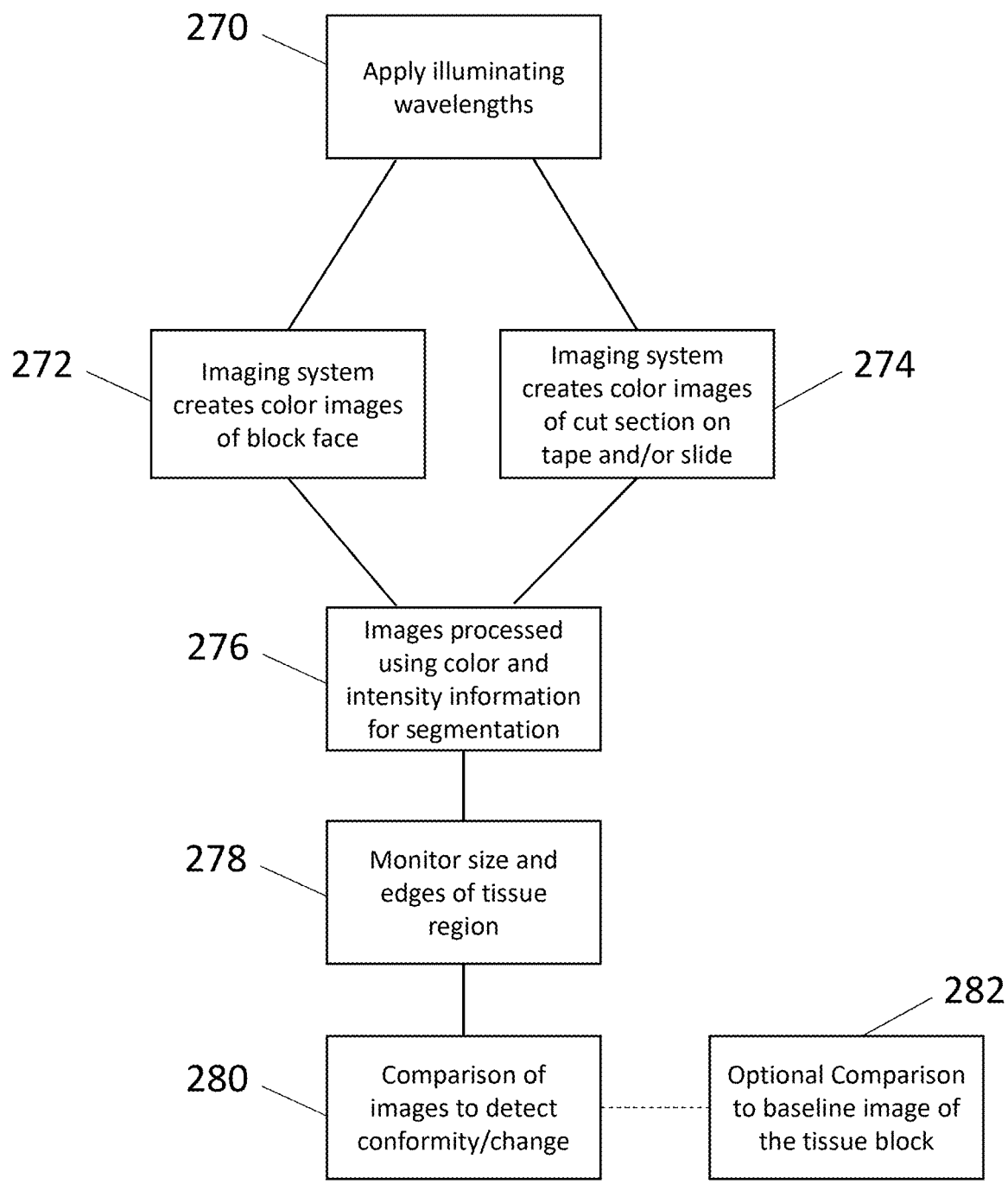
FIG. 20 is a flow chart illustrating a method wherein the cut section and block face are imaged.

One method is shown in the flow chart of FIG. 20 utilizing the UV or infrared tissue illumination. The steps can include i) illumination by a pre-selected range of wavelengths in step 270 (e.g., the UV range); ii) using appropriate optics to create images on a color camera, i.e., a camera that simultaneously takes images in multiple wavelength ranges such as an RGB camera for example, of the block face (step 272) and the tape and slide (step 274); iii) using color and intensity information from the resulting image to segment out the portions where tissue resides (step 276); iv) monitoring the size of the tissue region, and the edges of the tissue region (step 278); and v) comparison of images to detect conformity/changes (step 280). Optionally, a comparison can also be done between the images and the baseline image (step 282). In particular, as explained above, the outline of the tissue sample can be compared to the expected outline of the tissue sample from the baseline image, and the comparison of the actual outline to the expected outline can confirm the source of the tissue sample, that is, the tissue sample comes from the tissue block having a barcode associated with the slide.

This information is used to compare the tissue on tape to the image of the block and tissue on tape image to image of the block. These first comparison (tape to block) enables identification of tissue pick up from the block face with the transfer medium (tape). The tissue could be picked up partially, or part of the tissue could be torn and rotated. If the tissue on tape is not high quality enough then it is not worth transferring to the glass slide. This saves time and resources. The second comparison (slide to block). The tissue transferred to the glass slide may have bubbles, tears, missing pieces etc. these glass slides should not be given to the end user as final product as they will be sub-par or useless. The algorithms may result in a recut of the section or warn the user about a bad block. A bad block could have a tissue that is not embedded properly in the lab before it is introduced to the system.

As discussed above, in the automated apparatus, these steps are automated and do not require user input during the process. Note that intensity in a gray scale can be used as alternative to color images. Thus, in this method, UV radiation or other wavelengths enhance the tissue/paraffin contrast as discussed herein, and observations are made of both the block face and the cut tissue section. In this method, appearance of tissue-fluorescence in a cut tissue section is detected. This can be done either based on the total fluorescence from the ribbon (so that there is no need to fully image the ribbon face-on) or, alternatively, the ribbon could be imaged face on. Such imaging is done on the cut tissue section (on the tape or slide), and comparing the image of the tissue section on the tape or slide with the image of the block face (each with UV illumination). The images are processed and evaluated for tissue segmentation (or other characteristics/parameters described herein) as the size and edges of the tissue regions can be assessed and quantified to a match.

In some embodiments, multi-spectral illumination can be used, and involves spectroscopy, i.e. acquiring information from multiple wavelengths or colors, e.g., a Fourier-Transform Infrared Spectroscope can be employed. This can be done in an imaging mode or by simple spectroscopy from a spot that is chosen by some other way (preliminary UV imaging) to focus on top of the tissue. In either case, the goal is to employ the distinctive infrared spectral signatures of paraffin and tissue in order to (i) determine if there is paraffin on top of the tissue, or if the paraffin has been removed and the tissue exposed; or (ii) imaging the ribbon on the tape to detect presence of tissue and reduction in the amount of paraffin; or (iii) imaging the ribbon off the tape and on the slide, to detect presence of tissue and reduction in the amount of paraffin.

In some embodiments, visible/broadband illumination is used to image the block face and/or the tissue section on the tape and/or on the slide for comparison to detect (i) a qualitative change in the image, such as the tissue portion becoming more visible/darker brown/with better defined edges on the block, or ii) by looking at the cut tissue section and detecting tissue by using color/intensity information.

It should be appreciated that the above methods can be combined so that more than one illumination system can be utilized.

In the methods herein, used individually or in combination, there is a computational step as discussed herein where the multi-color image or spectrum is subjected to analysis, and an appropriate change detected in order to ensure the cut tissue section remains properly associated with the sample block. This computational step can include image comparisons to an original or baseline image, or to prior images, and the comparison of hue, intensity, boundaries, etc. can be quantified for calculation of the extent of differences between the images for assessment.

In the case of tissue imaging on the tape or on the slide, the reference image could be the image of the tissue in the block.

The automated system in some embodiments can capture various consequential variables like speed, temperature, humidity, time outs, etc. for input to machine learning to improve the process. If the QC system deems sections as good quality and this trend correlates with a certain range of operating temperatures this can be the bases of a machine learning algorithm to make sure all future blocks with similar tissue are cut under conditions that result in good quality cuts.

The decision-making process can determine that there is not a proper correspondence (comment criteria) between the tissue on the slide and the tissue on the sample block. The decision-making process can also include a finding of a proper correspondence between the tissue on the slide and the sample block, but a finding that the tissue is distorted or damaged and therefore not usable.

Note the decision-making algorithm provides a cue of recommended action and following the recommendation can be optional. However, in some embodiments, whether or not the cue is taken, the information is recorded in a database which potentially can use machine learning to improve the decision-making algorithm.

In some embodiments, the system can provide a cue when to select another section to transfer to a slide. For example, selection can be every nth section or when the image of successive sections changes by some fractional amount of criteria.

An example of an inaccurate match (correspondence) will now be described. As discussed herein, the biological tissue is embedded in a paraffin matrix (or other embedding medium) forming the sample block. However, the tissue embedded in paraffin blocks may not always have high contrast compared to the paraffin matrix. This can adversely affect image analysis as it could be more difficult to differentiate the tissue and paraffin, thus making it more difficult to assess the shape, e.g., outline, of the tissue on the sample block. Thus, the illumination and imaging systems disclosed herein provide a system and method to improve differentiation of the tissue and paraffin so the images of the tissue, and thus the determination of the tissue shape, e.g., outline, can be determined (analyzed) with more accuracy. This ensures a more accurate comparison of the tissue by reducing the potential distortion of the image, e.g., by inaccurately including the paraffin as part of the tissue image. In other words, if the "base" or "input" image, defined as the initial image which is intended to define the tissue contour on the sample block for later comparison to the tissue contour on the slide, includes paraffin, and the "second" or "output" image, defined as the subsequent image of the tissue on the slide, is processed without the paraffin, then a false determination of a non-match could occur. Similarly, if the base image does not include paraffin, but the second image of the tissue on the slide is defined with the paraffin, then a false determination of a non-match could occur. Conversely, if not accurately differentiated and processed, false matches could also occur.

The section thickness ranges from about 1 to about 15 μm thick but most commonly are about 4 μm thick. At this thickness, the contrast ratio between the paraffin matrix and the tissue section is very low. In some embodiments, to ensure the quality control system is accurately comparing the tissue itself or accurately recognizing the tissue and the paraffin on the images, the contrast ratio between the tissue and paraffin is enhanced by the systems and methods disclosed herein. The image post-processing efficiency increases when the image has high contrast ratios as explained above. Tissue starts to fluoresce when illuminated with light of a certain wavelength range and the paraffin doesn't fluoresce at the same wavelength range. This creates a high contrast image. Therefore, the sample block is illuminated with a range of wavelengths of light to increase the contrast ratio between the biological tissue and the paraffin matrix. Similarly, the glass slides containing the tissue sections deposited thereon are illuminated with a range of wavelengths of light to increase the contrast between the biological tissue and the paraffin matrix. The slide with the tissue can be back illuminated or alternatively illuminated from the front, with back and front of the slide defined based on where the camera is placed with respect to the glass slide. Thus, in these embodiments, the system can better differentiate the tissue from the paraffin for comparative analysis of the sample block and slide.

In some embodiments, the wavelength of the light can be controlled with filters or LEDs with a given range of wavelength emission. In some embodiments, on the image capture side, filters could be provided to enhance the image capture. The set of lights sources, filters and the camera can be referred to as the imaging hardware.

Mechanical Property Analysis

In the illumination and imaging systems disclosed herein, the systems can be utilized to ensure the cut tissue section does not suffer mechanical damage, such as wrinkling, tearing, cracking, etc. when transferred to the slide. Such systems can also be utilized to ensure sufficient amount of tissue is on the slide. In comparing the tissue on tape or slide to block face if there are significant differences in surface area then the algorithm can say there is not sufficient tissue on the slide.

Composition can be measured by sampling vapor above the samples or by extracting material from the samples by bombardment and can be detected by mass spectrometry, vapor phase chromatography or other methods. This in the context of mass spectrometry, in the sense that detecting the substances in the vapor over a substance.

Mechanical properties can be measured by vibration, atomic force microscopy or other methods. One can determine material properties using vibrations in this case it is a stretch but included here for completeness. In the case of atomic force microscopy the attractive forces on the probe and the material being probed can be used as an indication of material properties. The reason this is included here is for completeness of facing decision sensors. It is not an imaging modality.

In some embodiments, the quality control system can check for sample orientation and/or inversion. In some embodiments, the quality control system determines tissue orientation variations on one or both of the transfer medium and the slide to alert the user if components of the automated apparatus need adjustment.

Sample Sufficiency Analysis

In some embodiments, the system can perform a check to ensure the cut section on the slide or transfer medium contains sufficient tissue. For example, the system would compare the surface area of the tissue in block face and the section on the glass slide. If the two areas are similar in a pre-determined range then the tissue integrity is preserved. Another example is the existence of bubbles under the section. A comparison of intensities of the two images would reveal if bubbles exist or not. It could also provide where the bubbles are. If the bubbles only exist in the paraffin matrix then it is not a critical failure. On the other hand, if the bubbles are on the tissue then this indicates a low quality tissue on slide.

Tissue Sample Completeness

In some embodiments, the system can perform a check to ensure the multi-piece tissue of the sample block is fully represented on the slides. In some tissue blocks there may be multiple pieces of tissue. The histotech places the tissue pieces in the plastic cassette and while trying to push them to the bottom of the cassette they pour warm paraffin wax. In certain cases some of these tissues move and are not planar with the rest. During sectioning one way to confirm is to compare the block face image to the tissue on tape or glass slide. If they have the same number of tissues then the overall tissue integrity is preserved.

Tracking and Printing

In some embodiments, a just-in-time glass slide label printing protocol can be implemented where the labels for the slides are printed after the tissue samples are cut from the tissue block. In this manner, the glass slide is barcoded or labeled by a just-in-time printer with the barcode derived from the block that was just sectioned at the microtome, such that the immediately cut tissue section is then placed on the newly printed barcoded slide. In some embodiments, the next tissue section is cut and label printed only after the preceding tissue section has been placed on the slide and labeled, and optionally confirmed to be associated with the tissue block. In some embodiments, real-time updates are communicated via the laboratory information management system to device software, while also enabling real-time tape marking of the barcode data.

In some embodiments, the present disclosure closes the loop of tracking a cut tissue sample while it is in transit between the block face and the destination of the glass microscope slide. providing, therein, real-time, updatable tracking and identification of the tissue section location in the tissue processing device vis-a-vis the LIMS data. In some embodiments, the transfer system is labeled to associate the tissue sections placed on the transfer system with the tissue block from which the tissue sample is cut. In some embodiments, the scanned barcode data is tracked from the point that the section is placed on tape, which includes replicating the information by a tape marking/printing mechanism; replicating the barcode data by just-in-time digital printing of the label on the glass slide; transferring the tissue to the glass slide; scanning the printed barcode on the glass slide; and then verifying exact correspondence among the barcode data on the block, the printed tape, and the printed slide; and optionally, communicating a summary report to the LIMS.

The present disclosure is directed to tracking of tissue sections cut from a sample block and just-in-time printing of the glass slide identification label of cut tissue sections in an automated tissue transfer apparatus. The information from the tissue block is transferred to the slides in real time and ensures an accurate 1 to 1 tracking and labeling of the tissue sections. The present disclosure overcomes the problems and deficiencies of the prior art by the implementation of a just-in-time glass slide label printing protocol. In particular, one or more tissue sections from the same tissue block are cut before the glass slide is actually printed. The glass slide can then be barcoded or labeled by a just-in-time digital printer with the barcode derived from the tissue block that was just sectioned at the microtome. The immediately cut tissue section is then placed on the newly printed barcoded slide.

Tracking and identification of tissue sections can be achieved by a number of integrated sub-assemblies and mechanisms, including, by way of a non-limiting example, a tape marking or a tape printing device that replicates the barcode data associated with the incoming tissue block, which is captured by a barcode reader, integrated within the automated tissue sectioning machine. The barcode data, generated by laboratory information management system (LIMS) software, is embodied by the printed adhesive label, attached thereon to the plastic cassette holding the tissue block. In some embodiments, the tissue transfer medium may have location markings or barcodes printed on it before it is used for tissue transfer. When the tissue transfer medium is an adhesive tape, the location markings can be placed on the tape during a tape conversion operation.

Typically, the tissue sample (also referred to as tissue block or sample block) is provided in a plastic cassette and is embedded in paraffin wax or a similar material. The plastic cassette provides the features for the sample block to be held in a microtome clamp. Once the sample block is secured in the microtome clamp for cutting (sectioning), the new block is first subjected to sectioning with relatively thick sections to remove the 0.1 mm-1 mm layer of paraffin wax on top of the tissue sample to expose the tissue sample. After removal of this superficial paraffin layer and when the complete outline of the tissue sample is exposed, then the block is ready to be sectioned. This process for removing this paraffin layer and exposing the large cross section of the tissue is referred to as block facing. Once this paraffin layer is removed, in clinical and research settings, the tissue is typically sectioned to 3 µm to 5 µm thickness. That is, when enough paraffin has been removed (the block is referred to as "faced"), subsequent block sectioning provides tissue sections for placement on glass slides for analysis (processed further for evaluation). The tissue sections cut from the sample block can be transferred to slides, such as, for example, using a tape transfer mechanism. In some embodiments, the process can be automated as, for example, disclosed in commonly assigned U.S. Publication No. 2017/0205317. Other examples of an automated apparatus, and variations thereof are disclosed in U.S. Publication No. 2017/0003309 and U.S. Publication No. 2017/0328818. The entire contents of these three publications are incorporated herein by reference. It is understood that the automated tissue apparatus provide examples of automated apparatus as the illumination/imaging systems and the quality control systems can be used with other automated apparatus. Also, as discussed herein, the section tracking systems can be used with manual systems and methods.

Figure 17A:
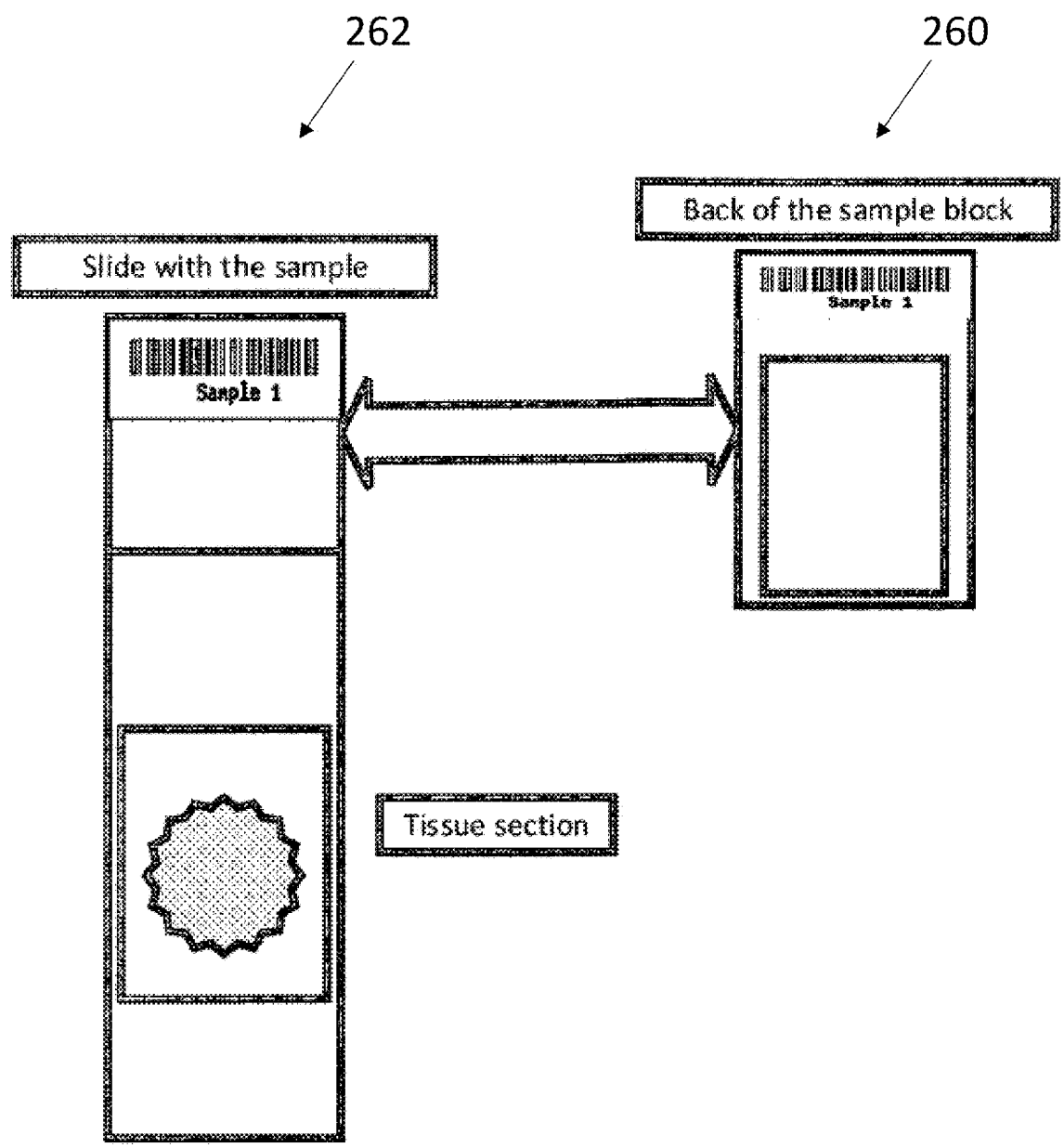
FIG. 17A is a section comparison of the sample block and the tissue section on the glass slide.
Figure 17B:
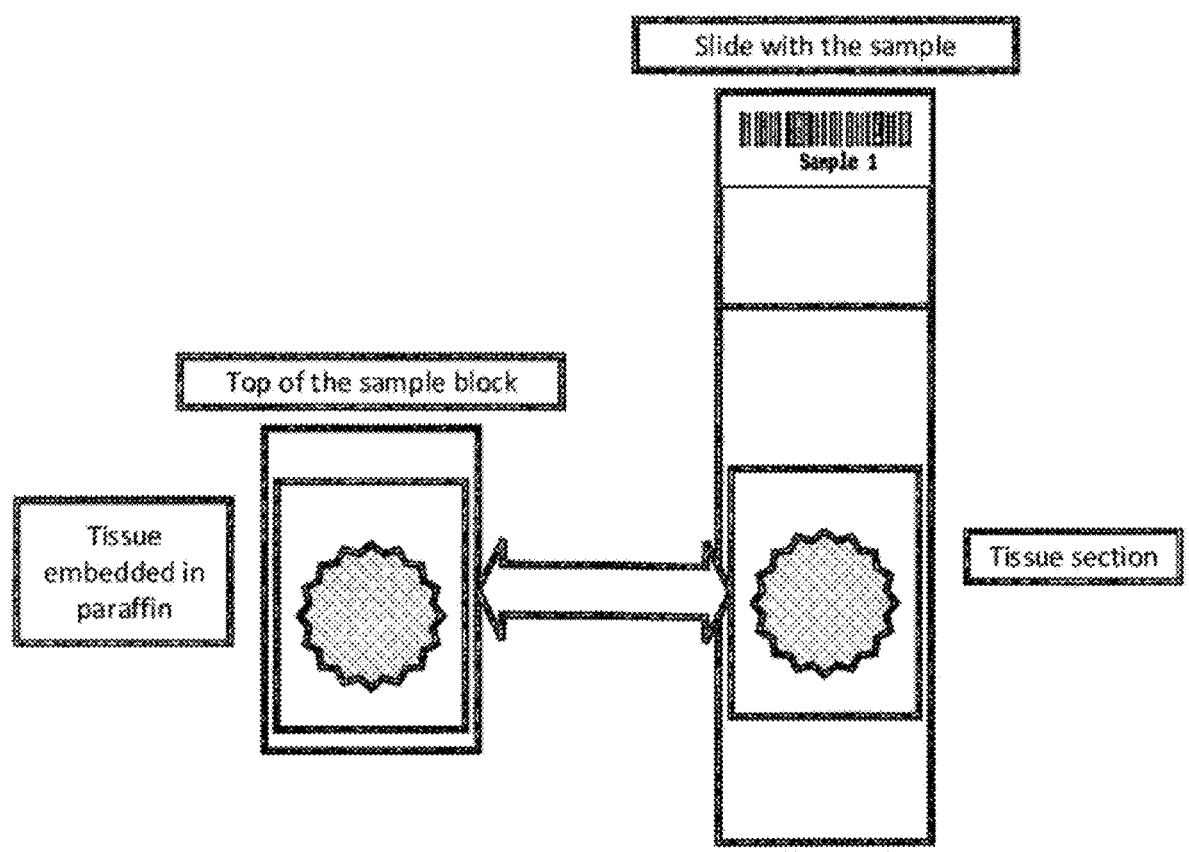
FIG. 17B is a slide and paraffin block identification comparison.

In reference to FIGS. 17A and 17B, incoming tissue blocks include a label attached to the plastic cassette a barcode number. The barcode data, generated by laboratory information management system (LIMS) software, provides information about the source of the tissue samples, for example, the barcode information includes an accession number and block ID. In some embodiments, this information can also include the patient name and date when the specimen was obtained. Depending on the lab, additional information may be included. In addition to the barcode, the label or the etching on the block could include human readable alpha-numeric version of the data. In some embodiments, the microtomy devices may be in communication with the LIMS enabling real-time LIMS updates to be correctly matched to the proper tissue block from the initial pick-up by a robotic arm right through to actual tissue sectioning and delivering the tissue sections to slides. The barcode information on the tissue block, optionally updated, is also printed on the slides such that there is a 1:1 correspondence between the tissue sections from the tissue block and the slides. As is described in more detail below, the labels for the slides can be printed after the tissue sections are cut from the tissue block.

Figure 21A:
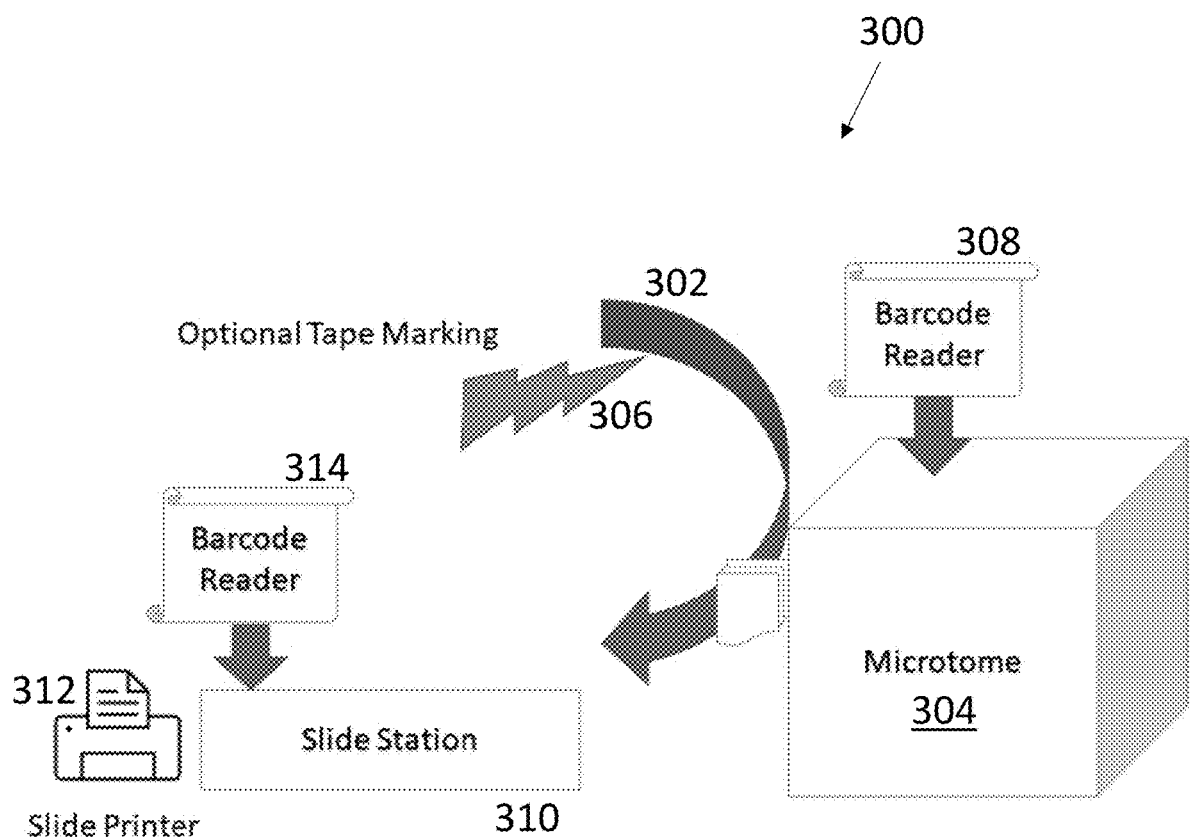
FIG. 21A is a schematic view of one embodiment of the automated tape transfer apparatus of the present disclosure illustrating the path of the tape, the apparatus having a barcode reader, in order to scan the label on the sample block, as well as the printed glass slide in accordance with just-in-time printing, tracking, and identification of cut tissue sections of the present disclosure; wherein a tape marking or printing device laser etches or prints identifying marks onto the tape transfer medium, and the glass slide is printed in real-time by a separate slide printer.

In reference to FIG. 21A, a barcode reader is provided to scan the barcode associated with the incoming tissue block. The scanning can take place at the point of tissue sectioning. The barcode information is used to interrogate the data from the LIMS to determine the number of sections that needs to be cut, thickness of the sections and other processing parameters. Next, one or more tissue samples can be cut by the microtome and are transferred to the slides that are also labeled with the barcode data associated with the tissue block to create a 1:1 association of the tissue block meta data with the tissue sections on the slides. In some embodiments, the slides are labeled based on the tissue block barcode with iterative variations. For example, if the block barcode is 12345, the first slide barcode could be 12345-a and the second one could be 12345-b and so on. The slide labels are printed just in time before tissue transfer to the slide.

In some embodiments, the tissue sections are transferred to the slides using a tape. It should be noted that transfer medium (also referred to as transport medium) other than tape can be utilized. Therefore, references to tape herein are used for convenience as the systems and methods disclosed herein are fully applicable to other transfer medium not just tape.

In some embodiments, the tape transfer system is configured to enable the tracking and identification system. The tape transfer system can be marked with information that can be associated with the tissue block. Such markings can be done after the tissue block is received in the device or be pre-printed on the tape. In some embodiments, the transfer medium (tape) may include location markings. The lab assigned block ID could then be associated with this location marking at the point that the tissue section is picked up by the transfer medium, the two IDs could be associated by means of a software tool. It is also possible that there is no physical marking on the tape, but a virtual marking is inferred based on a position encoder in the device, which keeps track of absolute position on the tape and is able to associate this absolute position, explicitly or implicitly via a suitable control algorithm, to the section in question.

FIG. 21A is a schematic view of some embodiments of a device with an automated tape transfer apparatus (system) 300. In some embodiments, the tape transfer system is configured to enable the tracking and identification system. FIG. 21A illustrates the path of the tape 302 for transporting cut tissue sections after the block is fully faced. FIG. 21A shows a microtome 304 that is used to hold the sample blocks and cut the sections. The microtome 304 holds a sample block comprising a tissue sample that is enclosed in a supporting block of embedding material such as paraffin wax. The microtome 304 includes a blade (not shown) aligned for cutting slices (or sections) from the face of the tissue block. Once the tissue samples are cut from the tissue block, they are mounted on the tape to be transported to the slides.

The automated microtomy device can also include a tape marking system 306, in communication with a barcode scanning reading system 308. The tape marking system 306 can be used to mark the adhesive tape with the barcode information captured from the label attached to the plastic cassette holding the tissue block. A variety of printing methods, including thermal or continuous inkjet printing technologies may be used within the automated tissue sectioning device, for this purpose. In addition, thermal transfer print units may also be used, in order to generate identifying information on the tape that tracks the incoming tissue block to the cut section on tape, in situ, wherein this information then enables correspondence between the section on tape and the section on slide, ensuring that the integrity of the sample is maintained.

The tape transports the tissue sections from the sectioning microtome 304 to the slide station 310. In some embodiments, the device can also include a glass slide printing system 312 and a barcode reading system 314. The printing system 312 prints the labels for the slides that associate the tissue sections to be placed on the slides with the tissue block from which the tissues are cut. In some embodiments, the automated systems can associate the barcode identifier on a tissue block with the markings on the tape transfer medium and then associates the markings on the transfer medium with the barcode printed on demand on the glass slide. This is in the context of a fully automated tissue sectioning device and provides just-in-time printing of real-time LIMS data onto the glass slide. It should be noted that other transport devices/systems can be used. The tissue in/on these other transport systems can be tracked in accordance with the tape printing systems described herein. Therefore, the systems, e.g., tape printing systems, slide printing systems, etc. described herein are fully applicable to the section (slice) on the various transport systems. Due to the tracking of the tissue at different stages in the apparatus, e.g., block to new slice, slice on transport, slice on slide, multiple levels of tracking are provided. In some embodiments, the label may link a slide to relevant LIMS-based information, such as the originating sample tissue block and the sectioning date. Tissue blocks may be similarly labeled. To accommodate pre-labeled blocks, an optical reader, such as a barcode reader may be used to read the block label to generate the associated slide labels.

In some embodiments, the printhead of the tape marking device may be placed in the tape path, at some arbitrary point before tissue transfer from the tissue block to the tissue transfer medium. Wherein a barcode reader, adjacent to the block plastic cassette, at the point of sectioning, reads the barcode data on the plastic cassette, such that the barcode data or other alphanumeric data is replicated on the tape transfer medium. In some embodiments the marking on the transfer medium may not be a replica of the barcode on the block cassette but the two markings may be associated through a software structure. In some embodiments, the information printed/etched on the tape can enable tissue tracking inside the microtomy device. The match between the block-barcode, and tape-mark (internal to the device) can be ensured by the mechanical operation of the device, or by scanning the section together with the tape mark, for example, using a camera. The glass slide can be printed with a barcode related to the barcode on the tissue cassette barcode, and then finally, scanned, thereby ensuring 1-1 mapping or correspondence between the barcode data associated with the incoming block and the barcode data printed on the glass slide label, thus ensuring tissue sample tracking, a critical aspect of regulatory quality assurance.

In some embodiments, a match between the tissue in the block, and the tissue section on the slide can be confirmed based on camera images and image processing. In some embodiments, an imaging or scanning device can be employed to check that the label on the slide was printed correctly so that the tissue section on the slide is associated with the correct tissue block. At each point, the physical replication or printing of the markings on the tissue carrying receptacles (block cassette, transfer medium, or the glass slide) are recorded and cross-checked for correct tracking of the tissue. This provides a situational awareness of how tissue and cut tissue sections traverse through the tissue processing apparatus. In some embodiment, the presently disclosed methods and systems can utilize a quality control imaging system as disclosed, for example, in co-pending U.S. Application No. 62/980,203, filed on Feb. 22, 2020, which is incorporated herein by reference in its entirety.

The scanned barcode data is tracked from the point that the section is placed on tape, which includes replicating the information by a tape marking/printing mechanism; replicating the barcode data by just-in-time printing of the label on the glass slide; transferring the tissue to the glass slide; scanning the printed barcode on the glass slide; and then verifying exact correspondence among the blockface; tape; and slide barcode data; and optionally, communicating a summary report to the LIMS.

In some embodiments, the present disclosure also provides a system to check tissue on the tape (or other transport medium) as an interim quality control check, e.g., for tracking purposes or for tissue integrity purposes (in proper condition for analysis).

Figure 21B:
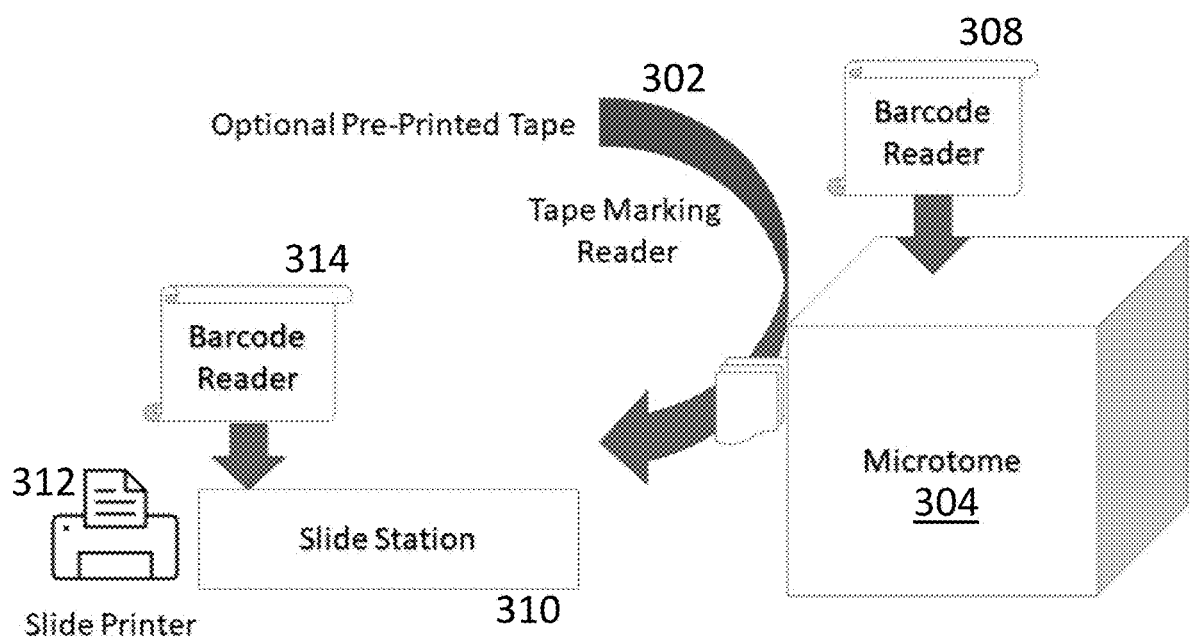
FIG. 21B is a schematic view of one embodiment of the automated tape transfer apparatus of the present disclosure illustrating the path of the optionally pre-printed tape, the apparatus having a barcode reader, in order to scan the label on the sample block, as well as the printed glass slide in accordance with tracking and identification of cut tissue sections of the present disclosure; wherein the glass slide is printed in real-time by a separate slide printer.

In reference to FIG. 21B, in some embodiments, the tape can be pre-printed. The transfer medium (tape) may be pre-printed with location markings on it by a conversion process outside the device. The lab assigned block ID could then be associated with this location marking at the point that the tissue section is picked up by the transfer medium, the two IDs could be associated by means of a software tool, such as making corresponding entries in a database table.

Figure 22:
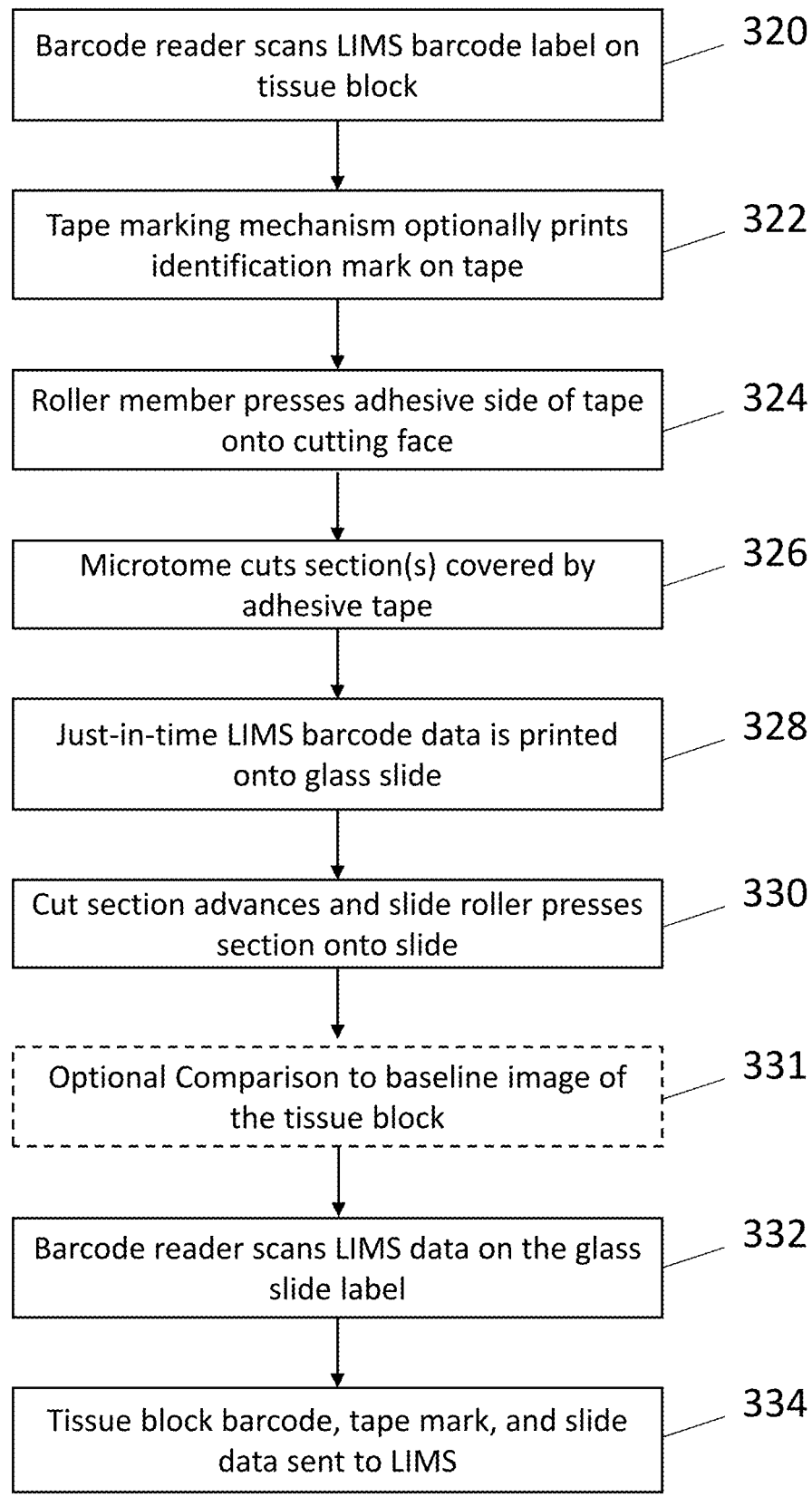
FIG. 22 is a flow chart illustrating one embodiment of the automated steps of the apparatus (system) having a barcode scanning, tape medium marking, and slide printing system, to enable tracking of the tissue section from block to tape to glass slide.

With reference to the tracking flow chart of FIG. 22, the barcode associated with the incoming tissue block is scanned (step 320) at the point of tissue sectioning, using an integrated barcode reader. In some embodiments, in order to replicate the LIMS-based barcode data associated with the incoming tissue block, the section transfer system (such as tape) is marked with identifying information (step 322), which may be the same as the barcode or include some arbitrary rendition of the LIMS data. Additionally or alternatively, the physical location of the tissue section on tape is kept track of, by keeping track of the length of tape from a fiducial mark, such as the beginning of the tape. Next the tissue sections are cut from the tissue block and are placed on the tape in association with the markings on the tape (steps 324 and 326), which also correspond to the barcode information on the tissue block. Once the tissue samples are cut from the block, the glass slide is labeled by a just-in-time digital printer (step 328) with the same barcode data associated with the tissue block. The tissue sections are transported from the microtome to the slide sections and are placed on the glass slide with the printed label (step 330). Optionally, a comparison can be done between a baseline image of the tissue block and an image of the tissue section in step 331. At this point, an error-free association is established between the barcode of the block from which the section was cut, and the label on the slide containing that section. Finally, the barcode data on the glass slide can be scanned (step 332) to validate the slide barcode to the block barcode. In some embodiments, the blockface LIMS data, the transfer media location marking, and the slide barcode data are associated (step 334) in order to ensure that the three pieces of information precisely match, thus ensuring tracking of the cut tissue specimen within the automated tissue sectioning device, assuring regulatory quality compliance.

System Implementation

The quality control analyses described above can be achieved using an automated apparatus for automated transfer of tissue sections from the sample block to transfer medium such as tape and from the transfer medium to slides. In some embodiments, an automated tape transfer system is provided including a controller, a support for holding a sample block of tissue embedded within an embedding medium, a cutting device configured to cut tissue sections from the sample block and a transfer medium for transporting the cut tissue section from the sample block. A quality control system includes one or more imaging devices configured to take at least a first image of the sample block and at least a second image of the cut tissue section, the first and second images compared to confirm the cut tissue section corresponds to the pre-sectioned tissue of the sample block, e.g., is within a pre-set criteria.

In some embodiments, an automated method is provided for transferring cut tissue sections from a tissue sample block and providing for quality control. The method includes the steps of:

a) advancing a transport medium in an automated system;
b) cutting a first tissue section of the sample block;

c) transporting the first tissue section away from the sample block, wherein the cutting exposes a next cutting face of the sample block;

d) transferring the first tissue section to a first slide; and e) comparing the first tissue section to the sample block to determine if a correspondence is present.

Figure 23:
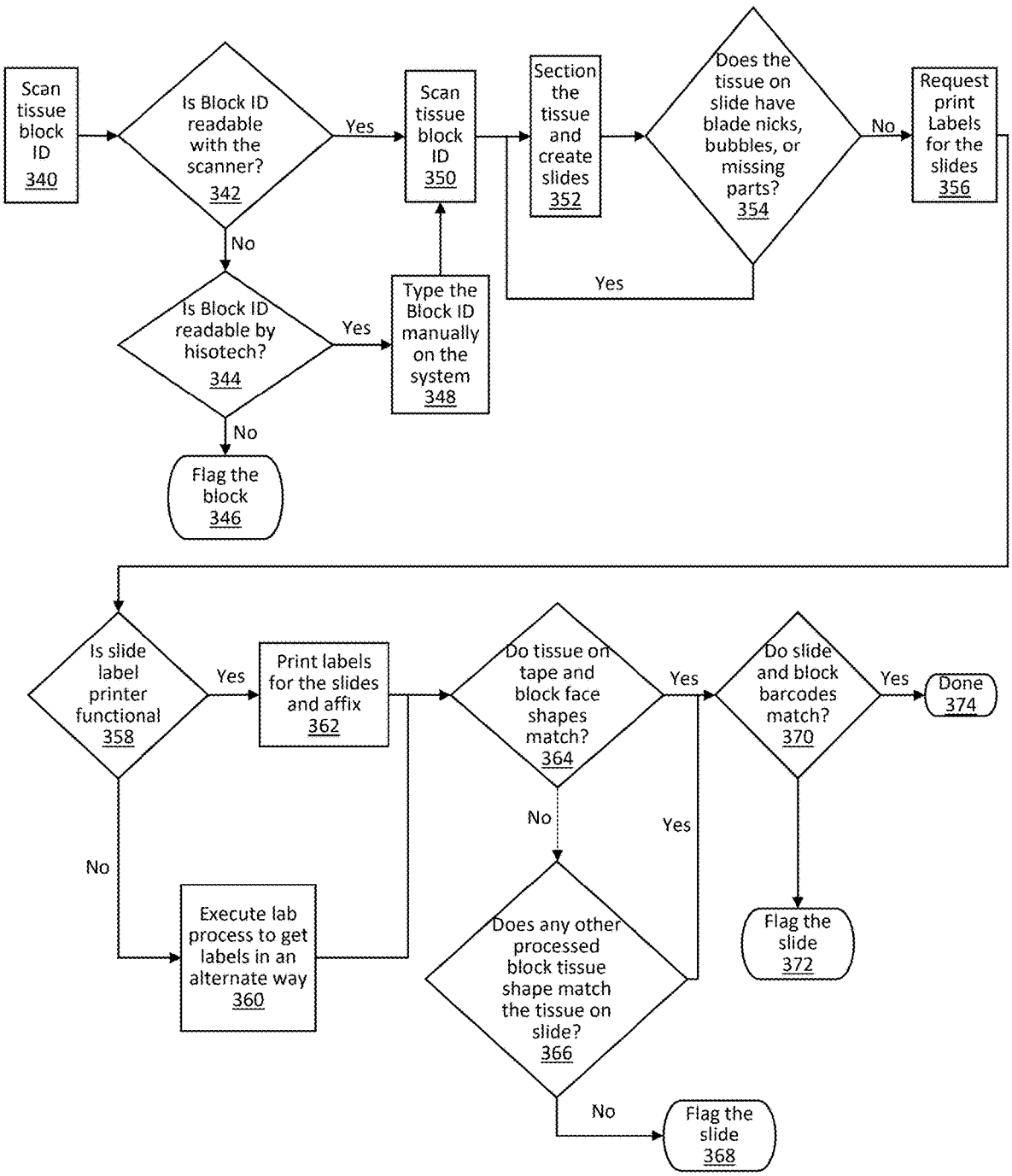
FIG. 23 is a workflow diagram of the section tracking system.

In some embodiments, the automated method includes transporting the cut tissue section to a slide station containing a first slide for transfer to the first slide, wherein the image of the first cut tissue section is taken on the first slide FIG. 23 provides a work flow diagram for section tracking. In step 340, the workflow involves scanning the tissue block and determining if the sample block ID is readable with a scanner (step 342). If not, then a determination is made if the block ID is readable by a histotechnician in step 344. If not, the block is flagged in step 346; if yes, the block ID is typed manually on the system in step 348. Once the block ID is readable (step 350), either by scanning or manual input, the tissue is sectioned to create slides as described herein (step 352). If a determination is made that the tissue on the slides have blade nicks, bubbles, missing parts, and/or other unacceptable features as described above (step 354), more sections are cut. If the tissue on the slides is acceptable, then print labels are requested for the slides in step 356. A determination is made about the functionality of the slide label printer in step 358. If the slide label printer is not functional, then the lab needs to execute a process to get labels in an alternate way (step 360). If the printer is functional, then the labels are printed and affixed to the slides in step 362. Next, the tissue on the slide and the block face are compared (utilizing the methods/process/systems described herein) to determine if there is a match, in step 364. If not, a determination is made if any other processed block tissue shape matches the tissue on the slide in step 366. If not, the slide is flagged in step 368; if yes, then a check is made to confirm the slide and sample block barcodes match in step 370. If not, the slide is flagged in step 372; if yes, then the slide is acceptable for processing (step 374).

Figure 24:
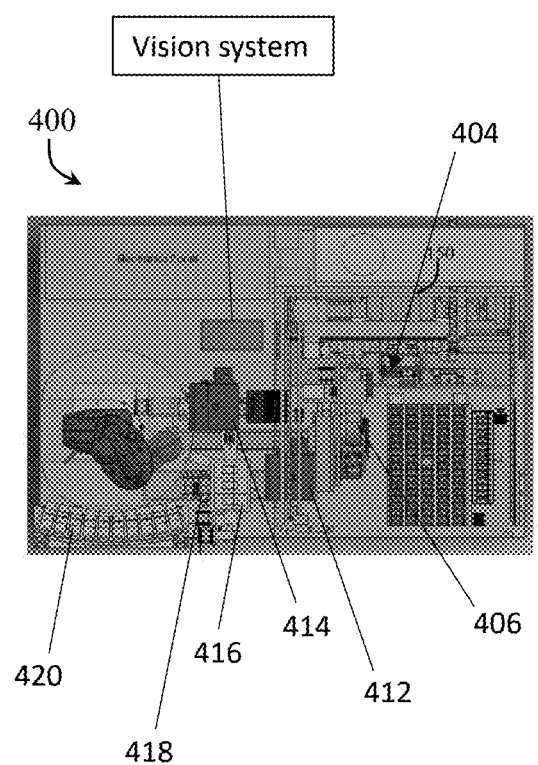
FIG. 24 illustrates an exemplary embodiment of an automated microtomy device.

In reference to FIG. 24, the vision system of the present disclosure can be a part of an automated microtomy device. In some embodiments, an automated microtomy device 400 can include a combination of mechanism to receive a sample block, cut a sample/section from a sample block, transfer a sample cut from the block onto a tape to be transferred to a slide for analysis. The combination of mechanism can include at least one microtome 404, tape transfer apparatus 406, slide adhesive coater 412, a slide printer 414, slide input racks 416, a slide singulator that picks a slide from a stack of slides 418, and slide output racks 420. This combination of mechanisms works together to prepare the sample on the slide and prepare the slide itself.

Figure 25:
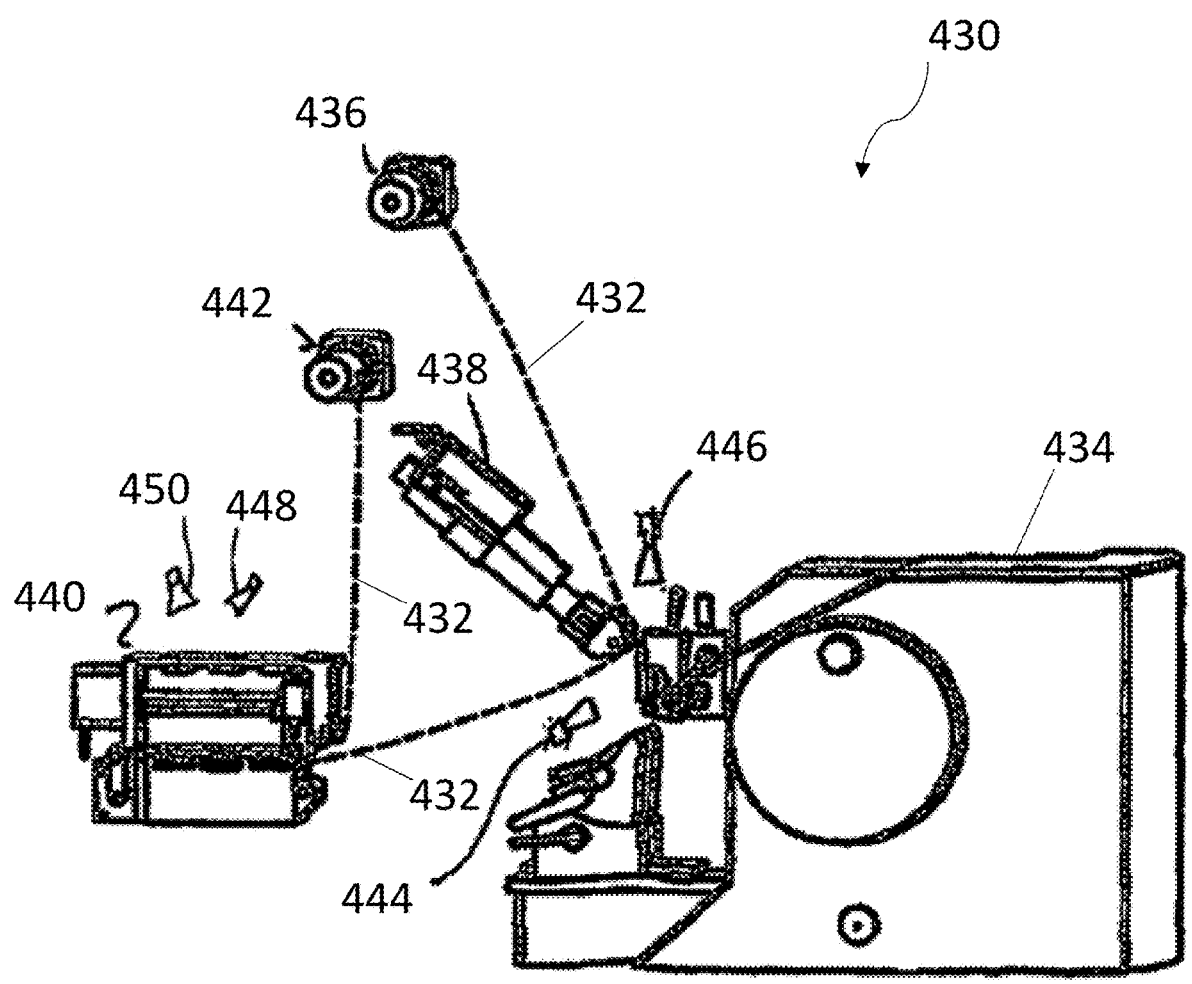
FIG. 25 is a schematic view of an exemplary embodiment of an automated tape transfer apparatus illustrating the path of the tape, the apparatus having imaging devices for taking images of the sample block and the slide.

FIG. 25 is a schematic view of an exemplary embodiment of an automated tape transfer apparatus (system) 430 that includes a visualization system having an illumination system and an image system. Note other automated apparatus could be utilized, and that the apparatus 430 is shown by way of example. FIG. 25 illustrates the path of the tape 432 for transporting cut tissue sections after the block is fully faced. FIG. 25 shows a microtome 434 that is used to hold the sample blocks and cut the sections. The microtome 434 holds a sample block comprising a tissue sample that is enclosed in a supporting block of embedding material such as paraffin wax. The microtome 434 includes a blade (not shown) aligned for cutting slices (or sections) from the face of the tissue block.

In addition to the adhesive tape 432 and the microtome 434, the automated tape transfer apparatus 430 of FIG. 25 includes a motorized feed mechanism 436, a tape applicator 438, a slide station 440 and a take-up mechanism 442. An illumination system 444 and imaging system 446 for the block face are shown (schematically) in the drawing. The same or a different illumination and imaging system (not shown) can be utilized for the tissue section on the tape. An illumination system 448 and imaging system 450 for the slide are also shown (schematically) in the drawing. The path of the tape 432 starts at the feed mechanism 436 and travels toward the microtome 434 and an applicator end of the tape applicator 438. The tape 432 then travels away from the microtome and toward the slide station 440 and finally is stored on the take-up mechanism 442. Note details of the apparatus/system 430 are described in U.S. Publication No. 2017/0205317, and U.S. Publication No. 2017/0328818 the entire contents of these applications are incorporated herein by reference. The motorized reels advance the adhesive tape so that the portion of the adhesive tape that includes the cut section moves away from the microtome and sample block and a new portion of the adhesive tape is positioned and adhered to the cutting face for the next section to be cut by the microtome and transferred to the adhesive tape.

Figure 26:
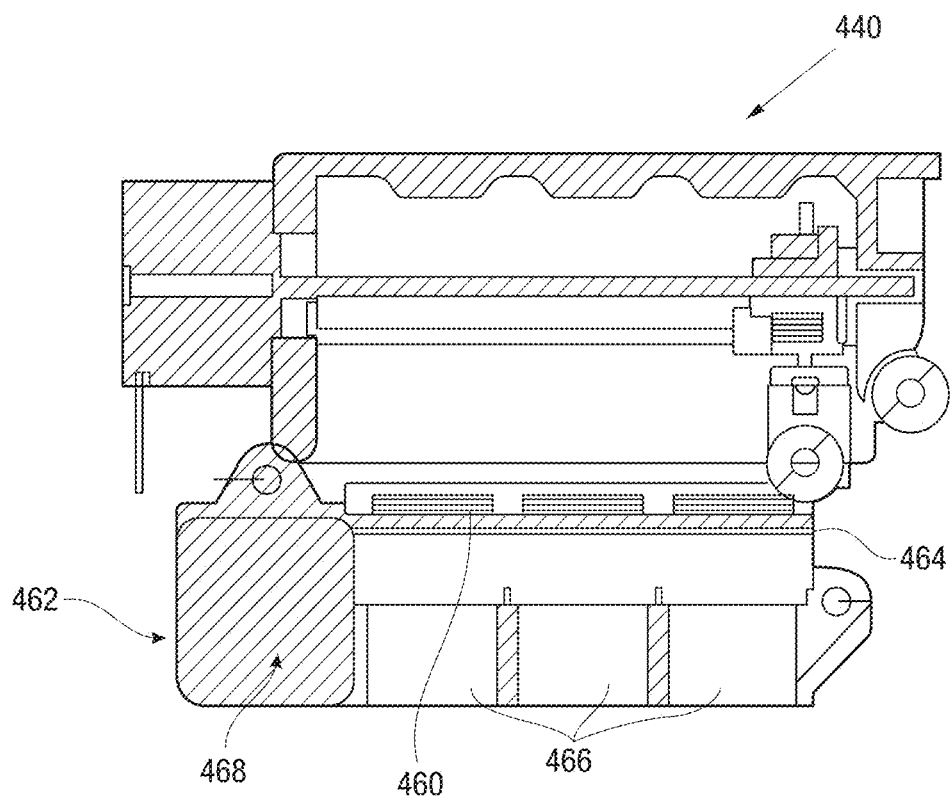
FIG. 26 is a perspective view of a slide station of the automated apparatus of FIG. 6.

FIG. 26 shows the tape applicator as the cycle begins. The tape applicator moves towards the cutting face of the sample block of tissue. This causes the roller member of the tape applicator to press the tape, e.g., the adhesive side of the tape if an adhesive tape is utilized, onto the cutting face to cause the tape to adhere and cover the entire cutting face with tape. The tape applicator is then retracted in the opposite direction causing the roller member to reset to the original position of where the roller member is clear of the cutting face. In some embodiments, the cut tissue section is moved into contact with the tape after sectioning by the microtome.

FIG. 26 shows the slide station 440 of the automated tape transfer apparatus 430 in more detail. The slide station 440 can be a UV station for transfer of the tissue sections that are on the tape to microscope slides 460 that are pre-coated with UV-curable adhesive. A roller may then press the section on the adhesive tape onto the slide. It should be appreciated that although the system of FIG. 25 includes a slide station for transfer to slides, the system in some embodiments does not include a slide station and after transfer of the cut sections to the tape and movement of the tape from the microtome area, the sections can be transferred from the tape to the slides in accordance with other methods, e.g., manual transfer or stored on the tape.

Figure 27:
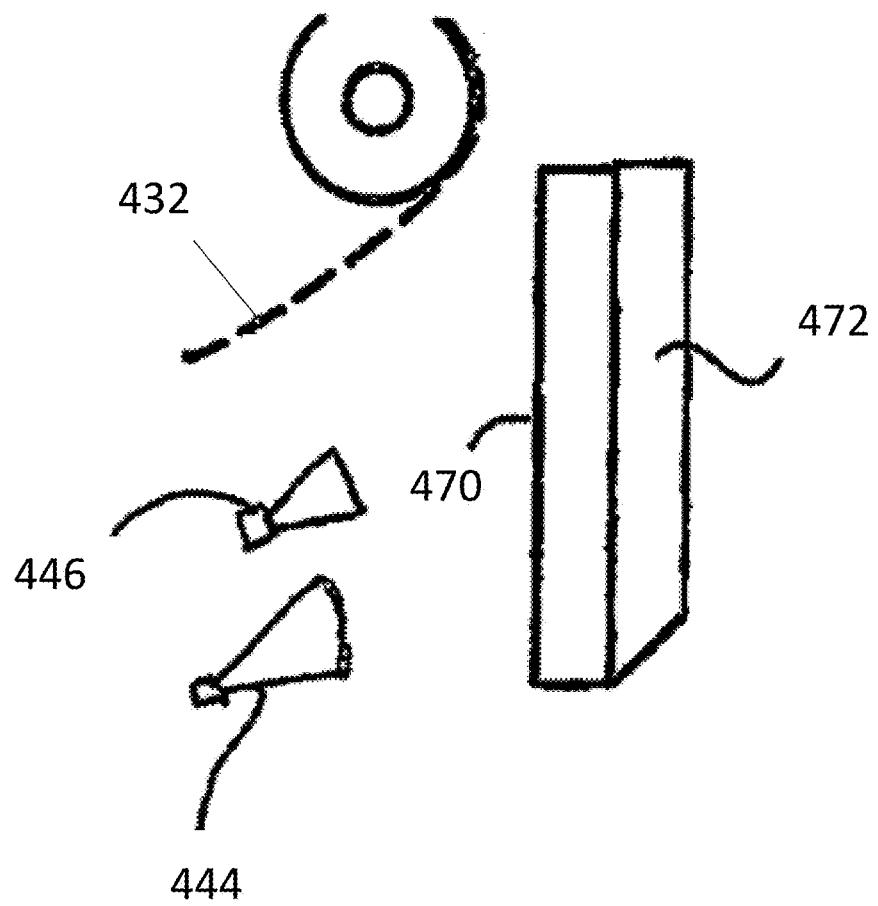
FIG. 27 is a schematic view showing the tape prior to being applied to the face of the sample block.

The slide station 440 has a lower portion 462 with spacers that create the slide slots, a support section 464, a UV source 466 and a motor 468. The slide slots created by the spacers and the support section 464 hold the slides 460. The motor 468 is used to translate or move the lower portion of the slide station 440 to adjust the section location on a slide 460 so that the exact location of where the sample section from the tape is deposited on the slide 460 can be controlled. The illumination and imaging system can be provided in or adjacent the slide station for illuminating and taking mages of the tissue section on the slide for quality control, e.g., comparison to base images of the tissue prior to transfer to the tape. The imaging system can also be utilized to assess the condition of the tissue section on the slide for integrity checking of the tissue. FIG. 27 illustrates is an exemplary schematic view showing the tape 432 prior to being applied to a face 470 of a sample block 472.

As noted above, the illumination and imaging systems disclosed herein can be utilized with other automated apparatus, tape other than adhesive tape, and apparatus not having an automated slide station as well as in manual systems.

The automated systems provide for using an adhesive tape, or alternatively another transfer medium, to support samples from tissue block cutting. The automated systems and methods also provide for automated subsequent transfer of the samples from the adhesive tape to slides. The systems and methods further provide for improved quality control by providing a method and device/system for comparison of i) the tissue on the transfer medium and/or ii) the tissue on the glass slide, to the tissue on the sample block or the slice just cut from the block. This is in the context of a fully automated tissue sectioning device and provides automated quality control.

The system is described with use of a continuous strip of adhesive tape, it being understood that other transfer medium can be utilized. The adhesive tape as disclosed herein adheres to the cutting face of the sample block prior to sectioning. Subsequent to the adhesive tape adhering to the cutting face, the microtome begins a cutting action. The adhering of the adhesive tape to the cutting face supports the section that is being cut by the microtome. Once the microtome completes the cut, the section that has been cut remains adhered to the adhesive tape. In alternate embodiments, the section can be cut first, followed by adherence to the transfer medium.

Note the tape provides one example of a transport device/system for the tissue section. Other transport systems can also be utilized such a robotic arm, a series of cups with water in them, etc. The tissue in/on these other transport systems can be evaluated in accordance with the quality control systems described herein. Therefore, the systems, e.g., illumination systems, imaging systems, etc. described herein are fully applicable to the section (slice) on the various transport systems.

Due to the analysis of the tissue at different stages in the apparatus, e.g., block to new slice, slice on transport, slice on slide, multiple internal levels of quality control are provided.

The slides in the slide station can be stably (firmly) held in accordance with some embodiments of the quality control system described herein. In some embodiments, the automated system further includes a support to hold the sample block stably and a support to hold the slide stably in front of the one or more imaging devices.

It should be understood that the term "adhesive tape" as used herein refers to any type of bonding, including molecular bonding, mechanical bonding, etc., and also can include dry adhesive tapes which provides bonding via van der Waals force (molecular bonding) and whose tape peel force varies greatly on peel angle which minimizes section damage during peeling. The tape can leave no residue, sticks when needed and peels off when needed without damaging the tissue. It should also be noted that the term "continuous strip of adhesive tape" as used herein means that the tape is longer than the amount of adhesive tape used for a single section (a single sample of tissue cut from the tissue block). The adhesive region of the adhesive tape can be large enough to fully cover the cutting face of the sample block, i.e., to hold a complete section when it is sliced from the sample block.

An example of an automated apparatus is illustrated in FIG. 26 described above, and further described in commonly assigned U.S. Publication No. 2017/0205317. Other examples of an automated apparatus, and variations thereof are disclosed in U.S. Publication No. 2017/0003309 and U.S. Publication No. 2017/0328818. The entire contents of these three publications are incorporated herein by reference. It should be understood that these automated apparatuses provide examples of automated apparatus as the illumination/imaging systems and the quality control systems can be used with other automated apparatus. Also, as discussed herein, the illumination/imaging systems and the section tracking and quality control systems can be used with manual systems and methods.

The automated tape transfer apparatus may include a programmable digital controller, a processor or other type of application specific integrated circuit (ASIC) that is used to control the motion of the automated tape transfer apparatus 1, communicate with users of the automated tape transfer apparatus 1 and/or communicate with the microtome 4 to which the automated tape transfer apparatus 1 is connected. There are many motions that can be controlled within the automated tape transfer apparatus 1. Examples of these motions include the movement of the feed mechanism 3 and the take-up mechanism 6, movement of the lower portion 30 and the translation portion of the slide station 5, movement of the linear actuator member etc. The controller may also provide information to users of the functions or conditions of the automated tape transfer apparatus 1 such as the number of slides that have been prepared, the number of sections that have been transferred, the amount of tape remaining on the roll, etc. The controller is capable of receiving any types of input (e.g., mechanical, visual, electrical, etc.) to perform its control functions. The controller can also in some embodiments control the quality control systems described herein.

In some embodiments, the automated tape transfer apparatus 1 further includes an optical device to inspect the sample block. For example, the microtome 4 may store multiple sample blocks for sectioning. The optical device may be used to assess the condition of the cutting face or determine the location of the tissue within the embedding medium. In one example, a macro image of the cutting face may enable more precise placement of the adhesive tape 2 on the cutting face. Analysis of the cutting face may facilitate automatic trimming of the cutting face to expose the desired tissue for sectioning.

In some embodiments, one or more optical sensors may be used to provide feedback to the controller on the position and quality of the section on the adhesive tape 2. For example, a brightness sensor in close proximity to a backlit section of the adhesive tape 2 may distinguish between an empty portion of the adhesive tape 2 and a portion that is carrying a section. This may provide an approximate location of the section on the adhesive tape 2 that may be used as an input to the controller for various purposes, such as motion control. A CCD imager or similar device may be used to image the section to provide feedback on the quality of the transfer. These images may be used to check for errors in the process, such as incomplete transfer of a section, misalignment of a section on the adhesive tape 2, presence of section trimming waste on tape, etc. In these error cases, additional sections may be taken to replace defective sections.

A similar optical method of inspecting the section on a slide may also be used. A sensor system may provide feedback of the quality of the section transfer to a slide and alert the controller to errors in the process. The same or different optical sensors may be used for both tape and slide inspection.

The automated tape transfer apparatus may also include in some embodiments an automated system to label slides and sample blocks with a barcode or other moniker for identification. Viable slide labeling methods include attaching an adhesive printed label, etching a label into the material or printing a label onto a dedicated location. The label may link a slide to relevant information such as the originating tissue block and sectioning date. Sample blocks may be similarly labeled. To accommodate pre-labeled blocks, an optical reader, such a barcode reader may be used to read the block label to produce the relevant slide labels.

The system can also include an automated quality control system for comparison of cut tissue to tissue on the sample block to ensure the cut tissue is properly labeled on the slide to match the sample block.

Note the use herein of the term tissue sections or cut sections contemplates that initial sections cut from the sample block may not contain much tissue as they could contain the overlying material, e.g., paraffin or other embedding medium. However, it is the sections of tissue, i.e., the tape regions containing sufficient tissue sections, that are critical for histopathology and these are among those selected for transfer to the slides. A feature to ensure this can be provided in the manner described herein.

The tape transfer apparatus (system) can include one or more automated imaging devices such as digital cameras for taking photos during various stages of the automated tape feed/advancement process. The photos can be taken at the time of the cut section transfer to the tape, at the time of transfer of the cut section to the slide, and/or at any other time during the process. Such photos can provide visual/quality control as described herein.

Photos can also be taken of the sample blocks (block face). For example, a mismatch between the block face image and section on tape image is a cue for an error during sectioning. A macro image can be useful in a thumbnail in a database listing section images. This can be useful for roughly figuring out when to start transferring sections to the tape when cutting. These are various ways to image the tissue within the system other than a digital camera. For example, MicroCT can be used to construct a 3D model of the tissue within the paraffin. If the system has a 3D model of the tissue in the block as input, it could use the information to determine when to stop trimming and sectioning.

In another aspect of visual/quality control, as the tape advances through the apparatus and sections are cut from the sample block by the microtome and adhered to the adhesive of the tape, a photo (or other imaging technique) is taken of each tape region containing a tissue sample (cut section) transferred to the adhesive tape thereby enabling real time analysis to make sure the section has been properly, i.e., completely, transferred to the tape. Utilizing the same camera or imaging device, or alternatively, utilizing another camera or imaging device, as the tape with the adhered sections cut from the sample block advances to the slide station and the section is transferred to a slide, a photo (or other imaging technique) is taken of each slide containing the sample to enable real time analysis to make sure the section has been properly, i.e., completely, transferred to the slide. In this manner, the process can be monitored to ensure adequate sections of the sample block are cut and transferred to slides for pathology before cessation of the tape feed. In certain embodiments, if inadequate sections have been transferred, the system can be reversed and the tape unwound in the direction opposite the initial direction of advancement to collect and transfer more sections (samples) from the sample block. Also note that multiple photos of each tape region and each slide containing the cut section can be taken for evaluation. The illumination and imaging systems described herein enhance this analysis.

Other information from the photos can also be stored to identify the sample block, sections, etc. in conjunction with the marking and tracking of the blocks and sections.

In the implementation of the visual control system, a photo is taken of each tape region containing a section, e.g., tissue section, cut from the sample block by the microtome. The photo is then analyzed to determine whether the cut section is properly transferred to the tape. In a further analysis, the photo is evaluated to determine the end of the sample block trimming (described below). A photo is also taken of the slide once the tissue section has been transferred to the slide within the slide station (downstream of the microtome). This photo of the slide is analyzed to determine if the tissue section was properly transferred to the slide. The photos can also be analyzed to determine if sufficient tissue sections are contained on slides. The photos can also be utilized for matching to the sample block. If the section is not sufficient, e.g., it does not contain a sufficient tissue sample as a result for example of containing mostly paraffin, the section is not used for evaluation. The illumination and imaging systems described herein enhance these analyses. The illumination and imaging systems described herein enhance these analyses.

The photos can be stored in a database for future selection if further use and analysis is desired.

FIGS. 28A, 28B, 28C, 29, and 34 illustrate an example embodiment of an automated system for the implementation of the above-described methods. It should, however, be noted that the methods and systems described above can be implemented in a manual microtomy process or other automated microtomy processes.

Figure 28A:
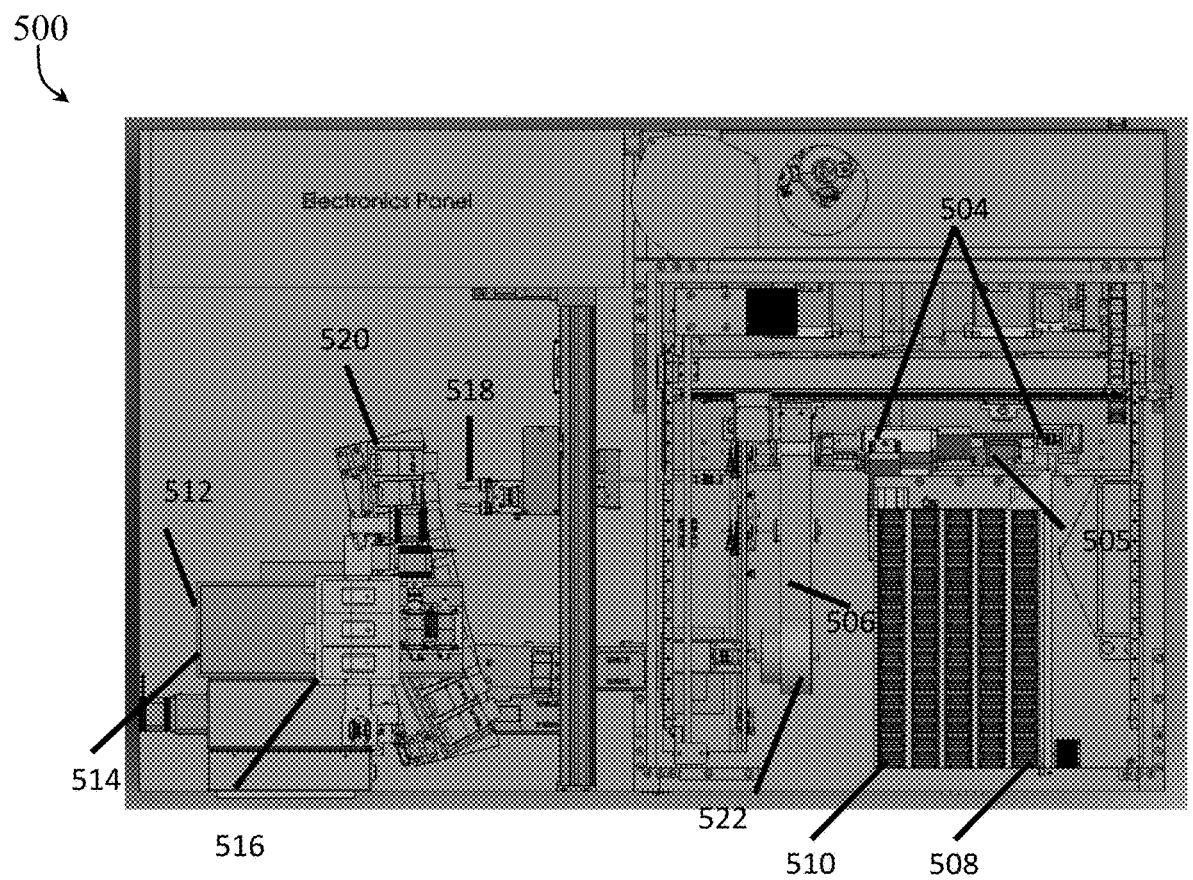
FIG. 28A is an elevated view illustration of a sample system layout in accordance with some embodiments of the present disclosure.
Figure 28B:
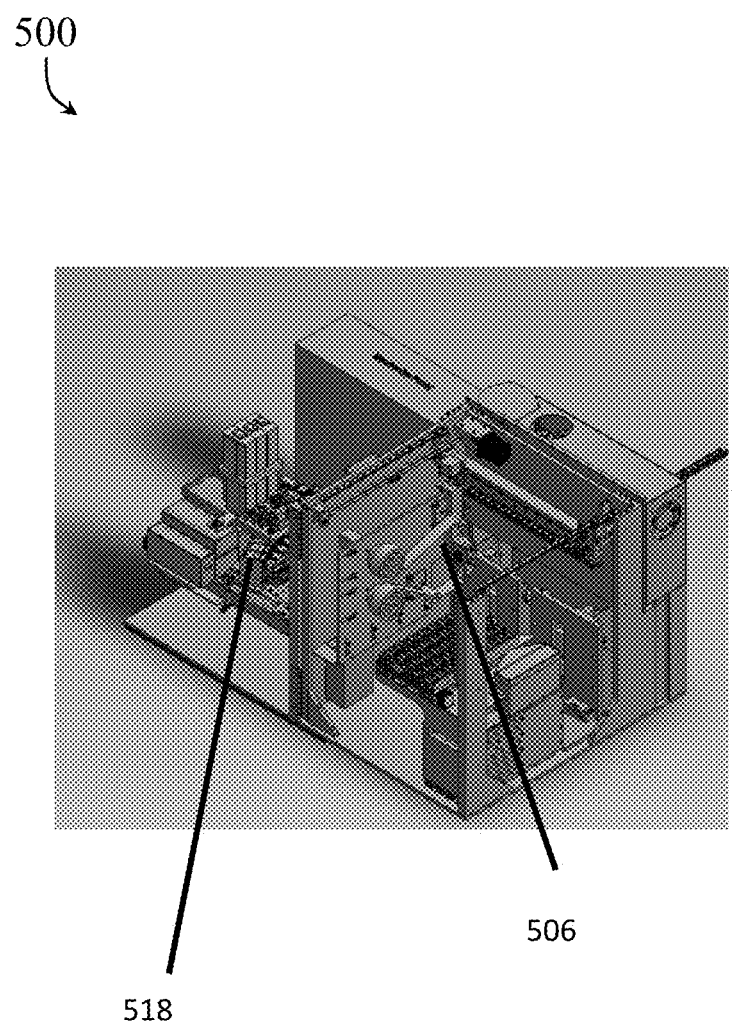
FIGS. 28B and 28C are isometric view illustrations of a sample system layout in accordance with some embodiments of the present disclosure.

Referring to FIGS. 28A and 28B, in some embodiments, an automated system 500 is provided to enable automated tissue sample processing from block to slide. The system 500 can be designed to include a first section for cutting samples from the tissue blocks. In some embodiments, the first section, for example as shown in FIG. 28B, can include a block handler, at least one microtome 504, a transfer medium 506 (e.g., a tape), a hydration chamber 508, and a block tray 510. The block handler, the at least one microtome 504, the transfer medium 506 (e.g., a tape), the hydration chamber 508, and the block tray can be designed to operate together to organize, face, hydrate, section biological samples from tissue blocks and transfer the tissue sections to slides using any combination of systems and methods.

In some embodiments, the system 500 can include a transfer medium 506 (e.g., a tape) to receive the sample slices taken from the tissue block, for example, by a sectioning microtome 504. The transfer medium 506 can include any combination of materials or surfaces that are able to receive a sectioned sample from a microtome 504 and transport the sectioned sample to another location. In some embodiments, the transfer medium 506 can include at least one adhesive surface capable of removing, receiving, and/or transporting a sectioned sample from a microtome 504 after it has been cut from the tissue block. For example, the transfer medium 506 can include any combination of tapes, such as for example, a tape roll, windowed tape, etc. The transfer medium 506 can include or otherwise be a part of a larger mechanism for transferring a sectioned sample. For example, the transfer medium 106 can be an adhesive tape wrapped over a combination of pulleys, wheels, spools, conveyers, etc. designed to enable the transfer medium 506 move a sectioned sample thereon from one location to another. Any other combination of transfer mediums can be used without departing from the present disclosure. For example, the transfer medium 506 can be a belt with ridges, dips, etc. designed to grasp and/or hold the sectioned samples.

In some embodiments, the transfer medium 506 can transfer sectioned samples from its surface to a shifting assembly 522 for transferring the sample onto a slide. The shifting assembly 522 can be designed to remove the samples adhered to the transfer medium 506 and place the samples on one or more slides. In some embodiments, transferring by the shifting assembly 522 can include separating the actual tissue sample material to isolate the sample from the non-sample material. The shifting assembly 522 can use any combination of systems or methods to separate an entirety or a portion of the biological sample for the surrounding the paraffin material such that only the biological sample material is transferred to the slides. For example, the shifting assembly 522 can core out a portion of the biological sample to be removed from the transfer medium 506. In some embodiments, the non-sample material (e.g., paraffin material) can remain on the transfer medium 506 to be discarded with the used transfer medium 106.

Figure 28C:
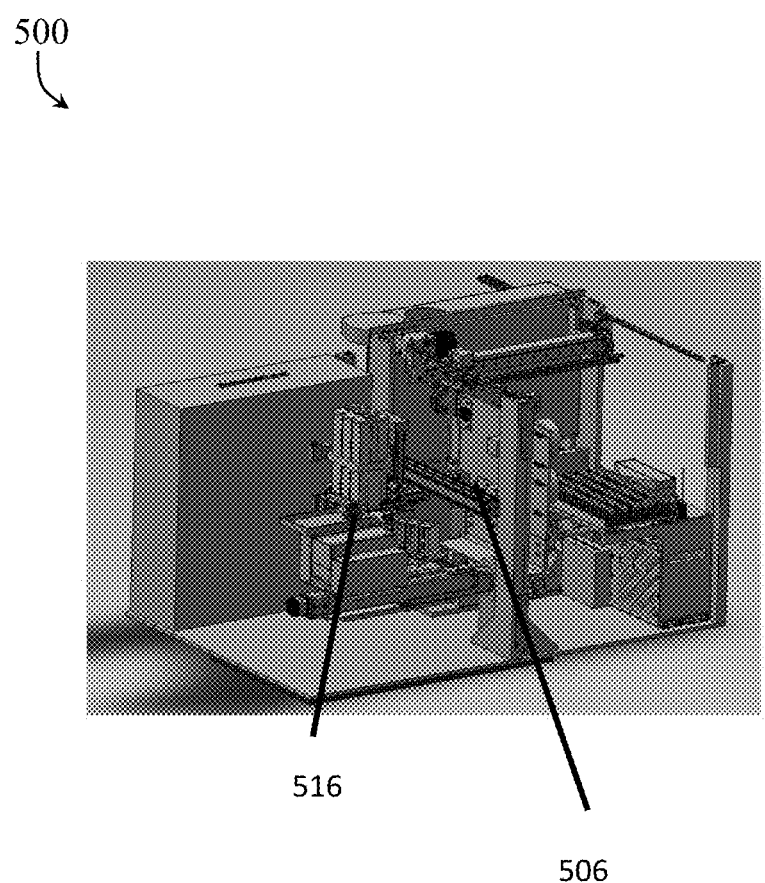

Continuing with FIGS. 28A-28C, the system 500 can also include a second section, for example as shown in FIG. 28C, having a combination of mechanisms to prepare and provide a slide to receive a biological sample cut from the block (e.g., in the first section) from the transfer medium 506 (e.g., a tape) and processing the slide for analysis. In some embodiments, the combination of mechanisms for processing the slide in the second section can include a slide adhesive coater 512, a slide printer 514, slide input racks 516, a slide singulator 518, and slide output racks 520. This combination of mechanisms can work together to prepare the slide to receive a sample, secure the sample on the slide, and deliver/organize the slide with the sample to a rack for later use. In some embodiments, initial blank slides can be provided within a storage rack of a slide assembly for pre-processing. For example, the slide assembly can include one or more slide input racks 516 for storing a plurality of blank slides. The slide assembly can store and organize slide in a large capacity, for example, 200 slides.

In some embodiments, the slide singulator 518 can be designed to grab a slide from a stack of slides within the input racks 116. The slide singulator 518 can includes any combination of mechanisms capable of picking up and transporting the slides. For example, the slide singulator 518 can be an actuating mechanical arm, a gantry, etc. Before being processed, the slide singulator 518 can provide slides for a quality control step. During the quality control step, an analysis can be performed on the slide to ensure the slide is suitable to receive a sample. For example, the quality control can include the slide singulator 518 transporting the slide in view of a camera to provide image data for image processing to identify any potential issues with the slide, check an orientation of a slide, a condition of a slide, etc. If the slide fails the quality control inspection it can be discarded, if it passes, it can be transported within the system 500 to be prepped to receive a sample. In some embodiments, the slide can be transported to the slide printer 514 to receive an identification information printed thereon. For example, information about a sample type, sample origin, sample date, etc. can be printed on the slide. The identification information can include any combination of machine readable and human readable code or text such that the slides and the content thereof can be properly identified and tracked. For example, the slide printer 514 can print a machine-readable barcode on the slide to identify the slide number, batch, contents, etc.

In some embodiments, the slide can be transported to the slide adhesive coater 512 to be coated by an adhesive material. For example, the slide adhesive coater 512 can spray an ultraviolet (UV) activated adhesive on the slide, apply an UV activated adhesive tape, or any combination of adhesive systems or methods. In some embodiments, the adhesive can be applied in multiple layers. The numerous layers can be applied such that the slide receives a uniform coating of the adhesive to ensure clear viewing through the slide layer. In some embodiments, the slide can be inserted into the slide input racks 516 already preprocessed or partially pre-processed.

Once the slide has been processed by the slide printer 514 and the slide adhesive coater 512, the slide can be transported to the transfer medium 106 to receive a sample from the transfer medium 506. For example, the slide can be transported to the shifting assembly 522 to receive sectioned tissue block samples from transfer medium 506 (e.g., a tape mechanism). In some embodiments, prior to transferring the sample to a slide, the shifting assembly 522 can include one or more cameras to perform image processing to determine whether samples of the transfer medium 506 are suitable for adhesion to a slide. For example, the image processing can inspect the sample to determine whether it is suitable for placement on a slide. If it is not suitable the sample can be discarded and the transfer medium 506 can be advanced to the next sample. When a sample is suitable for placement on a slide, it can be applied to the slide. In some embodiments, the image processing can inspect the sample after it has been adhered to the slide to determine whether or not the placement of the sample is of sufficient quality. For example, the image processing can inspect the slide to determine whether the sample is cleanly adhered to slide, no bubbling, tearing, paraffin remanence, etc. If a slide is not suitable, the slide can be discarded instead of being placed in the slide output racks 520.

In some embodiments, the completed slides can be transported, by the singulator 518, to be stored in the slide output racks 520. The slides can be stored in the slide output racks 520 in a predetermined order and/or organizational method such that the next steps in which the slides will be used can easily locate and remove the slides.

As noted above, in some embodiments, the system 500 can include a quality control imaging system as disclosed, for example, in U.S. Application No. 62/980,203, filed on Feb. 22, 2020, which is incorporated herein by reference in its entirety.

Figure 29:
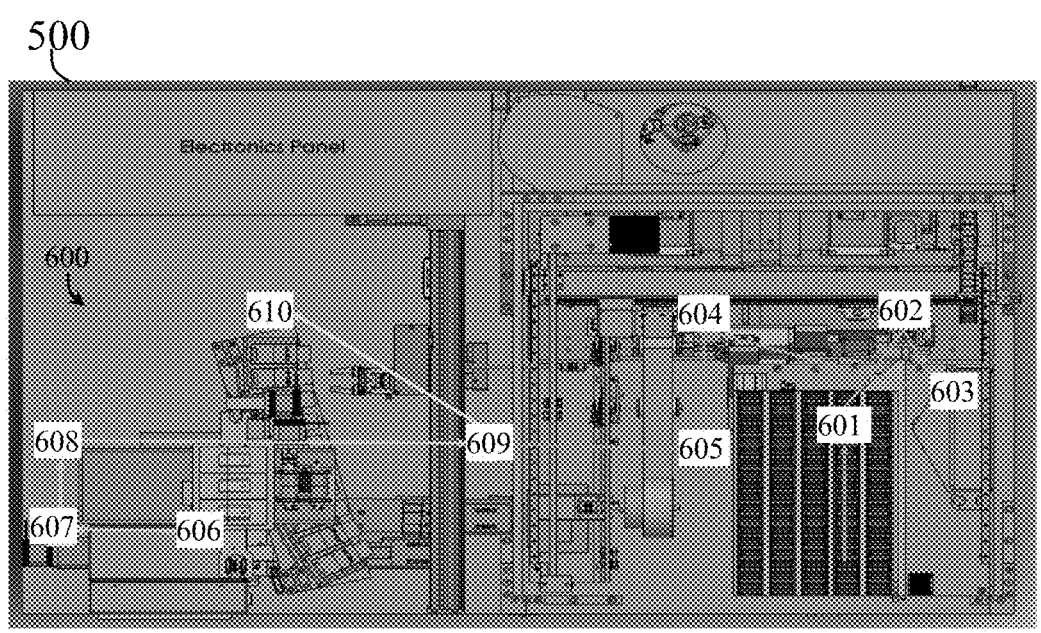
FIG. 29 is a flow chart illustrating the processing of tissue blocks in the automated tissue sectioning system in accordance with some embodiments of the present disclosure

Referring to FIG. 29, in some embodiments, system 500 can be used to transfer samples from tissue blocks to slide following the stages provided in the automated process flow 600. FIG. 29 shows the process flow of a block to slide steps used in the system 500 provided in FIGS. 28A-28C. At step 601, the sample tissue blocks can be loaded in the system 500. For example, one or more tissue blocks, with tissue samples embedded within a paraffin block, can be loaded into trays 510 and placed within the system 500. At step 602, one of the sample tissue blocks can be moved from the tray 510 to a microtome 504 for facing. For example, a tissue block can be transported by a handler and placed within a chuck of a facing microtome 504 to be faced. At step 603, the faced tissue block can be moved to the hydration chamber 508 to be hydrated and cooled. For example, a tissue block can be transported by a handler and placed within the hydration chamber 508 for a predetermined period of time. After sufficient hydration has been provided, at step 604, the tissue block can be moved to a microtome 504 for sectioning. For example, a tissue block can be transported by a handler and placed within a chuck of a sectioning microtome 504 to be polished and sectioned. The block can be provided to the same microtome 104 that performed the facing or a different microtome 504. Thereafter, each sectioned sample can be transferred to the transfer medium 506. At step 605 the sectioned samples on the transfer medium 506 can be transferred to a slide.

Simultaneous to or subsequent to steps 601-605, steps 606-608 can be performed to prepare one or more slides for combining with the sectioned samples from the tissue block. At step 606, a microscope slide can be selected and obtained from a stack of new slides. For example, the slide singulator 518 can select and pull a slide from a stack of slides stored within a rack 516 of blank slides. At step 607, identifying information can be printed on the selected slide. For example, the slide can be placed within the slide printer 514 to have a machine-readable barcode printed thereon. At step 608, an adhesive material can be coated on the selected slide. For example, the slide can be placed within the slide adhesive coater 512 to have a UV activated adhesive sprayed thereon. At step 609, the tissue sample can be transferred from the transfer medium 506 to the UV adhesive coated slide. Additionally, during step 609, the slide can be imaged for onboard diagnostics, quality control, and sample tracking. For example, one or more cameras can be used to capture image data to be processed by an image processor for predetermined quality thresholds. Once the slide has passed the quality control, at step 610 the completed tissue slide can be moved to the output rack 520 to be stored for future analysis.

Algorithms

Figure 30:
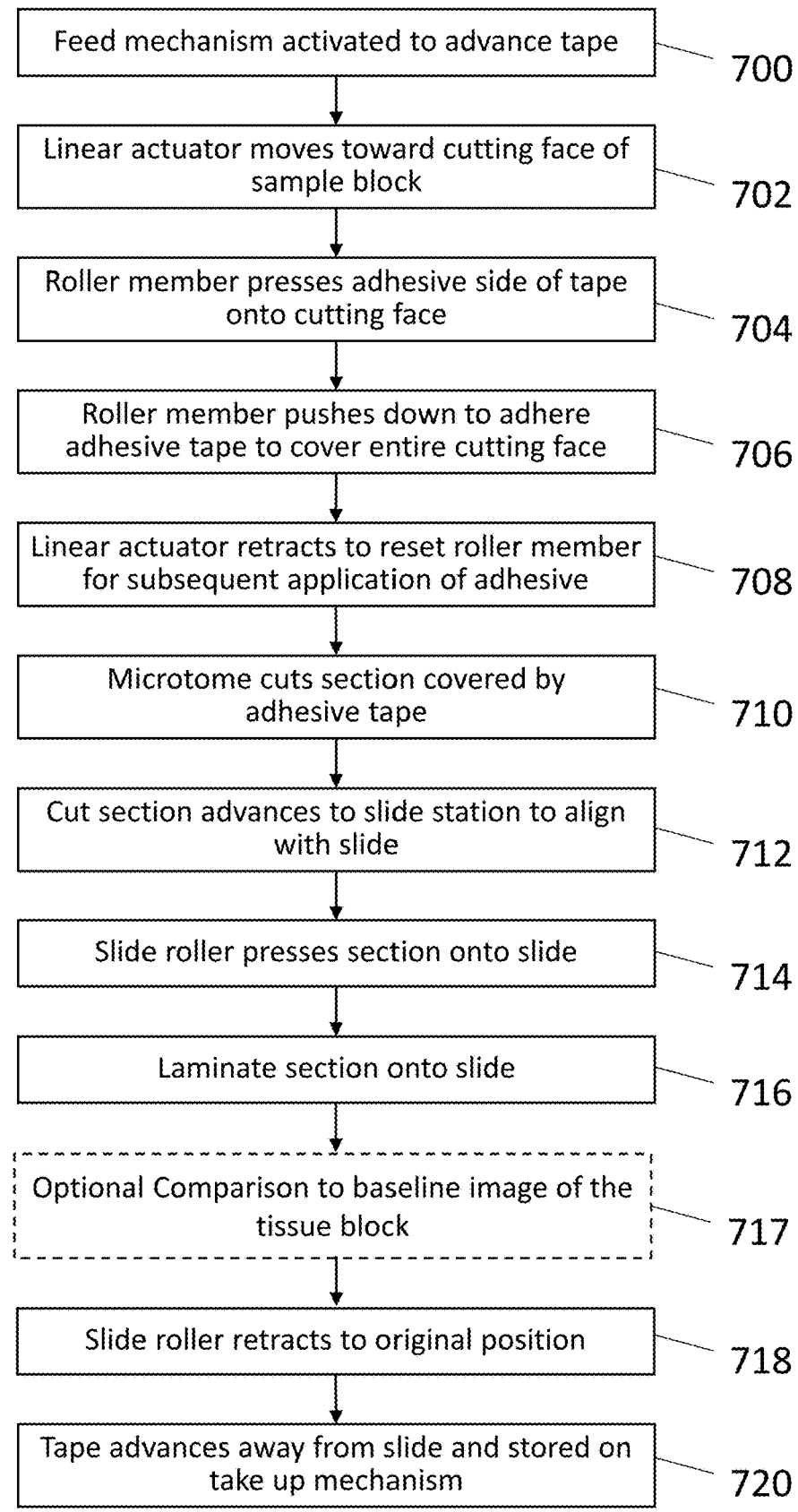
FIG. 30 is a flow chart showing illustrating the automated steps of the system of FIG. 8

The flow chart of FIG. 30 illustrates the steps of the motor controlled automated systems for transferring a tissue section to tape cut by a microtome and further transferring the tissue section to a slide. For example, the automated system can include a movable tape or other supporting/carrying medium, and the sections of tissue are automatically transferred by the apparatus to a tape. Once the system, imaging system determines that the block has been fully faced as described above so that tissue sections can be transferred to the tape for later analysis, the feed mechanism is automatically activated (or alternatively the apparatus can be designed that once the block has been fully faced, the user would activate the feed mechanism). Activation of the feed mechanism advances the tape which is moved toward the cutting face of the sample block as described above. Next, the roller, e.g., roller member, presses the tape, e.g. an adhesive side of the tape if an adhesive tape is utilized, onto the cutting face. The roller is then pushed down so the tape covers the entire cutting face. The linear actuator is retracted to its original position to reset the roller for subsequent application of tape to the block for transfer of another cut section. The microtome then cuts the section covered by the tape (e.g., along a plane parallel or substantially parallel to the cutting face). The cut section carried by the tape is advanced to the slide station to align with the slide. After the cut section of tissue is transferred by the automated apparatus to the tape, the tissue section is subsequently transported by the automated apparatus to a glass slide at the slide station and automatically transferred to the glass slide. The slide roller presses the section on the tape onto the slide, and the section can be laminated onto the slide. The slide roller is retracted to its original position and the tape is advanced away from the slide, leaving the section on the slide. These steps of FIG. 30 repeat until a desired number of sample sections have been transferred to the tape, cut by the microtome and transferred to slides.

As shown in FIG. 30, the feed mechanism is activated to advance the tape in step 700. Next, the linear actuator moves toward the cutting face of the sample block in step 702. The roller member presses the adhesive side of the tape onto the cutting face in step 704. The roller member then pushes down to adhere the adhesive tape to cover the entire cutting face in step 706. The linear actuator retracts to reset the roller member for subsequent application of the adhesive in step 708. The microtome cuts the section covered by adhesive tape in step 710, and the cut section advances to the slide station to align with the slide in step 712. The slide roller presses the section onto the slide in step 714, and the section is laminated onto the slide in step 716. Optionally, a comparison can be made between a baseline image of the tissue block and an image of the tissue section on the slide in step 717, to ensure a match between the tissue block and the tissue section. The slide roller retracts to its original position in step 718. Finally, the tape advances away from the slide and is stored on the take up mechanism in step 720.

In some embodiments, a quality control system can be provided for an equipment or component check of the automated system. More specifically, a software algorithm can be utilized to determine if the tissue transfer system is working according to the manufacturing specifications based on the variation of the tissue images and the projected pattern. This can be based for example on images of the tissue on the tape. In an alternate variation, landmark features of the fixed machine components can be used as a reference instead of the projected pattern to determine tissue orientation variations. Such feature may help with device predictive maintenance. The tissue is transferred to tape at the same nominal location if everything is working according to the specifications. If the tissue transfer is at a sufficiently different location, it can alert the user that machine components are misaligned or not working properly. For example, if a different location is detected, this could mean the rollers need to be aligned, the tape tension needs to be the same between transfer, e.g., the tension sensor is dislodged or the sensor is tripping at a different point, the tape to block applicator tension spring still does not have the specified spring constant, the tape used for transfer does not have the same elasticity constant and specified, etc. It is understood that a single metric cannot point to any individual reason, but it can alert the technician that there is an issue that needs to be fixed in the tissue transfer line. It is also contemplated, however, that the system can provide an algorithm that can detect with more specificity the source of non-alignment and therefore the machine component(s) that needs adjustment can be identified.

Figure 31:
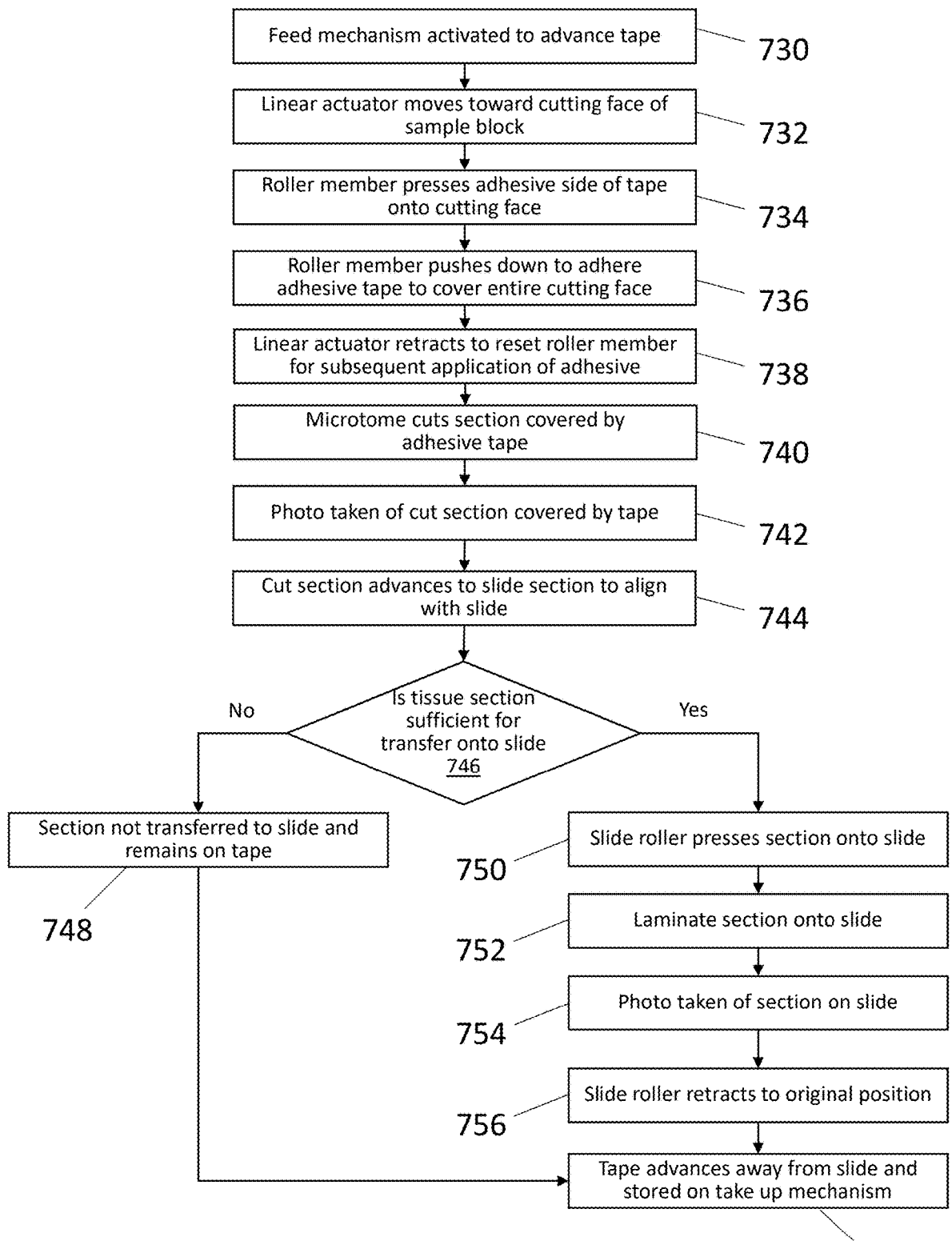
FIG. 31 is a flow chart illustrating one embodiment of the automated steps of the apparatus (system) having an imaging device to determine whether tissue sections are sufficient for transfer to slides.

The tissue imaging systems are shown in use with the tape transfer apparatus (system) of FIG. 25 with the flow chart of FIG. 31 illustrating the steps of the automated tape transfer system. Note a single imaging device, e.g., a digital camera, can be utilized to take photos adjacent the transfer of the cut section to the adhesive of the tape. The same cameras can be repositioned during the automated operation to adjacent the slide station to take photos of the slides after transfer of the section to the slide. Alternatively, a different imaging device can be provided within or adjacent the slide station to take photos after transfer of the section to the slide. As noted above, the apparatus of FIG. 25 can take photos of the cut sections after transfer of the cut sections to the tape and after transfer of the cut sections from the tape to the slides, or, alternatively, take photos only after transfer to the tape or only after transfer to the slide. Such photos can be taken at the time of transfer, right after transfer or downstream of the transfer (after the tape has advanced past the tape applicators or advanced to the slide station). The photos of the tape and/or cut sections of the tape can also be taken at other times during the tape feed cycle if desired.

First, the feed mechanism is activated to advance the tape in step 730. The linear actuator moves toward the cutting face of the sample block in step 732. The roller member presses the adhesive side of the tape onto the cutting face in step 734, and the roller member pushes down to adhere the adhesive tape to cover the entire cutting face in step 736. The linear actuator retracts to reset the roller member for subsequent application of the adhesive in step 738. The microtome cuts the section covered by the adhesive tape in step 740. A photo is taken of the cut section covered by the tape in step 742, and the cut section advances to the slide section to align with the slide in step 744. Next, a determination is made about tissue sufficiency in step 746. If the tissue section is not sufficient for transfer onto the slide, the section is not transferred to the slide and remains on the tape in step 748. The tape then advances away from the slide and is stored on the take up mechanism in step 758. If the tissue section is sufficient for transfer onto the slide, the slide roller presses the section onto the slide in step 750, the section is laminated onto the slide in step 752, and a photo is taken of the section on the slide in step 754. Finally, the slide roller retracts to its original position in step 756 and the tape advances away from the slide and is stored on the take up mechanism in step 758.

With reference to the flow chart of FIG. 31, after the tape, e.g., the tape cartridge, is loaded onto the feed mechanism, the feed mechanism 436 is activated to advance the tape, i.e., a continuous length of adhesive tape. The linear actuator member 438 is moved toward the cutting face of the sample block. Next, the roller member presses the adhesive side of the tape onto the cutting face. The roller member is then pushed down to adhere the adhesive tape to cover the entire cutting face. The linear actuator 438 is retracted to its original position to reset the roller for subsequent application of adhesive tape to another sample. The microtome then cuts the section covered by the adhesive tape (along a plane parallel or substantially parallel to the cutting face). A photo is taken of the cut section by the digital camera, either at the time of transfer or right after the transfer. The photo is analyzed to confirm proper transfer to the tape. The cut section is advanced downstream to the slide station 440, to align with the slide. At this time the photo is analyzed to determine if a sufficient section of tissue has been cut from the sample block for transfer to the slide. If the section is not sufficient, e.g., it does not contain a sufficient tissue sample as a result for example of containing mostly paraffin, the section is not transferred to the slide and remains on the tape. If the tape region contains a sufficient tissue section, then it is ready for transfer to the slide and the slide roller presses the section onto the slide and the section is then laminated onto the slide by the various methods described above. A photo is taken of the cut section and slide at the time of transfer to the slide or right after the transfer. Note the photo can be taken before or after lamination onto the slide. Note the slides from the slide machine have a bar code or other identification system corresponding to the bar code or other identifier on the sample block. The slide roller is retracted to its original position and the tape is advanced away from the slide and stored on the take up reel of the tape cartridge mounted on the take up mechanism. These steps of FIG. 31 repeat until a desired number of sections from the sample block have been cut by the microtome, transferred to the tape, and transferred to slides. Photos are taken of each of these sections when transferred to the tape and when transferred to the slide for analysis during the tape feed operation (quality control).

Figure 32:
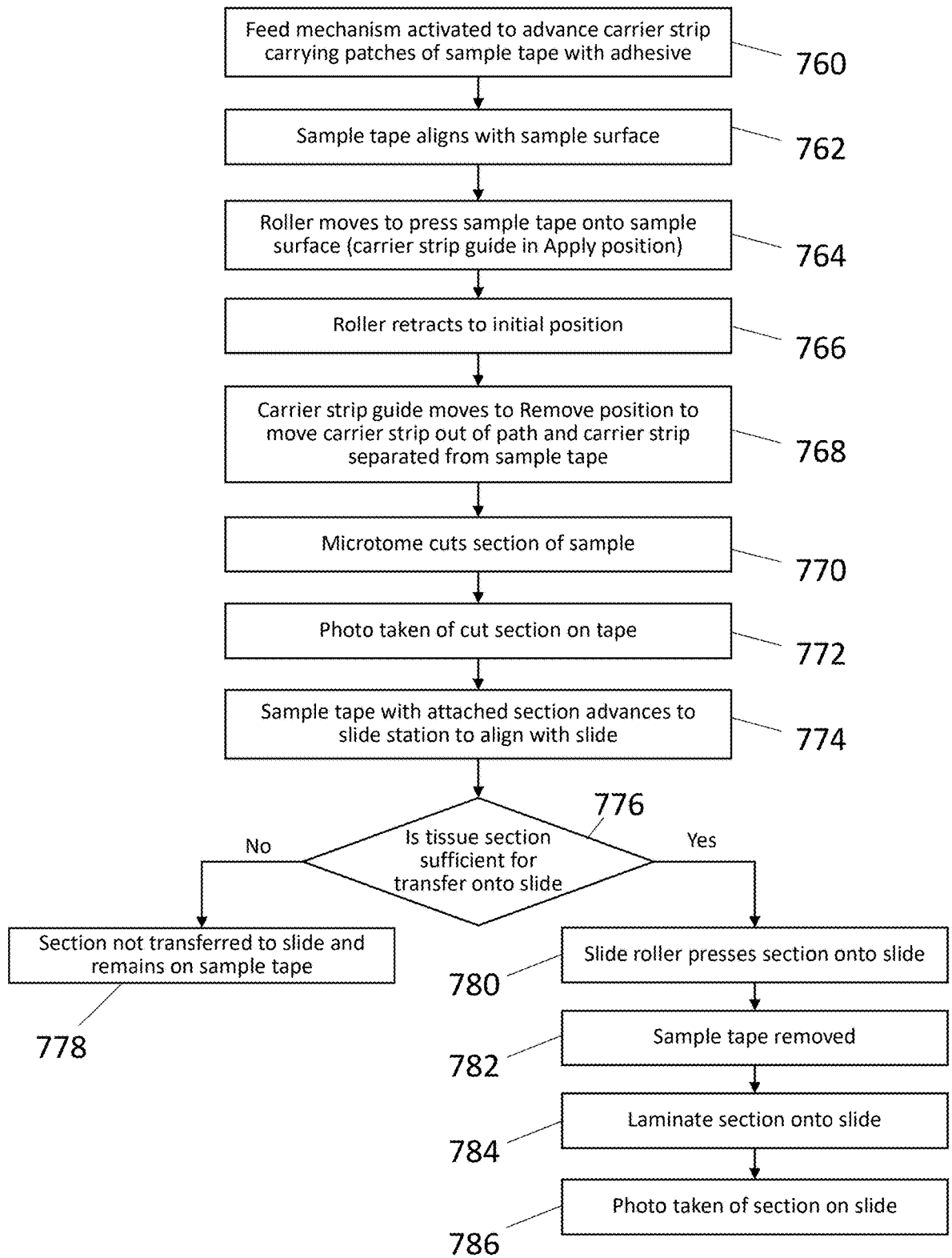
FIG. 32 is a flow chart illustrating the automated steps of an alternate embodiment of the apparatus.

The flow chart of FIG. 32 is for a system similar to that of FIG. 31 except the sample tape is removed from the carrier strip as in the system of U.S. Publication No. 2017/0003309. The analysis of the photos in accordance with the flow charts of FIGS. 31 and 32 are enhanced by use of the illumination and visioning systems described herein.

As shown in FIG. 32, the feed mechanism is activated to advance the carrier strip carrying patches of the sample tape with the adhesive in step 760. Next, the sample tape aligns with the sample surface in step 762. The roller moves to press the sample tape onto the sample surface and the carrier strip guide is now in the Apply position in step 764. The roller retracts to its initial position in step 766. The carrier strip guide moves to the Remove position to move the carrier strip out of the path and the carrier strip separates from the sample tape in step 768. The microtome cuts a section of the sample in step 770 and a photo is taken of the cut section on the tape in step 772. Next, the sample tape with the attached section advances to the slide station to align with the slide in step 774. Next, a determination is made about tissue sufficiency in step 776. If the tissue section is not sufficient for transfer onto the slide, the section is not transferred to the slide and remains on the sample tape in step 778. If the tissue section is sufficient for transfer onto the slide, the slide roller presses the section onto the slide in step 780, the sample tape is removed in step 782, and the section is laminated onto the slide in step 784. Finally, a photo is taken of the section on the slide in step 786.

As discussed above, the automated system has an image based quality control system to compare the tissue on the block face of the sample block with the tissue sections transferred to the glass slides. One or more imaging devices acquires digital image(s)s of the block face and one or more imaging device(s) acquires digital images of the tissue section on the slide onto which the tissue section is transferred and retained, and the images of the sample block and slide are compared to positively match the items. That is, the images from the sample block and the images from the slides containing the tissue sections are compared to determine the presence or absence of a match. This provides a backup system to the barcodes which are provided on the cassette carrying the tissue block and on the slides. In this manner, if the matching of the barcodes is confirmed, a double check is performed by the automated apparatus by the image comparison. Thus, quality control is not reliant on human assessment.

To achieve such quality control, in some embodiments, three features are provided: 1) a series of image capture devices placed to capture the desired tissue images; 2) contrast is created to improve differentiation on the digital images between the tissue and paraffin (or other embedding medium) to facilitate comparison/analysis; and 3) the tissue block and the slides are stably (firmly) held to minimize, or in some embodiments fully prevent, movement of the block and slide which enhances imaging. Each of these features is discussed below.

The automated system can include a computer system to collect the images from the block facing camera and the slide facing camera with the software comparing the images from the block face and the slide. The software algorithm determines the outline of the tissue from each image and compares the two images. The images can be stored for later comparison if desired.

The computer system can have a decision algorithm to determine if the images from the block face and the slide are matching or not. The decision algorithm has the knowledge of identification of the sample block and of the glass slide from which the images are captured. The decision algorithm verifies that the samples also have matching identifications. The matching identifications can involve matching tissue contours as described herein. The matching identification can also involve matching bar codes on the sample block and on the slides, as shown for example in FIGS. 17A and 17B, described herein.

Various types of imaging devices can be provided. Note the terms "imaging device" and "image capturing device" are used herein interchangeably and for convenience are discussed and shown in terms of a digital camera, however, it should be understood that various devices and methods for capturing the images are also contemplated including for example, X-ray, infrared, tomography, microCT imaging, OCT camera, etc. A single image device can be provided, but alternatively multiple imaging devices are provided adjacent the sample block and adjacent the slide receiving the tissue section to enhance the image. Note the image capture devices, e.g., digital imaging devices such as digital cameras, can have light filters on the incoming light as the image capture device acquires images of the block to enhance clarity.

The imaging system could include a box that includes the object to be imaged and the imaging hardware to prevent stray light to be captured by the camera.

In some embodiments, another aspect to having a clear and a high contrast image is to minimize the vibrations between the image capture device and the object. The automated system can include a mechanism that holds the sample block of tissue to be sectioned stably in front of a plurality of cameras. This enhances the images when using cameras sensitive to vibrations by reducing vibrations of the sample block since such vibrations blur the image and decrease the performance of the image post-processing tools by making tissue comparisons more difficult. The sample block is held in place with servo motors that monitor the position of the sample in real time. In one embodiment, the sample block is held in place with high inertia mounting brackets attached to the same reference frame as the image capture device. Other mechanisms for holding the sample block stably are also contemplated.

For likewise providing a clear and high contrast image of the "second" images, i.e., the cut tissue section on the slides, the vibrations between the image capture device and the slide is minimized. Thus, similar to holding the sample block stable as discussed above, the automated system can include a mechanism that holds the slide containing the cut tissue sample stably (firmly) in front of a plurality of cameras. This stable holding enhances the images by reducing vibrations of the slide since such vibrations blur the image and decrease the performance of the image post-processing tools by making tissue comparisons more difficult. The slides can be held firmly in place within the slide station by the slide holder during imaging. Alternatively, a mechanism, such as a mounting bracket, can be incorporated as part of the slide station.

The system and method of the automated system of one embodiment will now be described in conjunction with the flow chart of FIG. 33. The method described is an automated biological tissue sectioning device which processes paraffin embedded biological tissue and produces thin sections on a glass substrate. The thin sections are suitable for analysis under a microscope after further processing. In the method, the tissue shape on the block face is compared to the tissue outline on the glass slide. This occurs in the context of a fully automated tissue sectioning device and provides automated quality control capability. Thus, the system provides an input and output product comparison for an automated biological tissue sectioning device, thereby providing quality control of the biological tissue being cut and placed on a glass slide.

Figure 33:
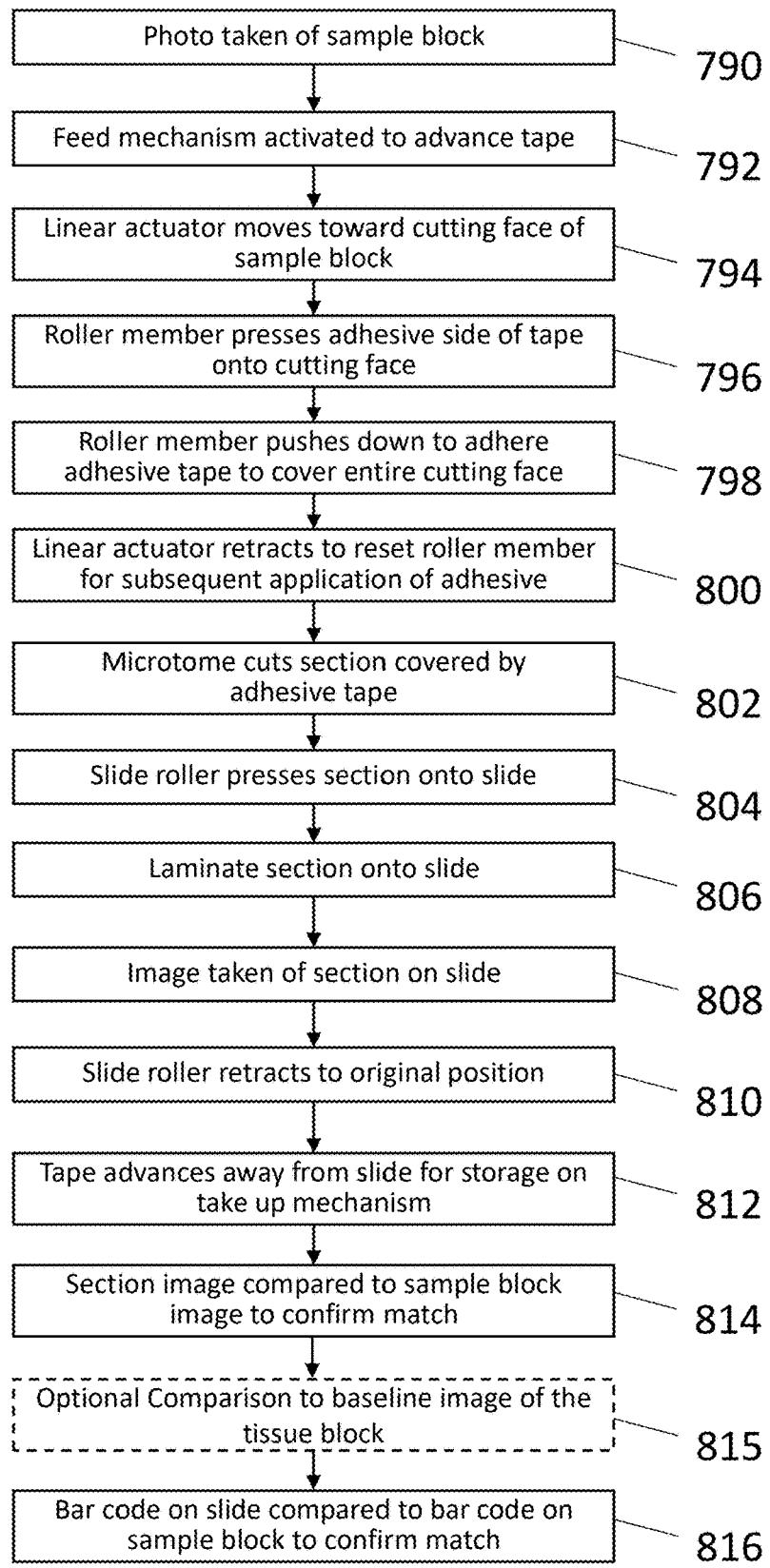
FIG. 33 is a flow chart illustrating the automated steps of an alternate embodiment of the apparatus.

As shown in FIG. 33, a photo is taken of the sample block in step 790 and the feed mechanism is activated to advance the tape in step 792. The linear actuator moves toward the cutting face of the sample block in step 794. Next, the roller member presses the adhesive side of the tape onto the cutting face in step 796. The roller member then pushes down to adhere the adhesive tape to cover the entire cutting face in step 798. The linear actuator retracts to reset the roller member for subsequent application of the adhesive in step 800. The microtome cuts the section covered by the adhesive tape in step 802, the slide roller presses the section onto the slide in step 804, and the section is laminated onto the slide in step 806. An image is taken of the section on the slide in step 808. The slide roller retracts to its original position in step 810 and the tape advances away from the slide for storage on the take up mechanism in step 812. The section image is compared to the sample block image to confirm a match in step 814. Optionally, a comparison can be made between a baseline image of the tissue block and the section image in step 815, to ensure a match between the tissue block and the tissue section. The bar code on the slide is compared to the bar code on the sample block to confirm a match in step 816.

More specifically, with reference to the flow chart of FIG. 31, the steps are similar to the system described in conjunction with the flow chart of FIG. 31 except for the addition of the quality control. The system of FIG. 31 also does not have the quality control step of determining whether the tissue should be transferred to the slide, however, the quality control system can be used with a system performing such steps. In the initial step of FIG. 31, one or more photos are taken of the sample block by a digital camera. The initial photos can be taken before activation or after activation of the feed mechanism. The images are stored for comparison to images taken later in the process, i.e., after transfer to slides (or transfer to tape). Next, the method includes: moving the tape toward the cutting face of the sample block, pressing the adhesive tape onto the cutting face to adhere the cutting face to the surface (for example, the entire surface of the cutting face), cutting the tissue section via the microtome, advancing the cut tissue section on the tape to the slide station, pressing the tape section onto the slide, and laminating the section on the slide. In accordance with the quality control system, an image is taken of the tissue section on the slide (after before or after lamination) by a digital camera. The sectioned image is compared to the sample block image to confirm a match. The bar code on the slide is also compared to the bar code on the sample block to confirm a match. This section comparison between the sample block and the tissue section on the slide is shown in FIG. 17A wherein the image taken of the top of the sample block containing tissue embedded in paraffin is compared to the tissue section on the slide. The bar code on the individual slide is compared to the bar code on the back of the sample block as shown in FIG. 17B which illustrates the slide and paraffin block identification comparison. Note the bar code comparison can be performed before or after the tissue image comparison.

Note the steps in the flow chart provide one embodiment for use of the quality control system, it being understood that the steps need not be performed in the exact order of the blocks of FIG. 33.

It should be appreciated that the quality control system is described in conjunction with the method of FIG. 33 can include a quality control system taking photos of the tape when the tissue section has been transferred thereto. The quality control system for identification matching for positive verification can also be used without this tape section transfer photo check. The quality control system of identification matching can be used with any of the apparatus/systems and methods described herein.

It should be appreciated that a single camera or multiple cameras (or other imaging devices) can be used for the sample block, cut section and/or slide images and or tape images. Additionally, it is also contemplated that a single camera (or other imaging device), either stationary or movable, can be utilized for taking images of the sample block, tape and/or slides.

Note that multiple images of the sample block can be taken to provide a 1-1 comparison of the images of each slide. For example, before each section is cut an image can be taken of the block face for comparison to a slide containing that specific cut section. Alternatively, only a single base image or a few base images of the sample block can be taken for comparison to the images of each slide.

In accordance with another aspect of the quality control system, images of the slides are processed to check for bubbles or tears, i.e., looking for artifacts to confirm proper transfer to the cut tissue section to the slide. If there are bubbles, then the slide can be tossed. Note in a second level of such artifact quality control system, if an artifact is detected, the system would next determine if the artifact is on the tissue or paraffin. If on the tissue, the slide can be discarded; if on the paraffin the slide could still be used since it would not affect tissue analysis. This artifact quality control system can in some embodiments be utilized in addition to the sample block/slide image comparison quality control system described herein.

As noted above, in the various embodiments disclosed herein, it is contemplated that in certain applications multiple sections can be transferred to a single slide. It is also contemplated in some embodiments that not all of the sections (or slides) are stained. For genetic analysis, tumor specific sections of tissue are typically done on blank or unstained sections to preserve the DNA since the stain can ruin the DNA. However, the contrast between the regular tissue and tumor is very poor as the unstained section is mainly transparent under the microscope. In the systems disclosed herein, the slide station can include in some embodiments alternating stained and unstained slides. That is, by placing an unstained section (slide) next to a stained section (slide), and detecting the positioning of the sections on the tape and thus the slides due to the tracking methods disclosed herein, the unstained slides can be genetically analyzed. Thus, the stained slide which is nearly identical to the unstained slide will provide regions/coordinates to pick material from the unstained slides. This is achievable since typically a cut section is 5 microns thick which is about ½ the size of the cell.

As described herein, photos are taken at various stages of the tape feed cycle for real time analysis. Such photos can be utilized in addition to or as an alternative to the optical sensors discussed above for providing feedback of the quality of the section transferred to the tape and/or the quality of the section transferred to the slide.

Any images gathered, and bar-code associations, can in some embodiments be synchronized with the laboratory information management system (LIMS). In acquiring images/spectra or making decisions, these images/spectra/decisions can make their way into LIMS. Thus, the quality control systems disclosed herein can facilitate such integration.

The automated system can include a computer system to collect and analyze the imaging date collected by the imaging system 2. The images can be stored for later analysis or comparison if desired. The computer system can have a decision algorithm to determine (in a binary analysis) if the images from the block face, tape or slide shown tissue abnormalities.

Figure 34:
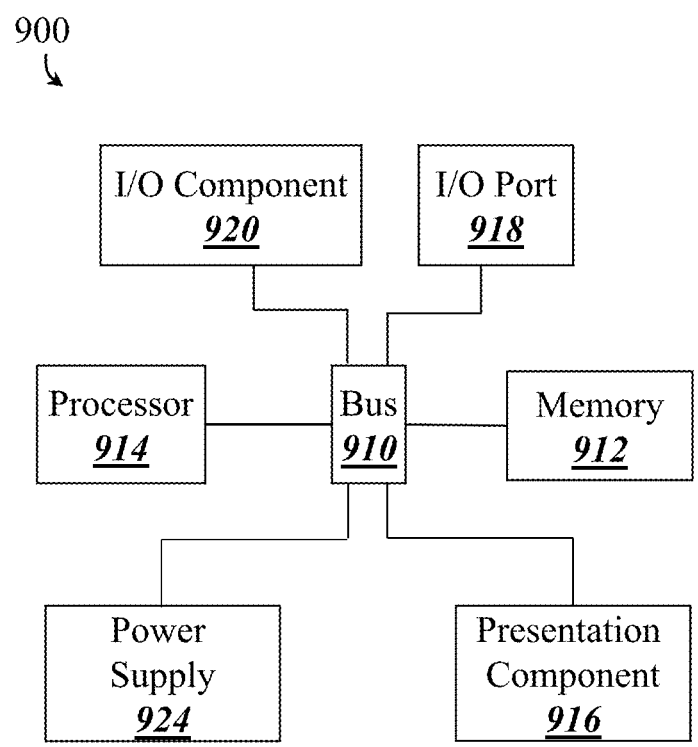
FIG. 34 is an exemplary embodiment of a computing device.

Any suitable computing systems can be used to implement the computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 900 is depicted in FIG. 34. The computing device 900 is merely an illustrative example of a suitable computing environment and in no way limits the scope of the present invention. A "computing device," as represented by FIG. 34, can include a "workstation," a "server," a "laptop," a "desktop," a "hand-held device," a "mobile device," a "tablet computer," or other computing devices, as would be understood by those of skill in the art. Given that the computing device 900 is depicted for illustrative purposes, embodiments of the present invention may utilize any number of computing devices 900 in any number of different ways to implement a single embodiment of the present invention. Accordingly, embodiments of the present invention are not limited to a single computing device 900, as would be appreciated by one with skill in the art, nor are they limited to a single type of implementation or configuration of the example computing device 900.

The computing device 900 can include a bus 910 that can be coupled to one or more of the following illustrative components, directly or indirectly: a memory 912, one or more processors 914, one or more presentation components 916, input/output ports 918, input/output components 920, and a power supply 924. One of skill in the art will appreciate that the bus 910 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 34 is merely illustrative of an exemplary computing device that can be used to implement one or more embodiments of the present invention, and in no way limits the invention.

The computing device 900 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 900.

The memory 912 can include computer-storage media in the form of volatile and/or nonvolatile memory. The memory 912 may be removable, non-removable, or any combination thereof. Exemplary hardware devices are devices such as hard drives, solid-state memory, optical-disc drives, and the like. The computing device 900 can include one or more processors that read data from components such as the memory 912, the various I/O components 920, etc. Presentation component(s) 916 present data indications to a user or other device. Exemplary presentation components include a display device, speaker, printing component, vibrating component, etc.

The I/O ports 918 can enable the computing device 800 to be logically coupled to other devices, such as I/O components 920. Some of the I/O components 920 can be built into the computing device 900. Examples of such I/O components 920 include a microphone, joystick, recording device, game pad, satellite dish, scanner, printer, wireless device, networking device, and the like.

While the above description contains many specifics, those specifics should not be construed as limitations on the scope of the disclosure, but merely as exemplifications of preferred embodiments thereof. Those skilled in the art will envision many other possible variations that are within the scope and spirit of the disclosures.

What is claimed is:

1. A method for facing a tissue block comprising:
   imaging a tissue block to generate imaging data of the tissue block, the tissue block comprising a tissue sample embedded in an embedding material;
   estimating, based on the imaging data:
   a depth profile of the tissue block, wherein the depth profile comprises a thickness of the embedding material to be removed to expose the tissue sample to a predetermined criteria; and
   an expected outline, an expected size, and an expected shape of the tissue sample at a plurality of depths of the tissue block, the plurality of depths comprising a depth after the thickness of the embedding material is removed;
   removing the thickness of the embedding material to expose the tissue sample to the predetermined criteria; and
   confirming, based on the imaging data, when the thickness of the embedding material has been removed to expose the tissue sample to the predetermined criteria, by comparing an outline, size, or shape of the tissue sample in one or more sections cut from the tissue block to the expected outline, the expected size or the expected shape of the tissue sample at the depth estimated based on the imaging data.

2. The method of claim 1, further comprising:
   progressively removing one or more sections from the tissue block;
   imaging the one or more sections to generate imaging data associated with the one or more sections; and
   confirming, based at least in part on the imaging data associated with the one or more sections, that the tissue sample is exposed to the predetermined criteria.

3. The method of claim 1, wherein the tissue block is imaged with a structured light to determine the depth profile.

4. A method for facing a tissue block comprising:
   prior to removing one or more sections from the tissue block comprising a tissue sample embedded in an embedding material, imaging the tissue block to generate a baseline imaging data;
   estimating, from the baseline imaging data, an expected outline, an expected size, or an expected shape of the tissue sample at an expected exposure of the tissue sample to a predetermined criteria, wherein estimating the expected outline, the expected size, or the expected shape of the tissue sample from the baseline imaging data comprises determining the expected outline, the expected size, or the expected shape of the tissue sample at a plurality of depths of the tissue block;
   progressively removing one or more sections from the tissue block;
   imaging the one or more sections removed from the tissue block to generate imaging data associated with the one or more sections; and
   determining, based on the imaging data, when a sufficient number of the one or more sections have been removed from the tissue block such that the exposure of the tissue sample is to the predetermined criteria, wherein:
   the determining comprises comparing an outline, size, or shape of the tissue sample in the one or more sections to the expected outline, the expected size, or the expected shape of the tissue sample estimated from the baseline imaging data.

5. The method of claim 4, further comprising determining a depth profile of the embedding material from the baseline imaging data to remove a sufficient amount of the embedding material to expose the tissue sample to the predetermined criteria.

6. The method of claim 4, further comprising illuminating the tissue block with a structured light in a UV range.

7. The method of claim 4, wherein the outline, size, or shape of the tissue sample in the one or more sections is determined from the imaging data associated with the one or more sections.

8. The method of claim 7, wherein the imaging data associated with the one or more sections comprise imaging data of the one or more sections on the tissue block, on a transfer medium, or on a slide.

9. The method of claim 4, further comprising determining a depth profile by one or more of disparity, from focus, or light field imaging.

10. The method of claim 4, further comprising increasing contrast between the tissue sample and the embedding material.

11. A method for facing a tissue block comprising:
    prior to removing a thickness of embedding material from the tissue block comprising a tissue sample embedded in the embedding material, estimating an expected outline, an expected size, or an expected shape of the tissue sample at a plurality of depths of the tissue block, wherein the plurality of depths comprises a depth at which the tissue sample is expected to be exposed to a predetermined criteria;
    removing, from the tissue block, a thickness of the embedding material configured to expose the tissue sample to the predetermined criteria;
    subsequently to removing the thickness, progressively removing one or more sections from the tissue block;
    confirming, based on a comparison of an outline, a size, or a shape of the tissue sample in the one or more sections with the expected outline, the expected size, or the expected shape of the tissue sample at the depth at which the tissue sample is expected to be exposed to the predetermined criteria, that the tissue sample has been exposed to the predetermined criteria.

12. The method of claim 11, wherein the outline, the size, or the shape of the tissue sample in the one or more sections is determined by imaging the one or more sections on a transfer medium or on a slide.

\* \* \* \* \*